(12) United States Patent
Tada et al.

(10) Patent No.: US 6,459,662 B1
(45) Date of Patent: Oct. 1, 2002

(54) OPTICAL DISK DEVICE

(75) Inventors: Koichi Tada, Gifu (JP); Shinichi Ohe, Tottori (JP); Naoyuki Takagi, Gifu (JP); Ken Hirose, Gifu (JP); Shuichi Ichiura, Hashima (JP); Hiroshi Watanabe, Gifu (JP)

(73) Assignees: Sanyo Electric Co., Ltd., Moriguchi (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 10/076,228

(22) Filed: Feb. 19, 2002

Related U.S. Application Data

(62) Division of application No. 09/230,540, filed as application No. PCT/JP97/02619 on Jul. 28, 1997, now Pat. No. 6,370,093.

(30) Foreign Application Priority Data

| Jul. 31, 1996 | (JP) | 8-202525 |
| Sep. 27, 1996 | (JP) | 8-256826 |
| Nov. 28, 1996 | (JP) | 8-317559 |
| Dec. 17, 1996 | (JP) | 8-336666 |
| Dec. 24, 1996 | (JP) | 8-344011 |
| Dec. 25, 1996 | (JP) | 8-345630 |
| Dec. 25, 1996 | (JP) | 8-345866 |

(51) Int. Cl.$^7$ .............................................. G11B 7/00
(52) U.S. Cl. .................................................. 369/44.27
(58) Field of Search .......................... 369/44.27, 44.26, 369/44.25, 44.29, 44.34, 94, 53.31, 53.37, 53.23

(56) References Cited

U.S. PATENT DOCUMENTS

| 5,740,136 A | * | 4/1998 | Tsutsui et al. | 369/44.27 |
| 5,903,530 A | * | 5/1999 | Tateishi et al. | 369/44.27 |
| 5,999,503 A | | 12/1999 | Tateishi et al. | 369/94 |
| 6,011,762 A | | 1/2000 | Watanabe et al. | 369/44.27 |
| 6,240,054 B1 | * | 5/2001 | Takeya et al. | 369/44.29 |

FOREIGN PATENT DOCUMENTS

| EP | 0 717 401 | 6/1996 |
| JP | 5-54396 | 3/1993 |
| JP | 8-171731 | 7/1996 |
| JP | 8-185633 | 7/1996 |
| JP | 9-134528 | 5/1997 |

OTHER PUBLICATIONS

National Technical Report vol. 41, No. 6, pp. 608–614, Dec. 1995– English abstract.

* cited by examiner

*Primary Examiner*—Thang V. Tran
(74) *Attorney, Agent, or Firm*—Armstrong, Westerman & Hattori, LLP

(57) ABSTRACT

In order to reproduce signals from a double-layer optical disc having two signal recording surfaces, a focus jump that the focusing of an objective lens from the one signal recording surface to the other signal recording surface is quickly achieved, is necessary. When a focus error signal (FE) from a pickup (60, 70) reaches a predetermined threshold value (Vcomp), a deceleration signal for decelerating the objective lens (42) is supplied to an actuator (47). Preferably, a deceleration pulse voltage is lowered step by step. The deceleration pulse voltage is determined in accordance with the maximum value (DFEmax) of a differential focus error signal (DFE) generated by differentiating the focus error signal (FE). Preferably, the address seeking is done simultaneously with the focus jump. The focus jump is performed in accordance with the layer-to-layer distance which is measured beforehand. The focus jump is performed by using a lens (143) having a controllable focal distance. Preferably, whether the layer is the first layer or the second layer is judged based on the reflected luminous power. If the focus error signal (FE) from the other layer is not obtained even when a certain time passages after the focus jump is started, the objective lens (42) is moved in the reverse direction.

6 Claims, 50 Drawing Sheets

FE

ACCELERATION PULSE

DECELERATION PULSE

FE

ACCELERATION PULSE

DECELERATION PULSE

FE

ACCELERATION PULSE

DECELERATION PULSE

FIG.24
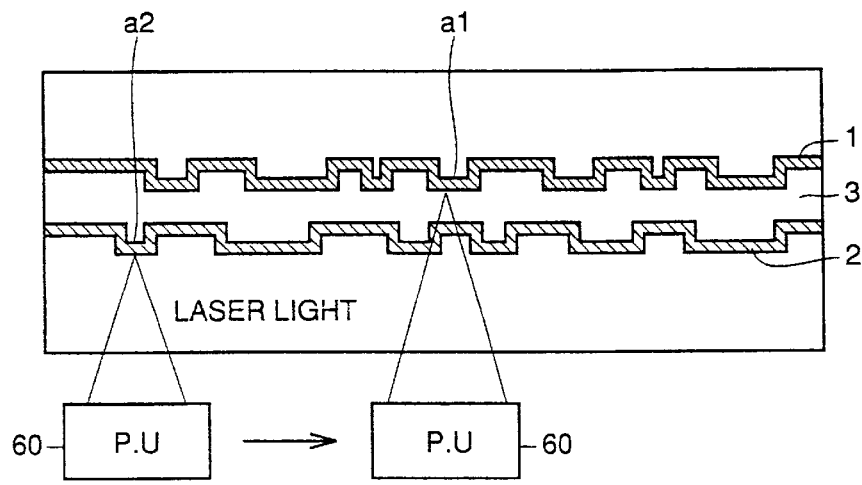
FIG.25A SIGNAL FE 
FIG.25B THREAD DRIVE SIGNAL 
FIG.26
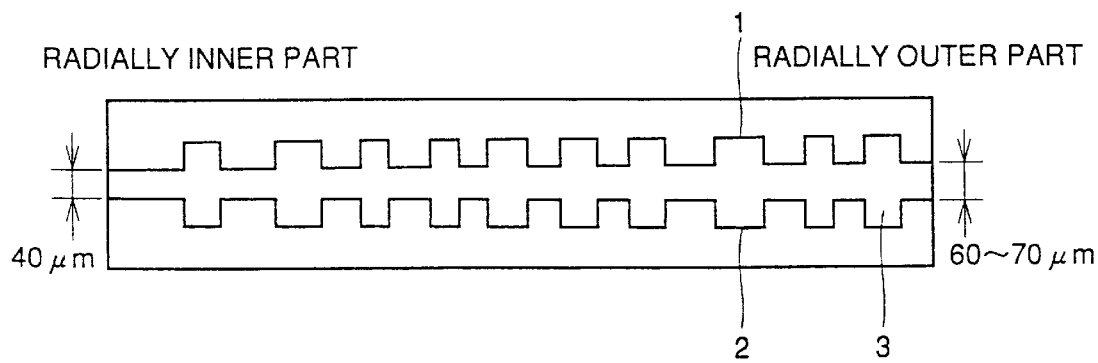

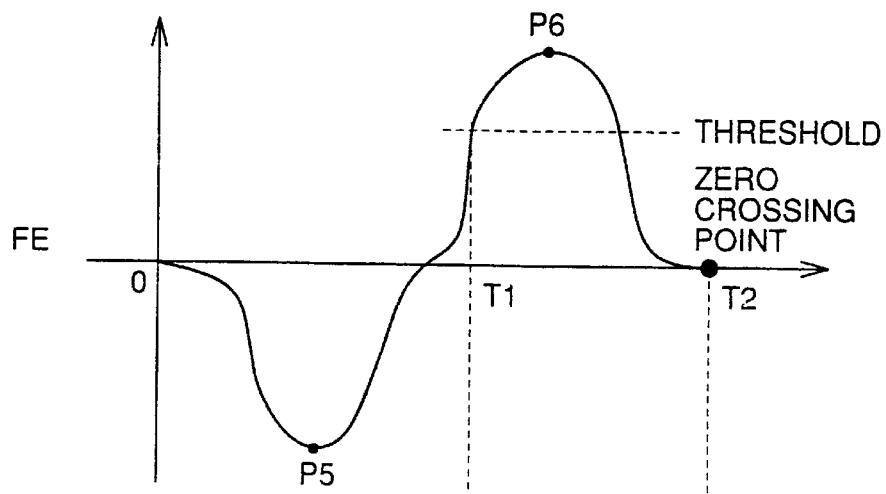
FIG.31A
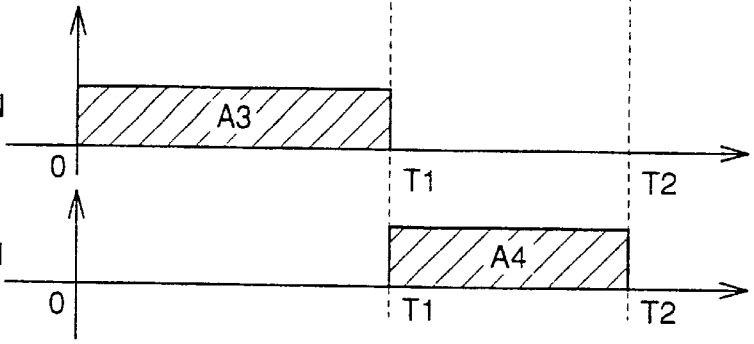
FIG.31B ACCELERATION PULSE
FIG.31C DECELERATION PULSE

ACCELERATION
PULSE

DECELERATION
PULSE

ACCELERATION PULSE

DECELERATION PULSE

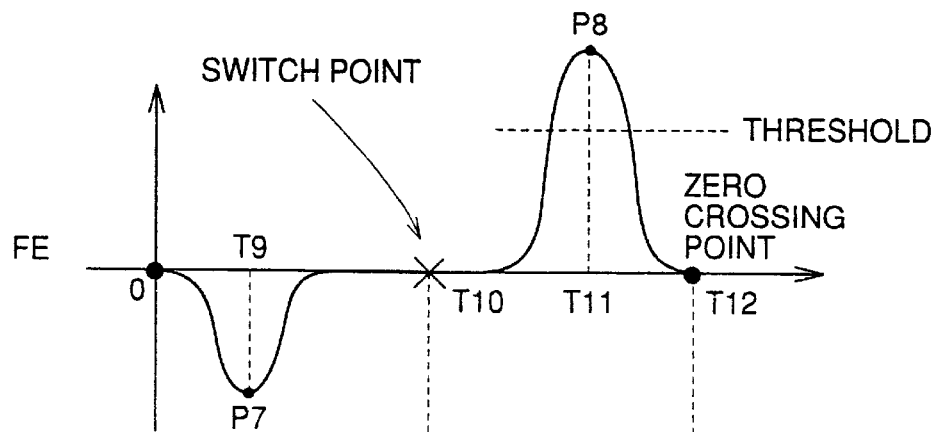
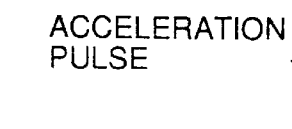
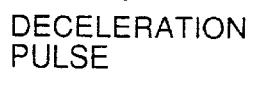

FIG.50
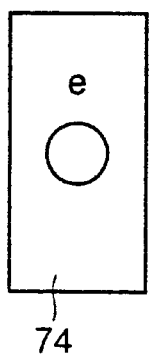
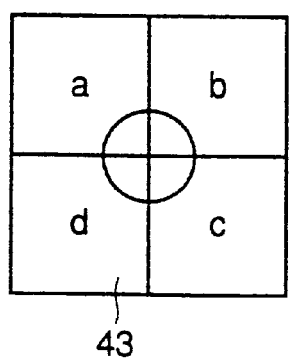
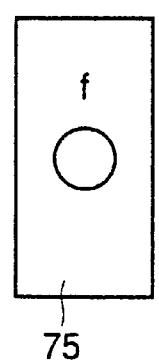
74    43    75

OPTICAL DISK DEVICE

This application is a division of prior application Ser. No. 09/230,540 filed Jan. 18, 1999, now U.S. Pat. No. 6,370,093 which is a national stage application of International Application No. PCT/JP97/02619 filed on Jul. 28,1997.

BACKGROUND OF THE INVENTION

1. Field of the Invention

The invention relates to optical disk devices and, more particularly, to optical disk devices reproducing or recording information from multilayered optical disks having a plurality of signal recording layers.

2. Description of the Related Art

While a typical compact disk (CD) or a typical Compact Disk-Read Only Memory (CD-ROM) available at the present has a recording capacity of 640 M bytes, a digital video disk (DVD) with a recording capacity of 4.7 Gbytes is also available with the recent increase in the density. A CD or CD-ROM has a thickness of 1.2 mm and a diameter of 12 cm. A DVD has half the thickness of a CD or CD-ROM, i.e. 0.6 mm, and has the same diameter that a CD or CD-ROM, i.e. 12 cm. There has also been proposed a dual layer DVD having its signal recording surface double-layered to obtain a recording capacity of 8.5 Gbytes (see e.g. Toshinori Kishi et al., "Dual-Layer Optical Disc Capable of Reading from a Single Side", National Technical Report Vol. 41, No. 6, pp. 10–16, December 1995). The method of reproducing information from a dual layer optical disk having two recording layers or signal recording surfaces can include reproducing the information recorded on the two signal recording surfaces from one side of the disk and reproducing the information recorded on the two signal recording surfaces from their respective sides of the disk. The method of reproducing the information recorded on the two signal recording surfaces from their respective sides is, however, cumbersome, because the disk is required to be turned over in initially completing the reproduction of the information on one signal recording surface and then reproducing the information on the other signal recording surface. This method also fails to immediately reproduce the information on one signal recording surface when the information on the other signal recording surface is being reproduced. Thus, the technique of reproducing information recorded on two signal recording surfaces from one side of the disk is the mainstream of reproducing the information thereon.

As shown in FIG. 59, a one-side reading, dual layer optical disk has a reflective recording layer 1 formed of e.g. aluminum and having a reflectance of at least 70% and a translucent recording layer 2 formed, e.g., of gold and having a reflectance of approximately 30% and the two recording layers 1, 2 sandwich ultraviolet-ray hardened resin of approximately 40 $\mu$m in thickness as an intermediate layer 3. On reflective recording layer 1 and translucent recording layer 2 is recorded such information as shown in FIG. 60. More specifically, the information includes data and ID. The ID includes address (track No.), layer information (layer number), and track information (track format information, area information, track system, reflectance).

Because the dual layer optical disk has one recording surface that is translucent, a laser beam can be radiated from one side of the disk and focused on each recording layer to read the information recorded on the recording layer via an optical pickup device.

Furthermore, for a dual layer optical disk, the so-called focus jump (see e.g. Japanese Patent Laying-Open No.8-171731) is provided. More specifically, when the information on one recording layer is being reproduced an objective lens is moved in the direction of the optical axis so that the laser beam is refocused on the other recording layer to start reproduction of the information on the other recording surface.

The conventional focus jumping, however, has a disadvantage that access time is increased, because a targeted address is sought for after focus-jumping is performed.

Furthermore, the distance between the two layers of a dual layer optical disk is, in fact, not uniform over the entirety of the disk, varying in the radial direction. Thus, it is difficult to provide accurate focus-jumping at any location of the dual layer optical disk.

Furthermore, the conventional focus-jumping depends on the mechanical technique of employing an actuator for focusing servo control to move an objective lens in the direction of the optical axis. Thus, a long period of time is required to move the focal point of a laser beam from one recording layer to the other recording layer. There is also a problem that the conventional device often breaks down.

There is also a problem that if there is a pinhole or the like in a recording surface of a DVD, the layer information of an address is not clearly obtained and the layer of interest cannot be determined.

Furthermore, if the disk is damaged or suffers from surface aberration, a focusing error signal is not detected from its reflecting surface. Thus, the object lens will not be decelerated and disadvantageously collide with a surface of the disk.

One object of the present invention is to provide an optical disk device capable of accurate focus-jumping.

Another object of the present invention is to provide an optical disk device capable of reducing the time required for seeking a targeted address.

Still another object of the present invention is to provide an optical disk device capable of accurate focus-Jumping at any location within a multilayer optical disk.

Still another object of the present invention is to provide an optical disk device capable of rapid focus-jumping.

Still another object of the present invention is to provide an optical disk device capable of identify each layer if a signal recording surface is damaged.

Still another object of the present invention is to provide an optical disk device capable of preventing an optical lens from colliding with a surface of an optical disk in focus-jumping.

SUMMARY OF THE INVENTION

According to the present invention, an optical disk device reproducing the information from an optical disk having the information recorded on a signal recording surface of a plurality of layers includes information reading means illuminating an optical disk with a beam via an objective lens and detecting a light reflected from the optical disk to read information, acceleration means producing and providing to the information reading means an acceleration signal for accelerating the objective lens in the direction of a normal to a signal recording surface of one of the plurality of layers to focus the beam on the signal recording surface of one layer when the information reading means is focusing the beam on a signal recording surface of another layer of the plurality of layers, and deceleration means producing and providing to the information reading means a deceleration signal for decelerating the objective lens when a focusing error signal obtained from the information reading means attains a predetermined level.

Preferably, the predetermined level is provided between the 0 level and peak level of the focusing error signal. The voltage of the deceleration signal is predetermined depending on the time taken from the generation of the acceleration signal by the acceleration means until the focusing error signal attains the predetermined level.

Preferably, the predetermined level is provided between the 0 level and peak level of the focusing error signal. Deceleration signal supply time is predetermined depending on the time taken from the generation of the acceleration signal by the acceleration means until the focusing error signal attains the predetermined level.

Preferably the deceleration means decreases the voltage of the deceleration signal stepwise.

Preferably the optical disk device also includes differentiation means differentiating the focusing error signal. The deceleration means varies the voltage of the deceleration signal depending on the maximal value of the focusing error signal differentiated.

Preferably, the optical disk device also includes storage means storing a plurality of predetermined levels of voltage of the deceleration signal corresponding to a plurality of maximal values of the focusing error signal differentiated, and reading means responsive to a maximal value of the differentiated focusing error signal for reading a corresponding level of the plurality of levels of voltage from the storage means. The deceleration means allows a voltage of the deceleration signal to be changed to the voltage read by the reading means.

In still another aspect of the present invention, an optical disk device reproducing information recorded on a signal recording surface of multiple layers of an optical disk includes information reading means illuminating the optical disk with a beam via an objective lens and detecting a light reflected therefrom to read information, acceleration means producing and providing to the information reading means an acceleration signal accelerating the objective lens in the direction of a normal to a signal recording surface of one layer of the plurality of layers to focus the beam on the signal recording surface of one layer when the information reading means is focusing the beam on a signal recording surface of another layer of the plurality of layers, and deceleration means producing and providing to the information reading means a deceleration signal for decelerating the objective lens when a predetermined period of time has elapsed since the generation of the acceleration signal by the acceleration means.

In still another aspect of the present invention, an optical disk device reproducing the information recorded on a signal recording surface of multiple layers of an optical disk includes information reading means illuminating the optical disk with a beam and detecting a light reflected therefrom to read the information, drive means for moving the information reading means along the signal recording surface, acceleration means producing an acceleration signal for allowing the information reading means to focus on a signal recording surface of any of the plurality of layers when the information reading means is focusing on a signal recording surface of another of the plurality of layers, operation means in response to provision of a targeted address and the information on a targeted layer for calculating the shift in position of the information reading means from the current address and layer information from which the information reading means is reading information, and control means for driving the drive means to move the information reading means by the shift in position calculated and for allowing the acceleration means to produce the acceleration signal and providing the produced acceleration signal to the information reading means so that the information reading means focuses on a signal recording surface of the targeted layer.

In still another aspect of the present invention, a device reproducing the information recorded on a plurality of layers of an optical disk includes information reading means illuminating the optical disk with beam and detecting the light reflected therefrom to read the information, interlayer-distance detection means detecting a first spacing between layers of the mounted optical disk at a plurality of locations different in the distance from the center of the optical disk, storage means storing the first spacing detected by the interlayer-distance detection means, and control means controlling the information reading means to focus the beam on a second layer of the optical disk by calculating a second spacing between a first layer having its information being reproduced and the second layer depending on the first spacing stored in the storage means so that the information in the second layer is reproduced when the information in the first layer is being reproduced.

Preferably, the control means includes acceleration means producing and providing to the information reading means an acceleration signal for moving the information reading means to change the distance from the optical disk to the information reading means, and deceleration means producing and providing to the information reading means a deceleration signal having a variable magnitude for controlling the information reading means to stop at a position for focusing the beam on the second layer.

Preferably, the control means includes acceleration means producing and providing to the information reading means an acceleration signal having a variable magnitude for moving the information reading means to change the distance from the optical disk to the information reading means, and deceleration means producing and providing to the information reading means a deceleration signal for controlling the information reading means to stop at a position for focusing the beam on the second layer.

Still preferably, the control means includes acceleration means producing and providing to the information reading means an acceleration signal having a variable magnitude for moving the information reading means to change the distance from the optical disk to the information reading means, and deceleration means producing and providing to the information reading means a deceleration signal having a variable magnitude for controlling the information reading means to stop at a position for focusing the beam on the second layer.

Still preferably, the interlayer-distance detection means is provided to obtain a focusing error signal having two peaks different in polarity, and the control means produces and provides to the information reading means an acceleration signal for moving the information reading means to change the distance from the optical disk to the information reading means and also produces and provides to the information reading means a deceleration signal for controlling the information reading means to stop at a position for focusing the beam on the second layer to allow the acceleration signal provided to the information reading means to be switched to the deceleration signal at any point between the two peaks.

Preferably, the interlayer-distance detection means obtains a focusing error signal having two peaks different in polarity. The control means produces an acceleration signal for changing the distance from the optical disk to the information reading means and provides the acceleration signal to the information reading means until an intermediate point between the two peaks is reached, and the control means produces a deceleration signal for controlling the information reading means to stop at a position for focusing the beam on the second layer and provides the deceleration signal to the information reading means once the intermediate point between the two peaks has been reached.

In still another aspect of the present invention, a device reproducing the information recorded in a plurality of layers of an optical disk includes information reading means illuminating the optical disk with a beam and detecting the light reflected therefrom to read the information, acceleration means producing and providing to the information reading means an acceleration signal for moving the information reading means to change the distance from the optical disk to the information reading means, and deceleration means producing and providing to the information reading means a deceleration signal having a variable magnitude for controlling the information reading means to stop at a position for focusing the beam on a desired layer.

In still another aspect of the present invention, an optical disk device reproducing information from a multilayered optical disk having a plurality of recording layers includes a laser, an optical system including a lens directing a laser beam from the laser to the multilayered optical disk, and means changing the focal distance of the lens depending on the recording layer among the plurality of recording layers that has the information to be reproduced.

Preferably the lens is a collimator lens.

Preferably the collimator lens includes a first piece of lens, a second piece of lens provided opposite to the first piece of lens, and a transparent member interposed between the first and second pieces of lens. The means changing changes the refractive index of the transparent member depending on the recording layer among the plurality of recording layers that has the information to be reproduced.

Preferably, the transparent member includes a first transparent electrode, a second transparent electrode provided opposite to the first transparent electrode, and liquid crystal interposed between the first and second transparent electrodes. The means changing includes a liquid crystal drive circuit applying a predetermined voltage between the first and second transparent electrodes depending on the recording layer among the plurality of recording layers that has the information to be reproduced.

Preferably, the optical disk device also includes measuring means measuring a distance between the recording layers at a plurality of locations within the multilayer optical disk, storage means storing the distance measured with the measuring means together with the locations, and determination means determining the predetermined voltage according to the distance and locations stored in the storage means.

In still another aspect of the present invention, an optical disk device reproducing information recorded on the respective signal recording surfaces of first and second layers different at least in reflectance of an optical disk, includes information reading means illuminating the optical disk with a beam and detecting the light reflected therefrom to output any of a signal indicative of the read information, a focusing error signal and a tracking error signal, storage means previously storing a level of any of an output from the information reading means indicative of information read from the first and second layers, a focusing error signal and a tracking error signal, and discrimination means discriminating between the first and second layers by comparing any of the output from the information reading means indicative of the read information, sa focusing error signal and a tracking error signal to the respective levels of the first and second layers when it is difficult to discriminate between the first and second layers.

In still another aspect of the present invention, an optical disk device reproducing information recorded on multiple signal recording surfaces of an optical disk includes information reading means illuminating the optical disk with a beam and detecting light reflected therefrom to read the information, acceleration means producing and providing to the information reading means an acceleration signal to allow the information reading means to focus on a signal recording surface of any layer of the plurality of layers when the information reading means is focusing on a signal recording surface of another of the plurality of layers, and deceleration means for producing and providing to the information reading means a deceleration signal for controlling the information reading means to stop in response to the fact that a predetermined reflected light cannot be obtained from the information reading means within a predetermined period of time after the acceleration means provides the acceleration signal to the information reading means.

In still another aspect of the present invention, an optical disk device reproducing the information recorded on a signal recording surface of a plurality of layers of an optical disk includes information reading means illuminating the optical disk with a beam and detecting a light reflected therefrom to read the information, acceleration means producing and providing to the information reading means an acceleration signal to allow the information reading means to focus on a signal recording surface of any of the plurality of layers when the information reading means is focusing on a signal recording surface of another of the plurality of layers, and the deceleration means for producing and providing to the information reading means a deceleration signal for controlling the information reading means to stop in response to the fact that a reflected light of a predetermined level cannot be obtained from the information reading means after the acceleration means provides the acceleration signal to the information reading means.

Preferably the deceleration means first controls the information reading means to stop and then the acceleration means again produces and provides the acceleration signal to the information reading means.

Preferably, the information reading means outputs an S-shaped curved signal as a signal indicating that focusing is achieved and the deceleration means produces the deceleration signal in response to the fact that the S-shaped curved signal cannot be obtained within a predetermined period of time.

Preferably the predetermined period of time is selected to a multiplication of the time required to allow focusing on a signal recording surface of any of the plurality of layers in response to the acceleration signal when another of the plurality of layers is being focused on.

Preferably, the reflected light of the predetermined level recited in claim 2 is selected to correspond to a fraction of the level of the reflected light obtained from the information reading means.

BRIEF DESCRIPTION OF THE DRAWINGS

FIG. 24 is a view for describing a focus-jump operation and a targeted-address seek operation in the FIG. 22 optical disk device.

FIGS. 25A and 25B are time charts representing a focusing error signal and a thread drive signal in the operations shown in FIG. 24.

FIG. 26 is a cross section showing a structure of a single-side reading, dual layer disk actually manufactured.

FIGS. 31A–31C are time charts for describing focus-jumping at a radially inner part of a dual layer disk in the operation shown in FIG. 30.

FIGS. 35A–35C are time charts for describing focus-jumping at a radially outer part of the dual layer disk in the operation shown in FIG. 33.

FIG. 50 is a plan view showing a structure of a photo detector producing a tracking error signal.

DETAILED DESCRIPTION OF THE PREFERRED EMBODIMENTS

Figure 1:
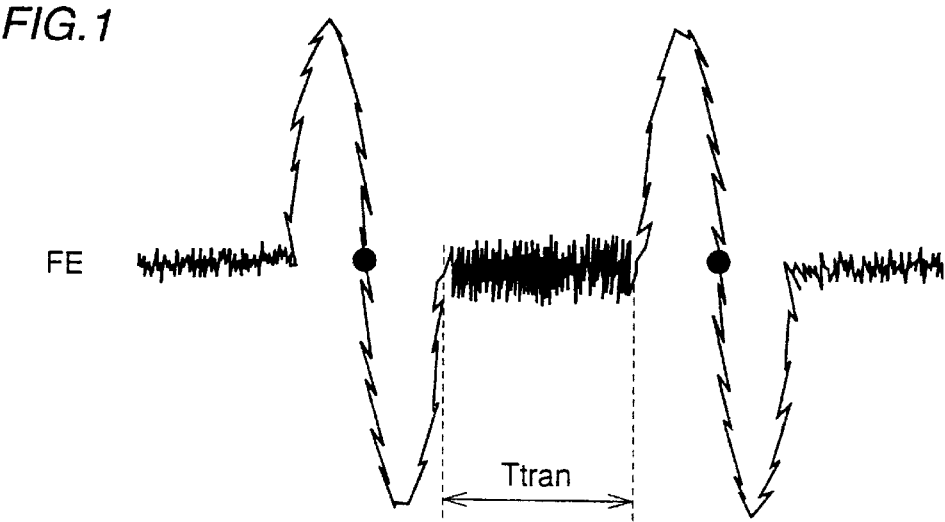
FIG. 1 is a waveform diagram representing a focusing error signal obtained when a focal point of an objective lens is moved from one to another signal recording surface.

The present invention will now be described more specifically with reference to the drawings. In the figures, identical or like portions are denoted by identical reference characters and the descriptions thereof will not be repeated.

First Embodiment

In order to reproduce information from two signal recording surfaces of an optical disk through the radiation of laser beam from one side of the optical disk, while or after the information of one signal recording surface is reproduced an objective lens in the optical pickup is required to refocus on the other signal recording surface. In refocusing on one signal recording surface from the other signal recording surface in accordance with a conventional method, the objective lens is decelerated when a focusing error signal from one signal recording surface is observed. As shown in FIG, 1, however, a transition period Ttran from one signal recording surface to the other signal recording surface can include as much noise as approximately 10% of a peak-value difference of a focusing error signal FE. It is thus difficult to reliably determine whether a detected signal is focusing error signal FE from a signal recording surface from which information is to be reproduced, so that accurate focus-jumping cannot be provided.

The first embodiment of the present invention contemplates an optical disk device capable of accurately switching a focal point of a laser beam from one signal recording surface to the other signal recording surface when an optical pickup capable mainly of reproducing information interchangeably from optical disks different in substrate thickness is employed to reproduce information from a dual layer optical disk with two signal recording surfaces.

Figure 2:
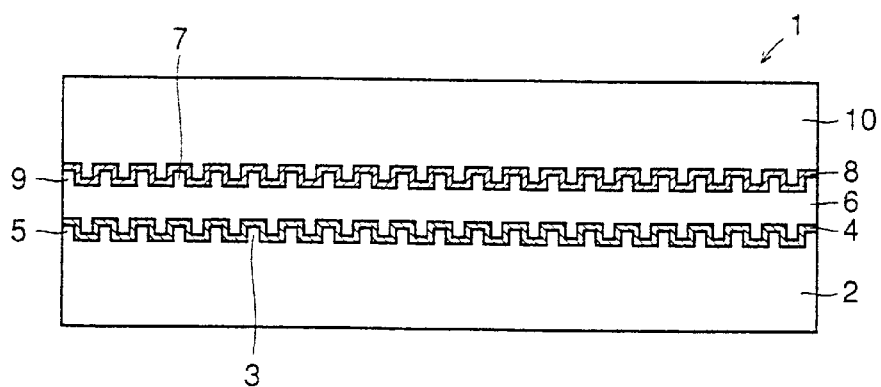
FIG. 2 is a cross section of a structure of a dual layer DVD.

Referring to FIG. 2, a dual layer DVD1 has two signal recording surfaces 5, 9 each located at a position distant from a substrate surface by 0.6 mm (with a tolerance of ±0.05 mm). Dual layer DVD1 is substrates 2 and 10 of e g. transparent polycarbonate and of 0.6 mm in thickness (with a tolerance of ±0.05 mm) that are stuck together with ultraviolet-ray hardened resin 6. Signal recording surface 5 is formed of a pit 3 formed at an inner portion of substrate 2 and a reflecting metal film 4 formed to cover pit 3. Signal recording surface 9 is formed of a pit 7 formed at an inner portion of substrate 10 and a reflecting metal film 8 formed to cover pit 7. Since the ultraviolet-ray hardened resin has a thickness of 40 to 70 μm, signal recording surface 5 is distant from signal recording surface 9 by a distance of 40 to 70 μm.

Figure 3:
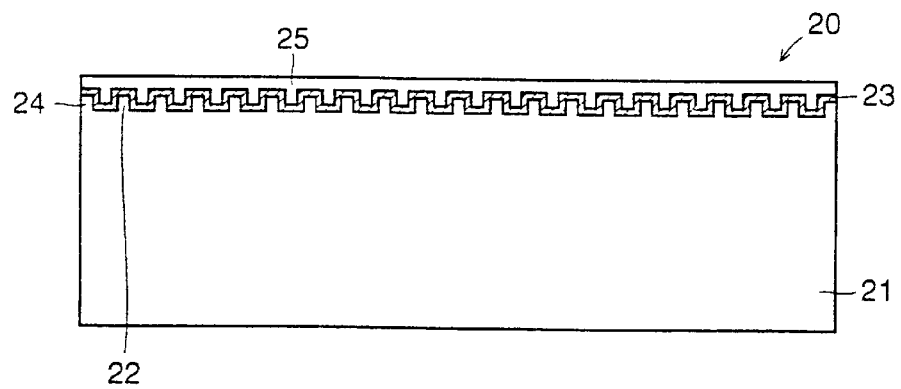
FIG. 3 is a cross section showing a configuration of a CD.

Referring to FIG. 3, a CD20 has a single, signal recording surface 24 distant from a substrate surface by 1.2 mm (with a tolerance of ±0.1 mm). Signal recording surface 24 is formed of a pit 22 formed at one side of a substrate 21 e.g. of transparent polycarbonate, and a reflecting metal film 23 formed to cover pit 22. A protection film 25 is formed on signal recording surface 24.

Table 1 provides the rated values and reproducing conditions for a CD and those for a dual layer DVD.

TABLE 1

| | Type | CD | 2-Layer DVD |
|---|---|---|---|
| Rated Values | Substrate Thickness of Reading-side | 1.2 mm (1.1 to 1.3 mm) | 0.6 mm (0.55 to 0.65 mm) |
| | Minimal Pit Length | 0.90 μm (0.80 to 1.0 μm) | 0.40 μm (0.3 to 0.5 μm) |
| | Track Pitch | 1.6 μm (1.5 to 1.7 μm) | 0.74 μm (0.73 to 0.75 μm) |
| | Reflectance | no less than 70% | 20 to 40% |
| Reproducing Conditions | Spot Diameter | 1.5 μm (1.4 to 1.6 μm) | 0.9 μm (0.85 to 0.95 μm) |
| | Numerical Aperture | 0.35 (0.30 to 0.40) | 0.60 (0.55 to 0.65) |
| | Wavelength | 635 nm (620 to 650 nm) | |

The CD has a substrate thickness of 1.2 mm (with an acceptable range of 1.1 to 1.3 mm) on its signal-reading side, a minimal pit length of 0.90 μm (with an acceptable range of 0.80 to 1.0 μm), a track pitch of 1.6 μm (with an acceptable range of 1.5 to 1.7 μm), and a reflectance of no less than 70%. The dual layer DVD has a substrate thickness of 0.6 mm (with an acceptable range of 0.55 to 0.65 mm) on its signal-reading side, a minimal pit length of 0.40 μm (with an acceptable range of 0.30 to 0.50 μm), a track pitch of 0.74 μm (with an acceptable range of 0.73 to 0.75 μm), and a reflectance of 20 to 40%.

As a reproducing condition a laser beam has a wavelength of 635 nm (with an acceptable range of 620 to 650 nm). Also as reproducing conditions for the CD, the laser beam has a spot diameter of 1.5 μm (with an acceptable range of 1.4 to 1.6 μm) and an objective lens has a numerical aperture of 0.35 (with an acceptable range of 0.30 to 0.40). As reproducing conditions for the dual layer DVD, the laser beam has a spot diameter of 0.9 μm (with an acceptable range of 0.8 to 0.95 µm) and an objective lens has a numerical aperture of 0.60 (with an acceptable range of 0.55 to 0.65).

Figure 4:
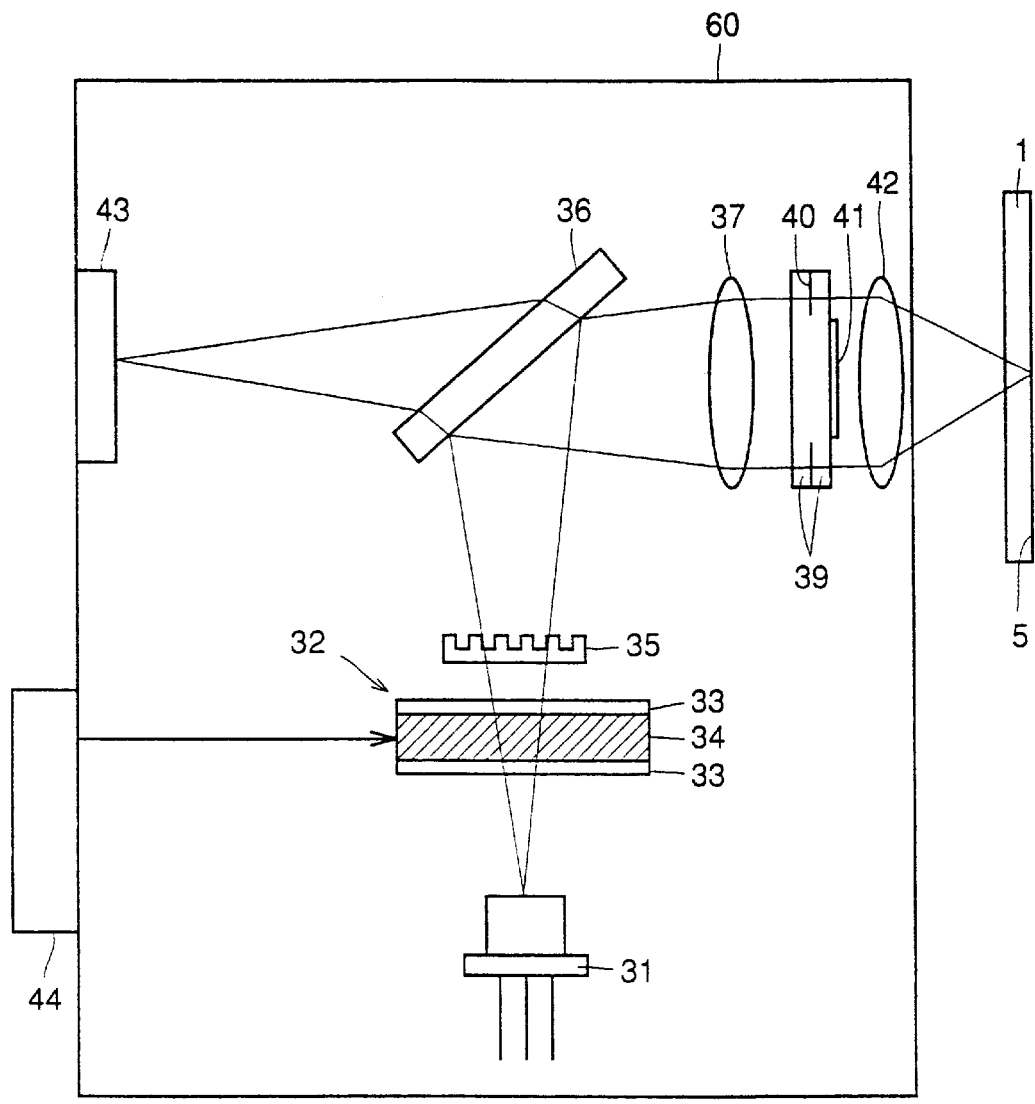
FIG. 4 shows a configuration of an optical pickup capable of interchangeably reproducing the information recorded on optical disks having different substrate thicknesses.
Figure 5:
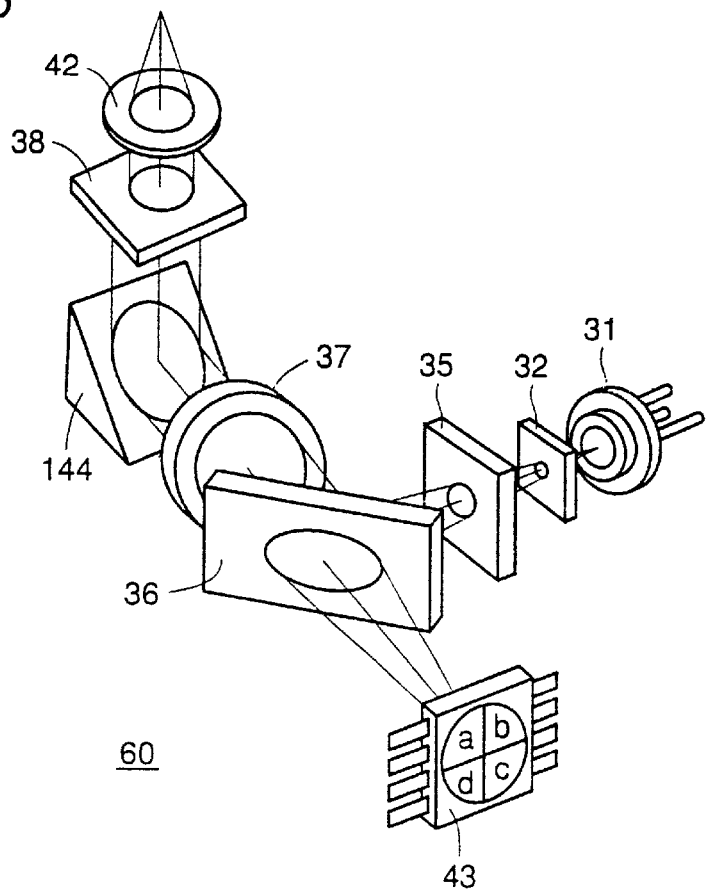
FIG. 5 is a perspective view of the configuration of the FIG. 4 optical pickup.

FIGS. 4 and 5 shows a configuration of an optical pickup capable of interchangeable reproduction from the CD and the dual layer DVD. Referring to FIGS. 4 and 5, an optical pickup 60 includes a semiconductor laser 31 generating a laser beam of 635 nm in wavelength, a polarization-plane rotating element 32 rotating a plane of polarization of the laser beam, a diffraction grating 35, a beam splitter 36, a collimator lens 37, a polarization selecting element 38 selectively blocking the laser beam, an objective lens 42 and a photo detector 43. The laser beam from semiconductor laser 31 reaches beam splitter 36 via polarization-plane rotating element 32 and diffraction grating 35. Half of the laser beam is reflected from beam splitter 36, collimated by collimator lens 37, transmitted through polarization selecting element 38 condensed by objective lens 42 and passed through a substrate of an optical disk to illuminate signal recording surface 5. The laser beam reflected from signal recording surface 5 returns via objective lens 42, polarization selecting element 38 and collimator lens 37 to beam splitter 36 which transmits half of the reflected laser beam. The transmitted laser beam is condensed at and detected by photo detector 43.

Photo detector 43 is divided into four light-receiving surfaces a to d, and a+b+c+d is output as a reproduced signal and (a+c)−(b+d) is output as a focusing error signal.

Objective lens 42 is designed to be capable of condense light on a signal recording surface of an optical disk having a substrate thickness of 0.6 mm and has a numerical aperture of 0.6 (with an acceptable range of 0.55 to 0.65). Polarization-plane rotating element 32 is TN-type liquid crystal 34 posed between two pieces of glass 33 each having a transparent electrode. When voltage is applied to the transparent electrodes, voltage is applied to TN-type liquid crystal 34 so that a laser beam is transmitted through TN-type liquid crystal 34 without a plane of polarization thereof rotated. When voltage is not applied to the transparent electrodes, the laser beam is transmitted through TN-type liquid crystal 34 with a plane of polarization thereof rotated.

Figure 6:
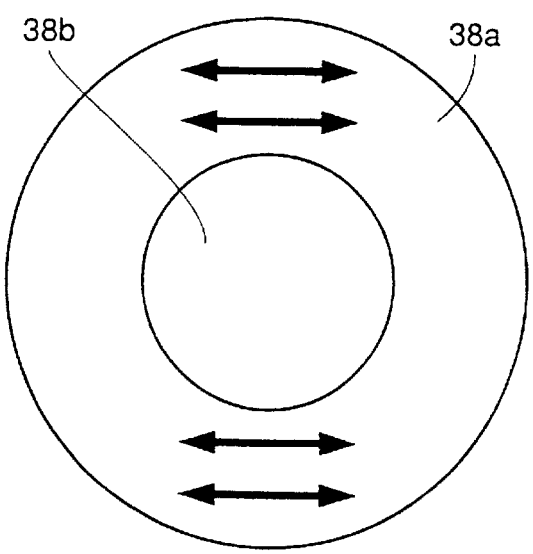
FIG. 6 is a plan view showing a polarization characteristic of a polarization selecting element shown in FIG. 5.

Polarization selecting element 38 is structured such that two pieces of glass 39 sandwich a polarizing filter 40 provided at a portion corresponding to an outer perimeter of the laser beam, with a filter 41 which does not present any polarization characteristic provided at a portion corresponding to a center of the laser beam. Polarizing filter 40 has a characteristic to only transmit a laser beam provided in a predetermined polarization direction and in FIG. 4 only transmits a laser beam polarized in a direction parallel to the plane of the drawing. Thus, polarization selecting element 38 has such a characteristic as shown in FIG. 6. More specifically, an outer periphery 38a of polarization selecting element 38 allows polarizing filter 40 to only transmit a laser beam polarized in a direction which is horizontal on the figure and a center 38b to transmit a laser beam regardless of the polarization direction of the laser beam. Polarizing filter 40, which transmits a laser beam polarized in the horizontal direction, has a transmissitivity of approximately 70 to 90%. If center 38b is not provided with any kind of filter, the transmissitivity of the laser beam varies between the center and the outer periphery and this will be a cause to degrade reproduction characteristics. It is thus necessary to provide filter 41 at the center of polarization selecting element 38.

A reproduction operation will now be described with respect to a dual layer DVD having a substrate thickness of 0.6 mm on the signal-reading side. In reproducing information from the dual layer DVD, a liquid crystal drive circuit 44 applies voltage to polarization-plane rotating element 32. Thus, the laser beam from semiconductor laser 31 that has the wavelength of 635 nm and is polarized in a direction parallel to the plane of the drawing is transmitted through polarization-plane rotating element 32, without a plane of polarization thereof rotated. The transmitted laser beam is incident on beam splitter 36 via diffraction grating 35. Half of the incident laser beam is reflected by beam splitter 36, collimated by collimator lens 37, entirely transmitted without its outer periphery blocked by polarization selecting element 38, condensed by objective lens 42 and passed through substrate 2 of dual layer DVD1 to illuminate signal recording surface 5. The laser beam illuminating signal recording surface 5 has a spot diameter of 0.9 µm (with an acceptable range of 0.80 to 1.0 µm). The subsequent operation is as described with reference to FIG. 4 and the description thereof will not be repeated.

A reproduction operation will now be described with respect to a CD having a substrate thickness of 1.2 mm on its signal-reading side. In reproducing information from the CD, voltage is not applied to polarization-plane rotating element 32. Thus, the laser beam from semiconductor laser 31 that has the wavelength of 635 nm and is polarized in a direction parallel to the plane of the drawing is transmitted through polarization-plane rotating element 32, with a plane of polarization thereof rotated by 90°, and is thus incident on beam splitter 36 via the diffraction grating. Half of the incident laser beam is reflected by beam splitter 36 and collimated by collimator lens. The collimated laser beam has its outer periphery blocked by polarization selecting element 38 and is then condensed by objective lens 42 and passed through substrate 21 of CD 20 to illuminate signal recording surface 24. Center 38b of polarization selecting element 38 is adapted to have a diameter of 2.3 mm (with a tolerance of ±0.2 mm) so that an objective lens with a numerical aperture of 0.6 (with an acceptable range of 0.55 to 0.65) and with an effective luminous-flux diameter of 4 mm has an effective numerical aperture of 0.35 (with an acceptable range of 0.30 to 0.40). For an objective lens with an effective luminous-flux diameter of other than 4 mm, the diameter of center 38b of polarization selecting element 38 is proportionally determined so that the objective lens has the effective numerical aperture of 0.35. The laser beam illuminating-signal recording surface 24 has a spot diameter of 1.5 µm (with an acceptable range of 1.4 to 1.6 µm). The subsequent operation is similar to that described with reference to FIG. 4 and the description thereof will not be repeated.

Figure 7:
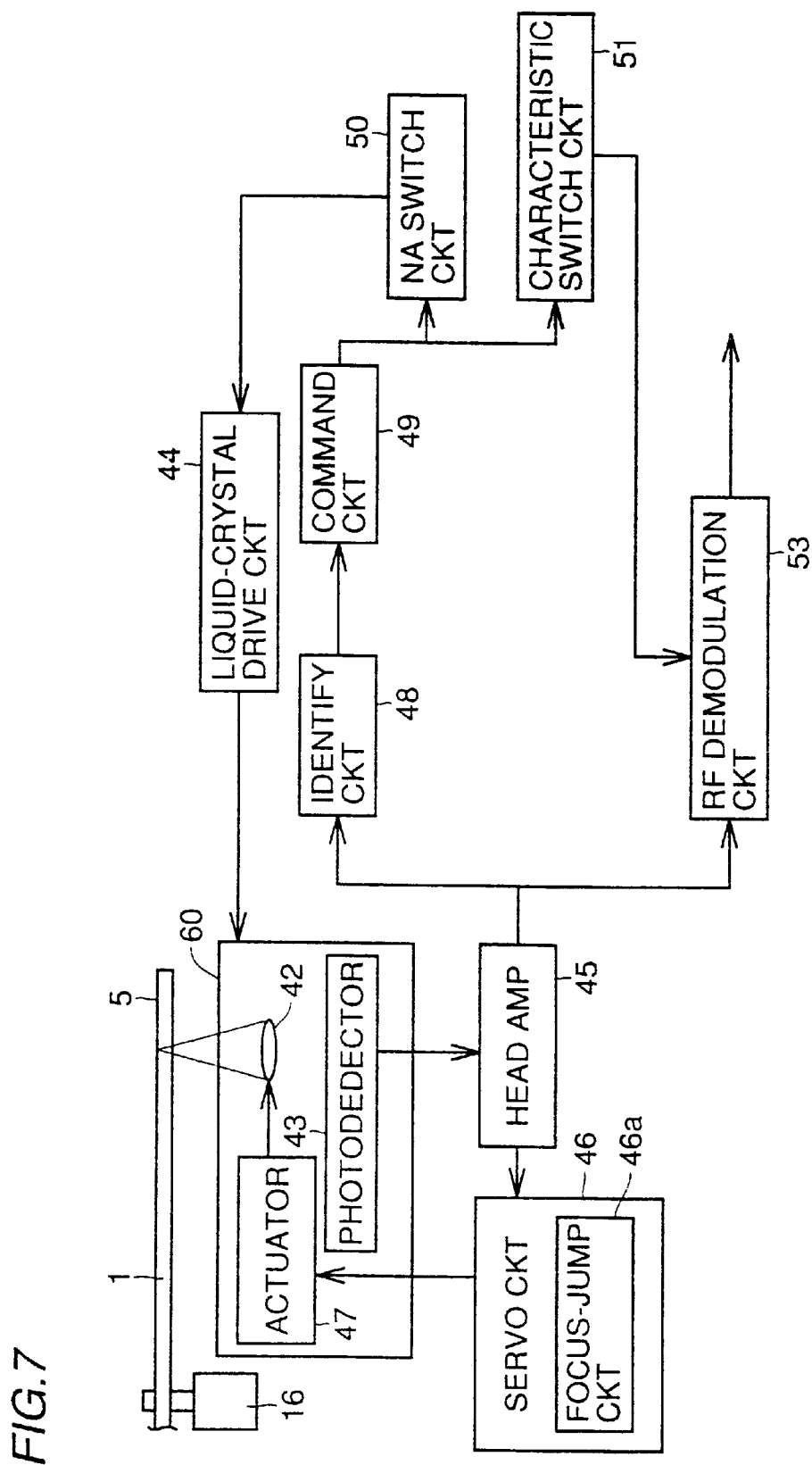
FIG. 7 is a block diagram showing a general configuration of an optical disk device including the optical pickup shown in FIGS. 4 and 5.

Reference is now made to FIG. 7 to describe an optical disk device capable of interchangeable information reproduction from optical disks different in substrate thickness. An optical lens 42 in an optical pickup 60 is controlled by an actuator 47 to condense a laser beam on a track on which signals to be reproduced are formed as a train of pits. The laser beam condensed by objective lens 42 illuminates signal recording surface 5 via substrate 2 of an optical disk. The laser beam reflected from signal recording surface 5 is detected by a photo detector 43 as a reproduced signal. The reproduced signal detected by photo detector 43 is sent to a head amp 45 and amplified as predetermined and then sent to an identify circuit 48, an RF demodulation circuit 53 and a servo circuit 46. Servo circuit 46 controls actuator 47 in response to a tracking error signal transmitted thereto. Identify circuit 48 identifies the type of an optical disk mounted on a reproduction device depending on a transmitted signal and transmits the identification to a command circuit 49. Command circuit 49 issues a command to an NA switch circuit depending on the sent identification, to switch and adapt the objective lens 42 numerical aperture to the identified optical disk. Command circuit 49 also issues a command to a characteristic switching circuit 51 depending on the sent identification, to switch the demodulation circuit so that it is adapted to reproduction of information from the identified optical disk. NA switch circuit 50 switches the effective numerical aperture of objective lens 42 via liquid crystal drive circuit 44, and characteristic switching circuit 51 switches RF demodulation circuit 53.

Figure 8:
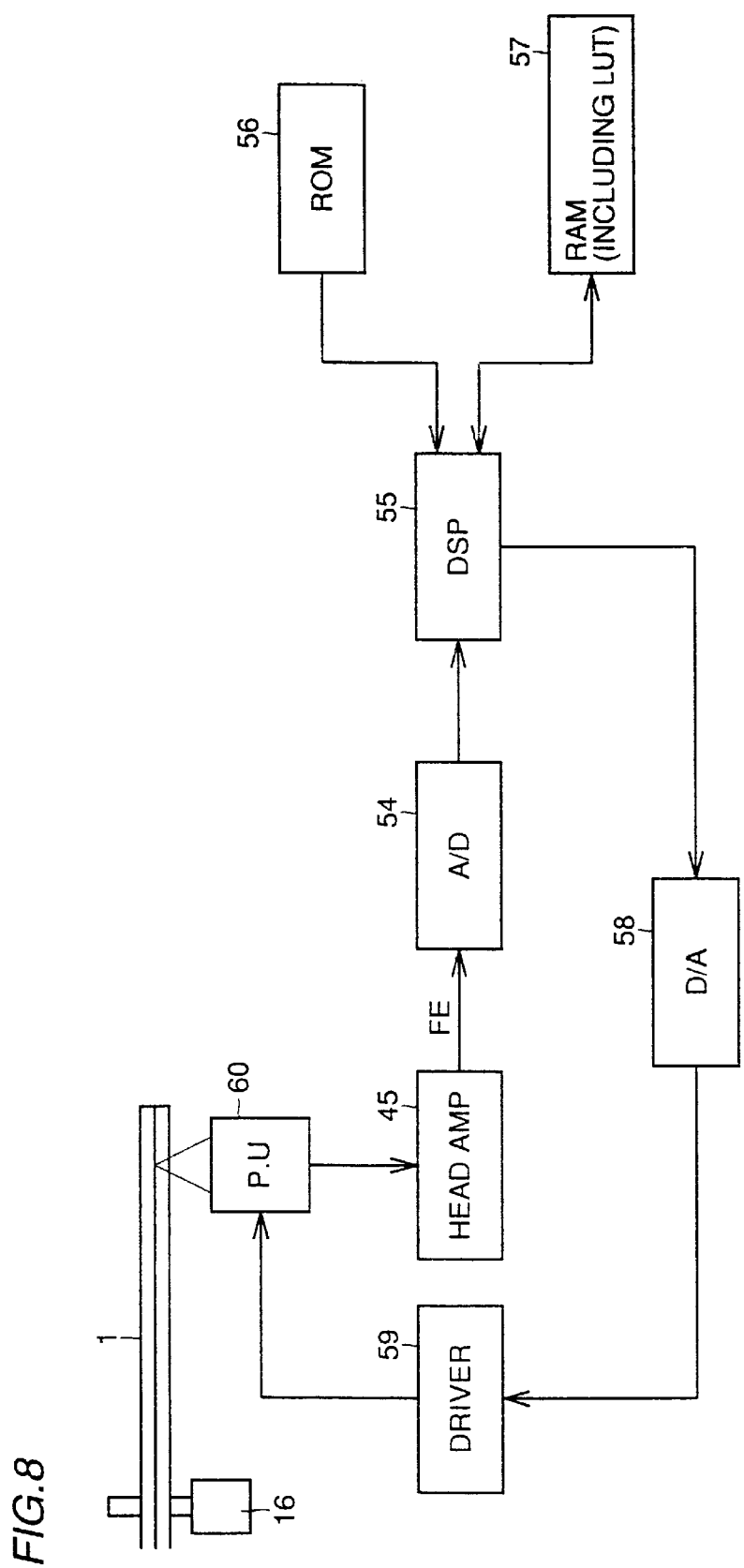
FIG. 8 is a block diagram showing a configuration of an optical disk device according to a first embodiment of the present invention.

FIG. 8 is a block diagram showing a general configuration of the optical disk device in accordance with the first embodiment, focusing on a focus jump circuit 46a in servo circuit 46 shown in FIG. 7. Referring to FIG. 8, focus jump circuit 46a is provided with an A/D converting portion 54 which AD-converts a signal output from head amp 45, a digital signal processor (DSP) 55 which processes a signal output from A/D converting portion 54 according to a predetermined program, a read only memory (ROM) 56 storing a program and the like for operating DSP 55, a random access memory (RAM) 57 for storing a lookup table and the like formed in and used by DSP 55, a D/A converting portion 58 which DA-converts a signal output from DSP 55, and a driver 59 which drives actuator 47 in optical pickup 60 in response to a signal output from D/A converting portion 58.

Figure 9:
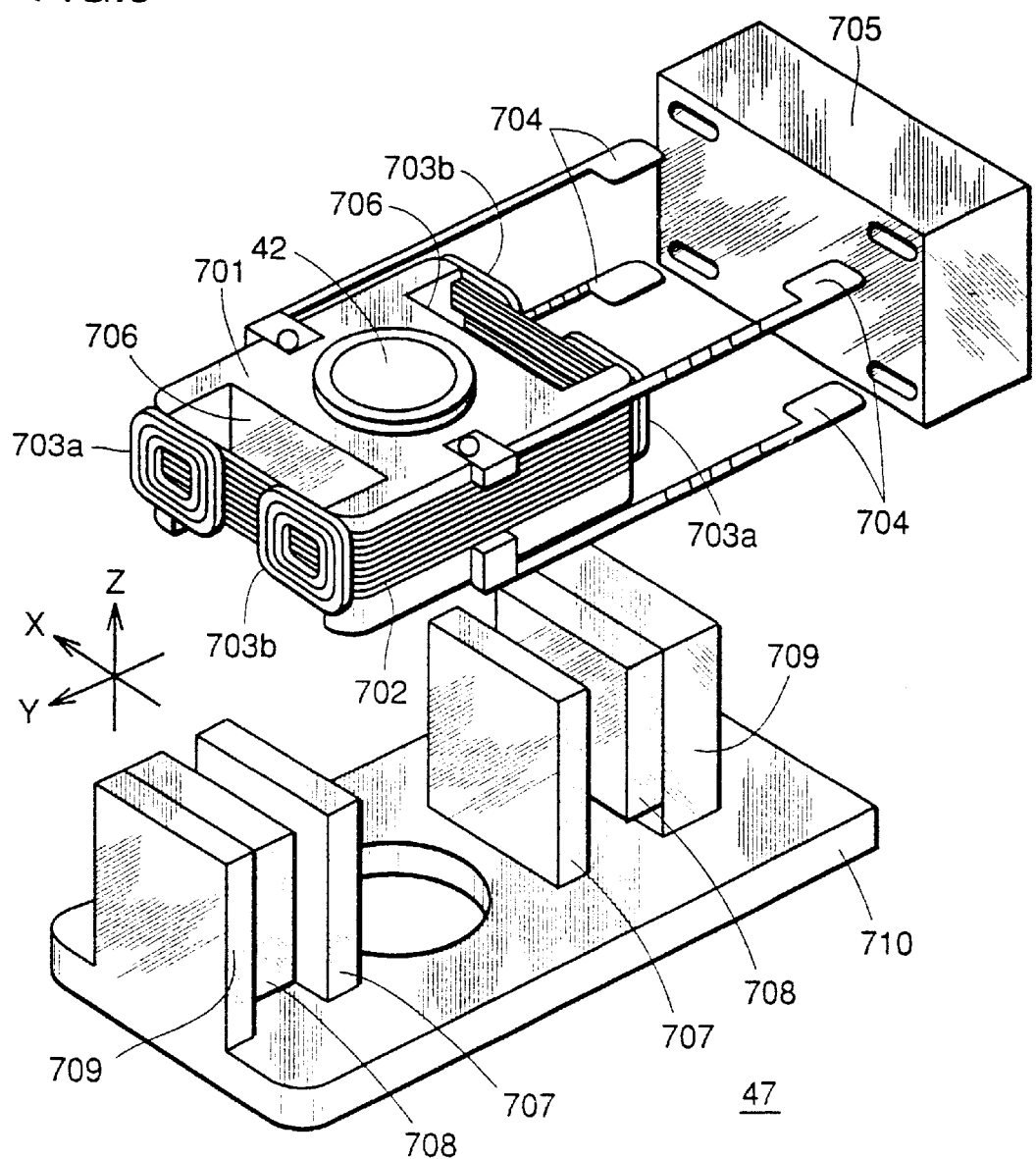
FIG. 9 is an exploded, perspective view showing a configuration of an actuator shown in FIG. 7.

As shown in FIG. 9, actuator 47 includes a lens holder 701 which holds objective lens 42, a focus coil 702 wound around lens holder 701, tracking coils 703a and 703b mounted on both end surfaces of focus coil 702 in the Y direction, four spring plates 704 mounted on both end surfaces of lens holder 701 in the X direction, a fix 705 which supports spring plates 704, a yoke 707 inserted in each of two recessed portions 706 of lens holder 701, a permanent magnet 708 providing a magnetic field perpendicular to focus coil 702 and tracking coils 703a and 703b, a yoke 709 which supports permanent magnet 708, and a yoke base 710 which supports yokes 707 and 709.

Driver 59 shown in FIG. 8 responds to a focusing error signal to generate a focusing drive voltage which is applied to focus coil 702. Thus, lens holder 701 is moved in the Z direction (or the direction of the optical axis) to focus a laser beam on either the first recording layer 5 or the second recording layer 9 of a dual layer optical disk. Driver 59 also responds to a tracking error signal TE to generate a tracking drive voltage which is applied to tracking coils 703a, 703b. Thus, lens holder 701 is moved in the X or tracking direction to allow a laser beam to always illuminate a track of optical disk 1.

Figure 10:
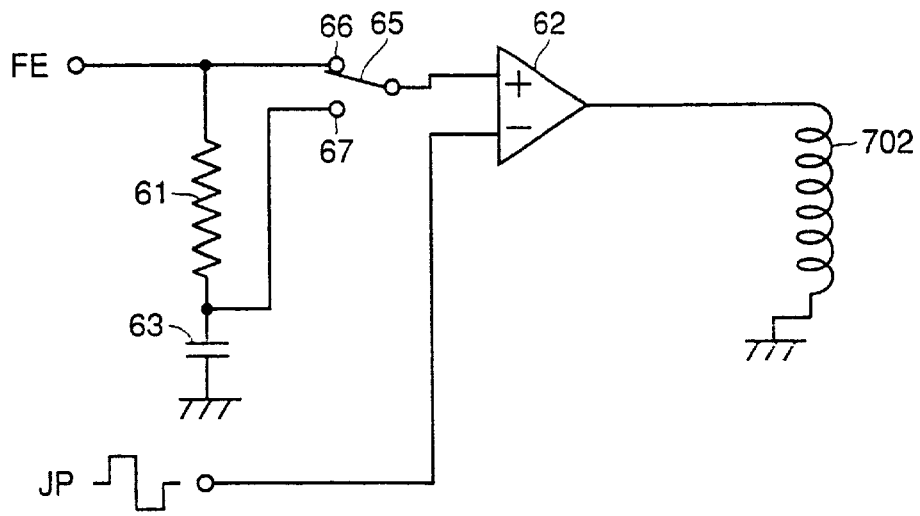
FIG. 10 is a circuit diagram representing a focus-jump circuit shown in FIG. 7.

As shown in FIG. 10, driver 59 includes a resistor 61 a capacitor 63, a switch 65 and an amplifier 62. To provide focusing servo control, switch 65 is set at a terminal 66 and focusing error signal FE is provided directly to amplifier 62 via a non-inverting input terminal. In response to focusing error signal FE, amplifier 62 supplies the focusing drive voltage to focus coil 702 to allow actuator 47 to move objective lens 42 in the Z direction. To provide focus-jumping, switch 65 is set at a terminal 67 to allow the voltage at a connection node between resistor 61 and capacitor 63 to be provided to amplifier 62 at the non-inverting input terminal. Simultaneously, a focus-jump instruction signal JP to provide focus-jumping is provided to amplifier 62 at an inverting, input terminal.

Figure 11:
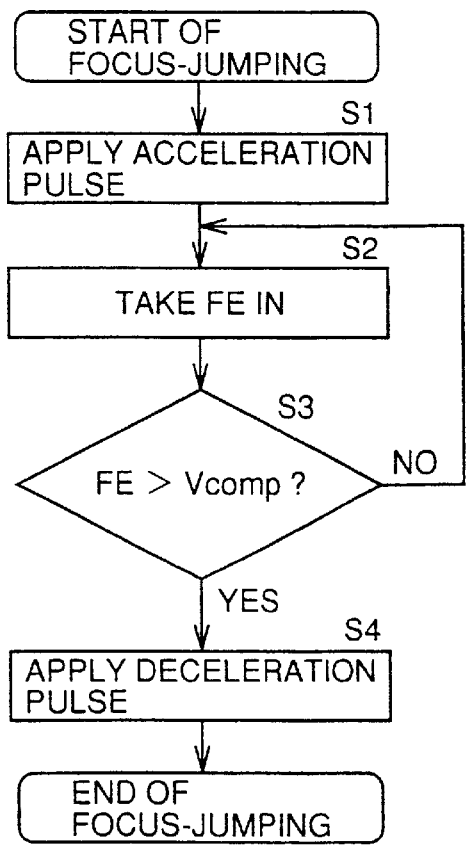
FIG. 11 is a flow chart of an exemplary program stored in a ROM shown in FIG. 8.

In ROM 56 shown in FIG. 8 is stored such a focus-jumping routine program as shown in FIG 11.

A focus-jump operation in accordance with the first embodiment will now be described with reference to FIGS. 11 and 12A–12C.

When an optical disk is mounted on a reproduction device, focusing servo and tracking servo are operated and the optical disk is then rotated at a predetermined rotation rate to reproduce a signal from the optical disk. The optical disk may not be rotated at the predetermined rotation rate after focusing servo and tracking servo are operated. The rotation of the optical disk may be started after focusing servo is operated. For reproducing information from a dual layer DVD, a laser beam is focused on either of signal recording surfaces 5 and 9, e.g. signal recording surface 5, to reproduce a signal. If a signal is to be reproduced from signal recording surface 9 during the signal reproduction from signal recording surfaced, it is necessary to provide focus-jumping from signal recording surface 5 to signal recording surface 9 and operate focusing servo to refocus the laser beam on signal recording surface 9. The focus jumping is effected by controlling actuator 47 via focus jump circuit 46a in servo circuit 46 shown in FIG. 7.

Figure 12A:
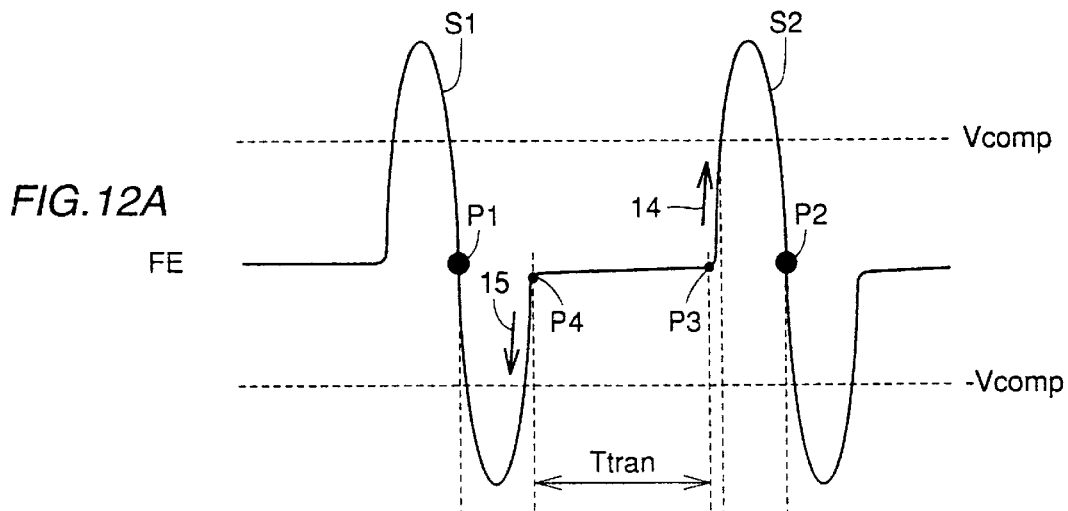
FIGS. 12A–12C are waveform diagrams representing a focusing error signal, an acceleration pulse and a deceleration pulse when the FIG. 8 DSP operates according to the FIG. 11 flow chart.
Figure 12B:
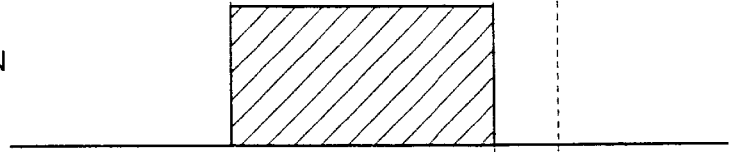

When objective lens 42 is moved in a direction normal to a signal recording surface, focusing error signal FE generally shaped like the letter S is generated, as shown in FIG. 12A. P1 and P2 in FIG. 12A represent the respective focal points of recording surfaces 5 and 9. Signal recording surface 5 can provide such a focusing error signal as denoted by S1, and signal recording surface 9 can provide such a focusing error signal as denoted by S2. During reproduction of information from signal recording surface 5, objective lens 42 is positioned at focal point P1. To effect focus-jumping from signal recording surface 5 to signal recording surface 9, such an acceleration pulse as represented in FIG. 12B is applied to actuator 47. When objective lens 42 reaches a point P3, focusing error signal FE as denoted by S2 is obtained.

Conventionally, objective lens 42 is controlled to be decelerated when it reaches point P3 and to stop at focal point P2 of signal recording surface 9. However, a transition period Ttran represented in FIG. 12A includes such noise as represented in FIG. 1. Thus, while objective lens 42 is accelerated to be moved from signal recording surface 5 to signal recording surface 9, it is not clear when to decelerate objective lens 42. Thus it is difficult to stop objective lens 42 at focal point P2.

Figure 12C:
Figure 13:
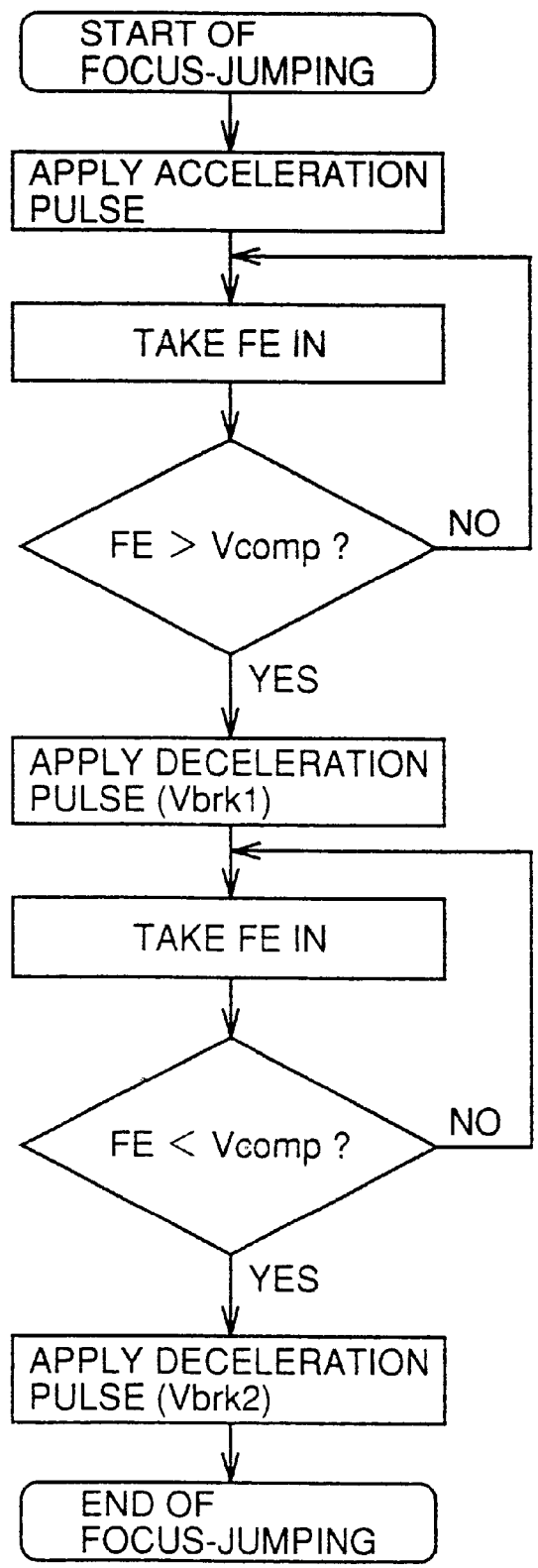
FIG. 13 is a flow chart representing another exemplary program stored in the FIG. 8 ROM.
Figure 14A:
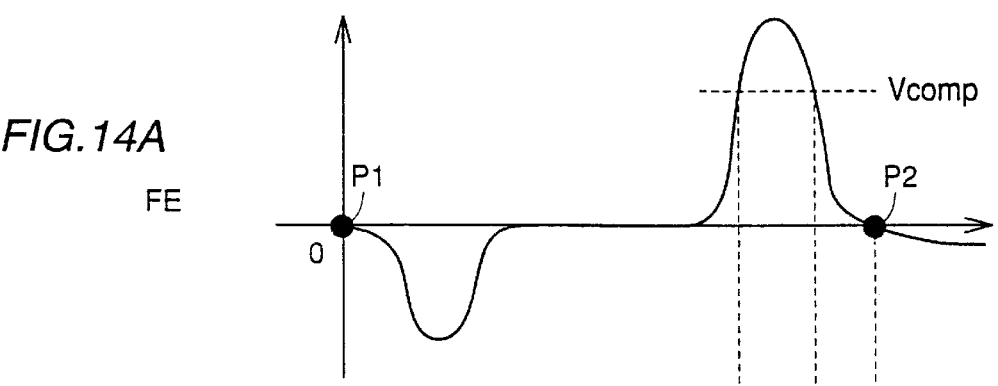
FIGS. 14A–14C are waveform diagrams representing a focusing error signal, an acceleration pulse and a deceleration pulse when the FIG. 8 DSP operates according to the FIG. 13 flow chart.
Figure 14B:
Figure 14C:
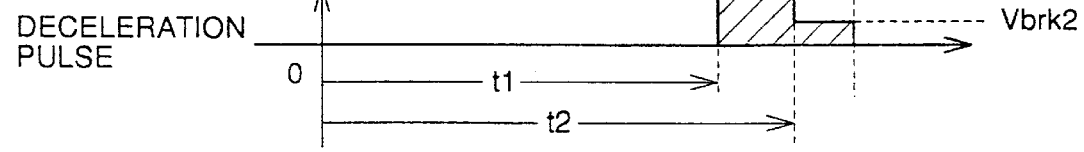
Figure 15:
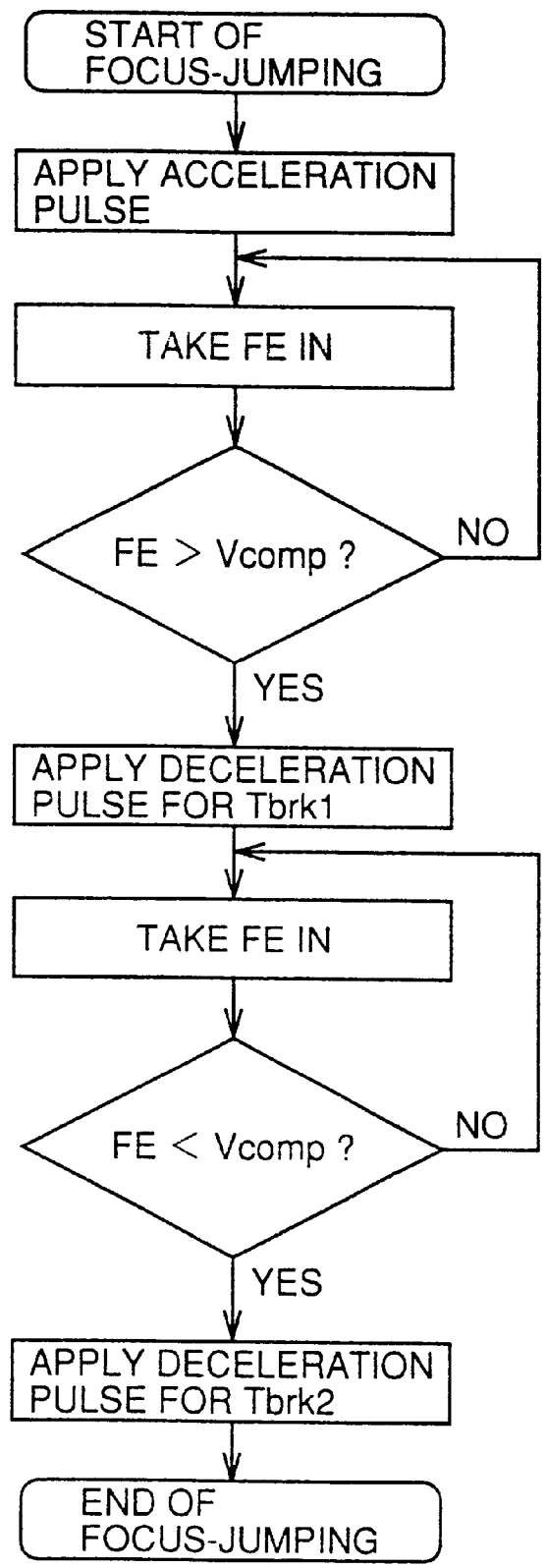
FIG. 15 is a flow chart representing still another exemplary program stored in the FIG. 8 ROM.
Figure 16A:
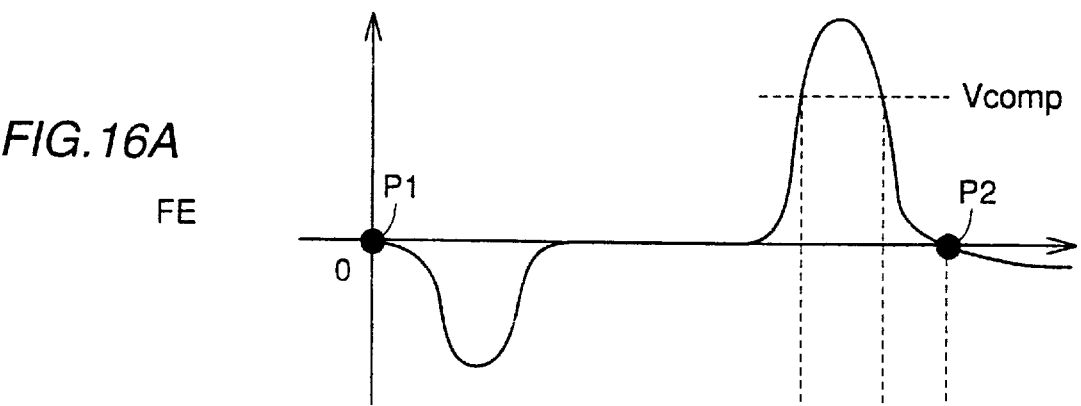
FIGS. 16A–16C are waveform diagrams representing a focusing error signal, an acceleration pulse and a deceleration pulse when the FIG. 8 DSP operates according to the FIG. 15 flow chart.
Figure 16B:
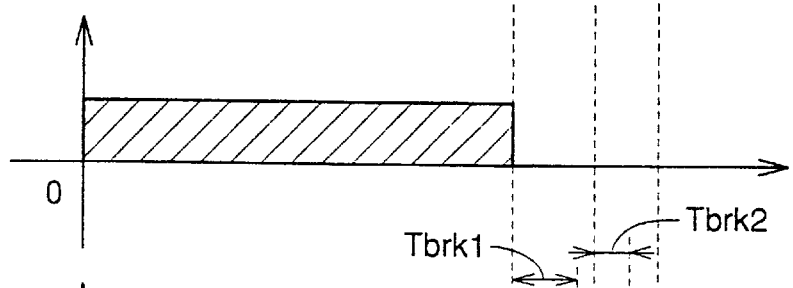
Figure 16C:
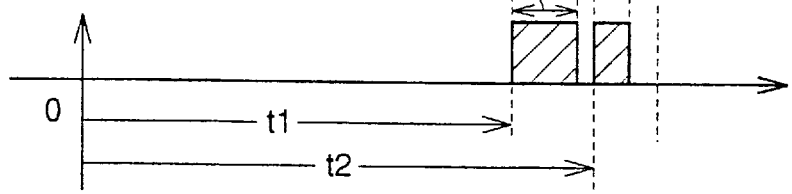

In accordance with the first embodiment, when objective lens 42 is located between points P2 and P3 of focusing error signal FE such an acceleration pulse as represented in FIG. 12B is applied (S1). Thus, objective lens 42 starts to move from focal point P1 towards focal point P2 while focusing error signal FE is taken into DSP 55 (S2). In DSP 55, focusing error signal FE taken into is compared to a predetermined threshold value Vcomp (S3). When focusing error signal FE is greater than threshold value Vcomp, such a deceleration pulse as represented in FIG. 12C is applied (S4). It should be noted that threshold value Vcomp is set between the 0 level and peak level of focusing error signal FE. Thus, objective lens 42 is decelerated between point P3 at which focusing error signal FE from signal recording surface 9 is first observed and focal point P2. Focusing servo is resumed after objective lens 42 reaches focal point P2.

It should be noted that while the application of the deceleration pulse herein is started during the period in which focusing error signal FE at point P3 reaches a peak, the application of the deceleration pulse may be started during the period from the peak to point P2. The amount of current supplied to focus coil 702 is varied depending on the point at which the deceleration pulse is applied. More specifically, a larger amount of current is required when the application of the deceleration pulse is started at a point closer to focal point P2. Focus-jumping from signal recording surface 9 to signal recording surface 5 is similar to the focus-jumping from signal recording surface 5 to signal recording surface 9, as described above.

To clearly control when to apply the acceleration pulse, the deceleration pulse may be applied depending on a threshold value set with respect to a peak-value difference of focusing error signal FE. It should be noted that threshold values Vcomp and -Vcomp are herein set within a range of 0 to 100% of the peak-value difference of focusing error signal FE. For focusing-jumping from signal recording surface 5 to signal recording surface 9, threshold value Vcomp is employed to apply a deceleration pulse when the level of focusing error signal FE at point P3 moves in the direction of an arrow 14 and thus exceeds threshold value Vcomp. Threshold value -Vcomp is employed for focus-jumping from signal recording surface 9 to signal recording surface 5. In this case, focus-jumping is effected when objective lens 42 is positioned at focal point P2. Thus objective lens 42 moves to a point P4 of focusing error signal S1 obtained from signal recording surface 5. Then the level of focusing error signal FE moves in the direction of an arrow 15. A deceleration pulse is applied when threshold value -Vcomp is exceeded. It should be noted that threshold values Vcomp and -Vcomp are set after measuring a peak-value difference of the focusing error signal.

The voltage of the deceleration pulse may be determined depending on the time period from the initiation of focus-jumping until focusing error signal FE attains threshold value Vcomp. For example, for moving objective lens 42 from focal point P1 towards focal point P2, the voltage of the deceleration pulse is determined depending on a previously counted time period from the initiation of focus-jumping until focusing error signal FE attains threshold value Vcomp for the first time and that from the initiation of focus-jumping until focusing error signal FE attains threshold value Vcomp for the second time.

Referring to FIGS. 13 and 14A–14C, when the acceleration pulse is applied with objective lens 42 positioned at focal point P1, objective lens 42 moves towards focal point P2. When focusing error signal FE attains threshold value Vcomp, a deceleration pulse is applied having a voltage Vbrk1 depending on a time t1. When focusing error signal FE exceeds and again attains threshold value Vcomp, a deceleration pulse is applied having a voltage Vbrk2 depending on a time t2. Voltage Vbrk2 applied second is set to be smaller than voltage Vbrk1 applied first. Voltages Vbrk1 and Vbrk2 fall in a range of one to two V. This system can be similarly applied to focus-jumping from signal recording surface 9 to signal recording surface 5.

While voltage Vbrk1 or Vbrk2 of the deceleration pulse is determined depending on time period t1 or t2 from application of an acceleration pulse until focusing error signal FE attains threshold value Vcomp, the application time of the deceleration pulse may be determined depending on time t1 or time t2.

Referring to FIGS. 15 and 16A–16C, when an acceleration pulse is applied with objective lens 42 positioned at focal point P1, objective lens 42 moves towards focal point P2. When focusing error signal FE exceeds threshold value Vcomp, a deceleration pulse is applied for a time Tbrk1 depending on time t1. When focusing error signal FE exceeds and again attains threshold value Comp, a deceleration pulse is applied for a time Tbrk2 depending on time t2. Application time Tbrk2 of the deceleration pulse applied second is set to be shorter than application time Tbrk1 of the deceleration pulse applied first. Application times Tbrk1 and Tbrk2 are in the order of one millisecond. This system can be similarly applied to focus-jumping from signal recording surface 9 to signal recording surface 5.

Setting a threshold value and applying a deceleration pulse as described above allows the determination as to from which signal recording surface focus-jumping has been effected. More specifically, if a deceleration pulse is applied when focusing error signal FE exceeds threshold value Vcomp, determination can be made that focus-jumping is effected from signal recording surface 5 to signal recording surface 9. If a deceleration pulse is applied when focusing error signal FE exceeds threshold value -Vcomp, determination can be made that focus-jumping is effected from signal recording surface 9 to signal recording surface 5.

While the above description is provided with respect to a dual layer DVD having two signal recording surfaces, the present invention is not limited thereto and is applicable to a DVD having more than two signal recording surfaces.

According to the first embodiment, in an optical disk reproduction device capable of interchangeable information reproduction from a CD and a dual layer DVD an acceleration pulse applied when a focusing error signal attains a predetermined threshold value allows accurate focus-jumping.

According to the first embodiment, a deceleration pulse is applied when focusing error signal FE attains predetermined threshold value Vcomp. Alternatively, time period t1 or t2 from application of an acceleration pulse until focusing error signal FE attains predetermined threshold value Vcomp may be previously counted to apply a deceleration pulse when counted time t1 or t2 has elapsed since application of an acceleration pulse in effecting focus-jumping.

Figure 17:
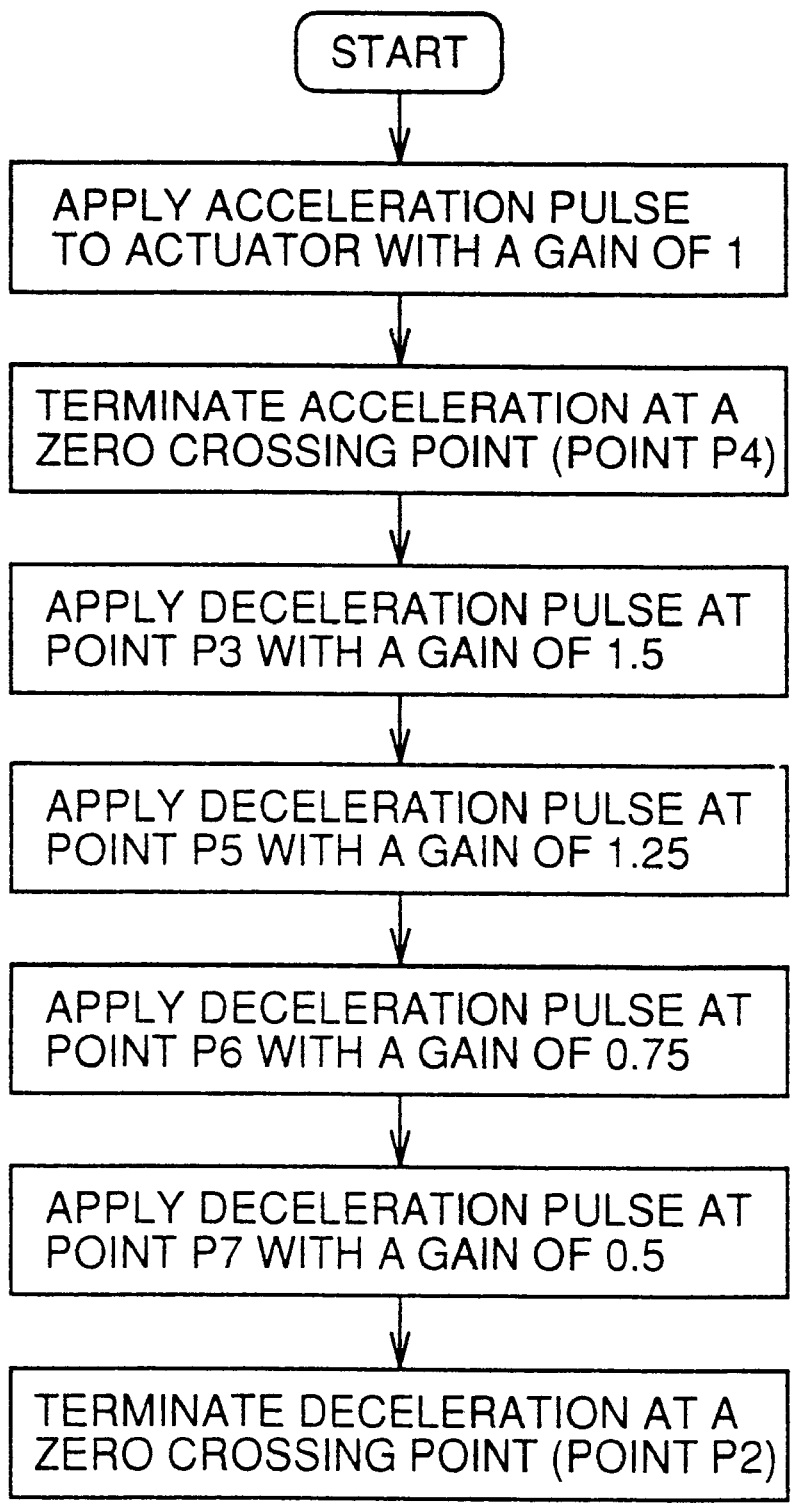
FIG. 17 is a flow chart representing still another exemplary program stored in the FIG. 8 ROM.
Figure 18A:
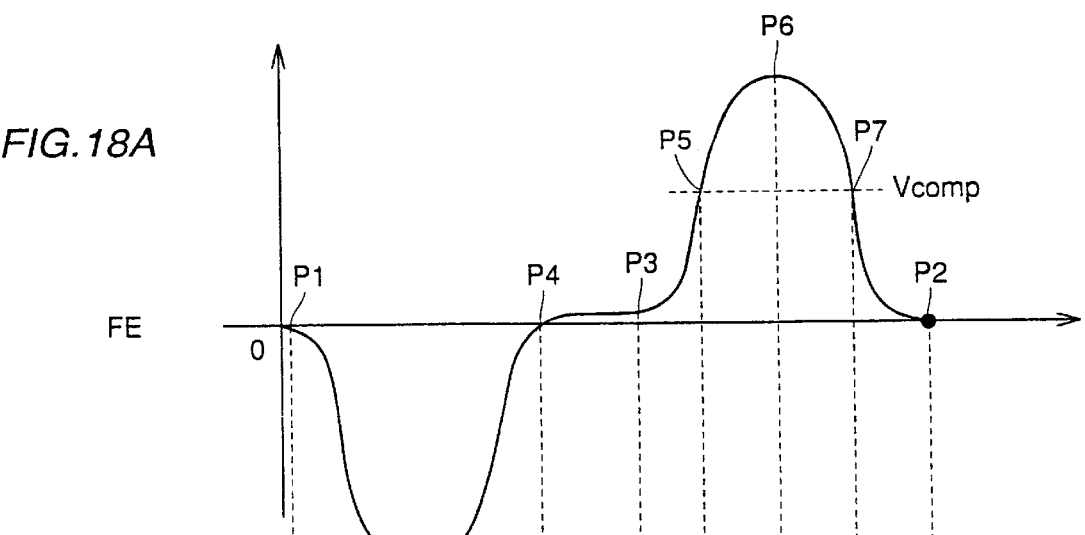
FIGS. 18A–18D are waveform diagrams representing a focusing error signal, an acceleration pulse, a deceleration pulse and a speed of an objective lens when the FIG. 8 DSP operates according to the FIG. 17 flow chart.
Figure 18B:
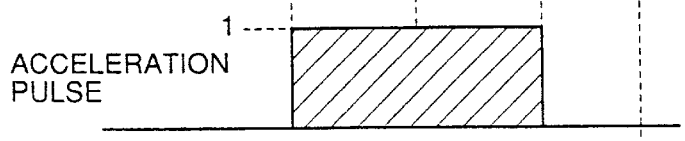
Figure 18C:
Figure 18D:
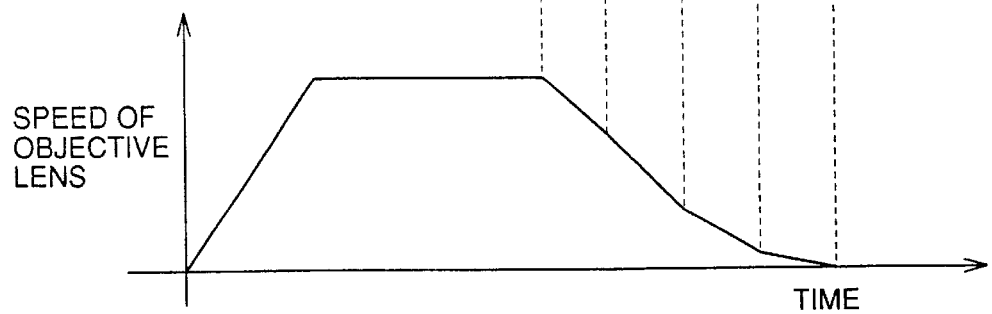

In addition to the program described above, the program represented by the FIG. 17 flow chart may be stored in ROM 56.

Referring to FIGS. 17 and 18A–18D, in focus-jumping from focal point P1 to focal point P2 an acceleration pulse with a gain of one is initially applied to actuator 47 to rapidly accelerate objective lens 42. The application of the acceleration pulse is terminated when focusing error signal FE reaches a zero crossing point (i.e. point P4).

Then, when focusing error signal FE starts to rapidly increase at point P3 a deceleration pulse with a gain of 1.5 is applied to rapidly decelerate objective lens 42. Then, when focusing error signal FE reaches threshold value Vcomp (i.e. point P5), the gain of the deceleration pulse is reduced to 1.25. Then, when focusing error signal FE reaches a peak (i.e. point P6), the gain of the deceleration pulse is further reduced to 0.75. Then, when focusing error signal FE again attains threshold value Vcomp (i.e. point P7), the gain of the deceleration pulse is further reduced to 0.5. Finely, when focusing error signal FE reaches a zero crossing point (i.e. point P2), the application of the deceleration pulse is terminated.

The gain corresponding to each point and threshold value Vcomp are stored in RAM 57 shown in FIG. 8.

Since a deceleration pulse larger in voltage than an acceleration pulse is initially applied and the voltage of the deceleration pulse is then reduced gradually, objective lens 42 is initially decelerated rapidly and then approaches a focal point gradually. As a result, the time required for focus-jumping can be reduced and objective lens 42 reliably converges at the focal point.

Figure 19:
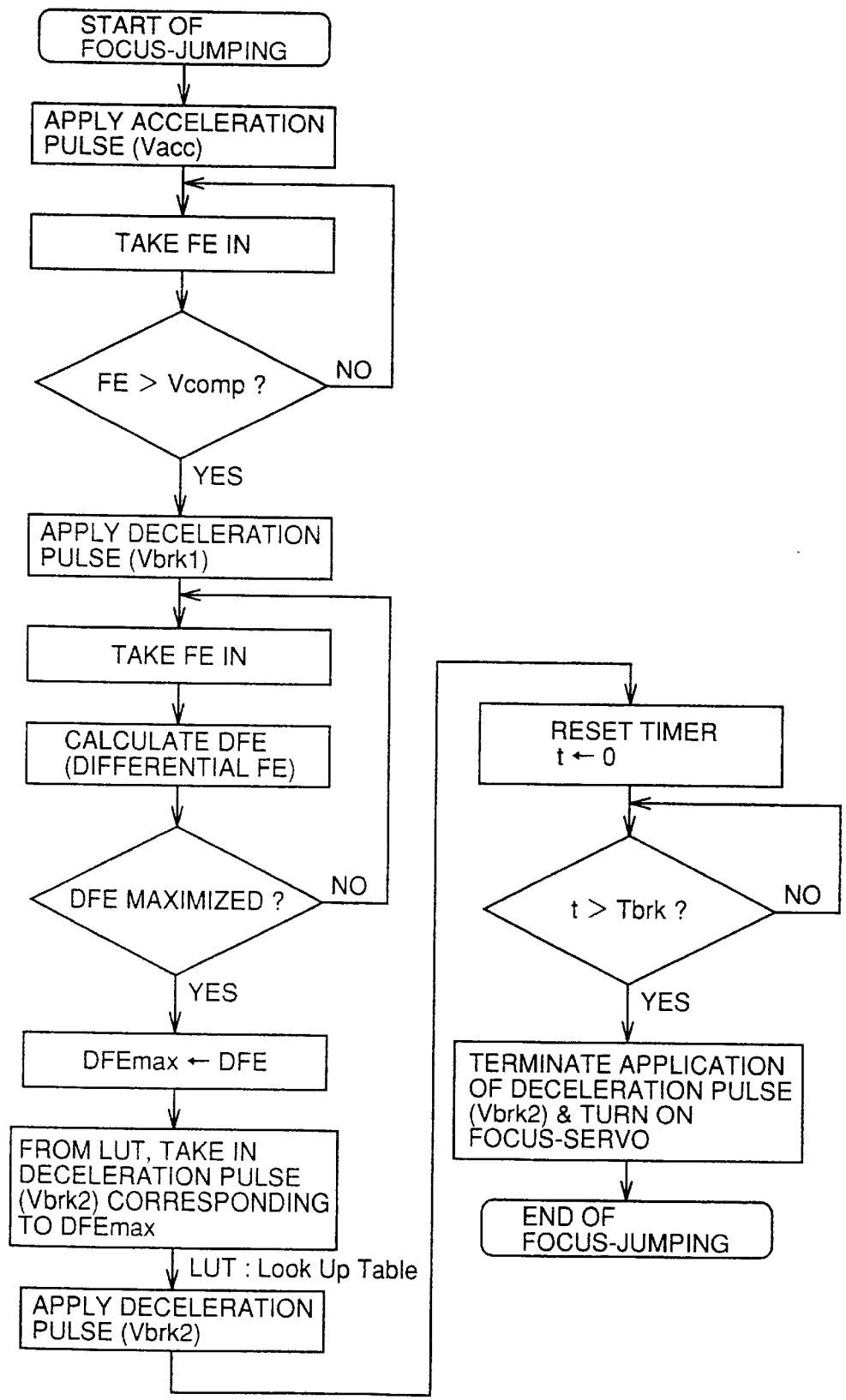
FIG. 19 is a flow chart representing still another exemplary program stored in the FIG. 8 ROM.
Figure 20:
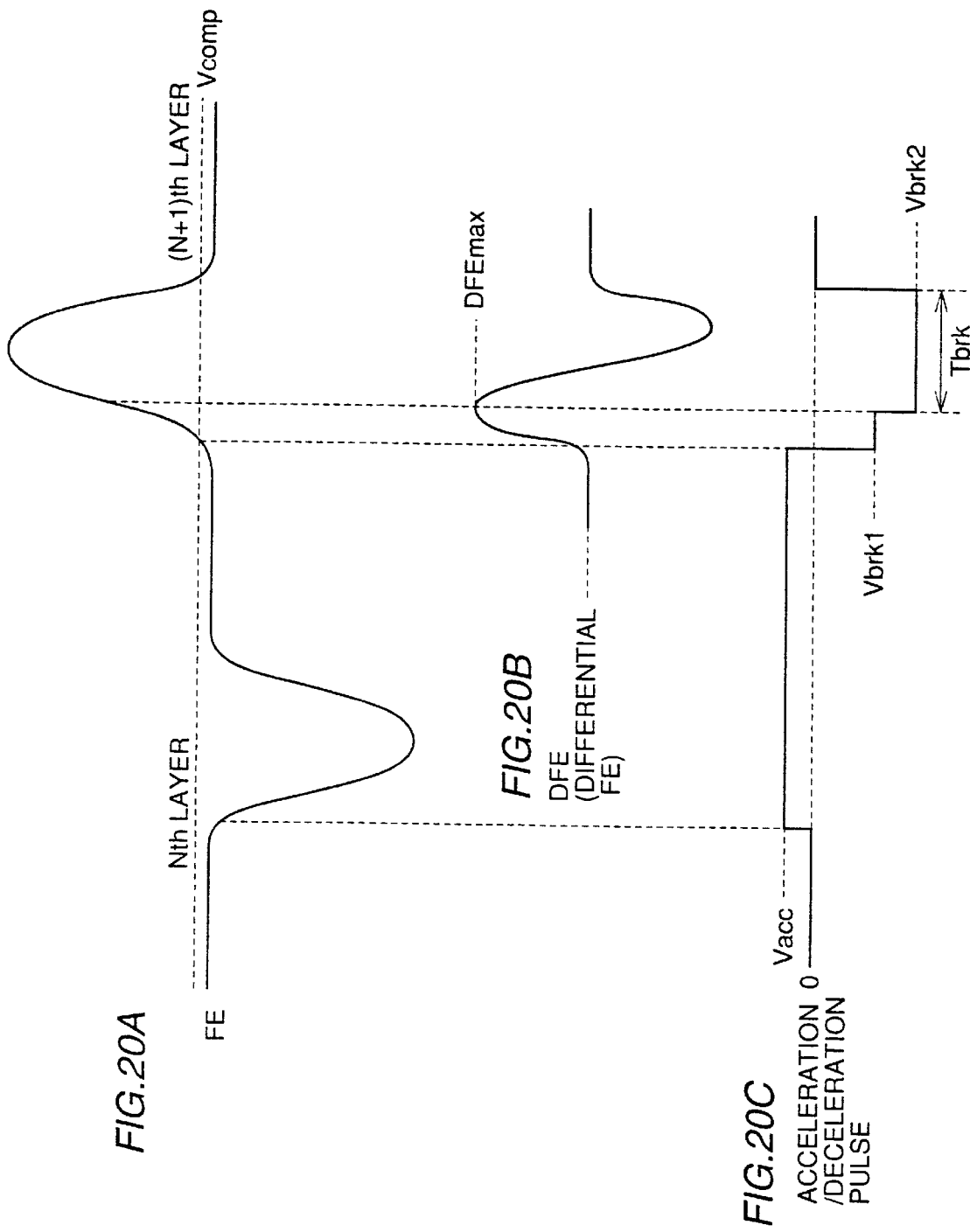
FIGS. 20A–20C are waveform diagrams representing a focusing error signal, a differentiated, focusing error signal and an acceleration/deceleration pulse when the FIG. 8 DSP operates according to the FIG. 19 flow chart.
Figure 21:
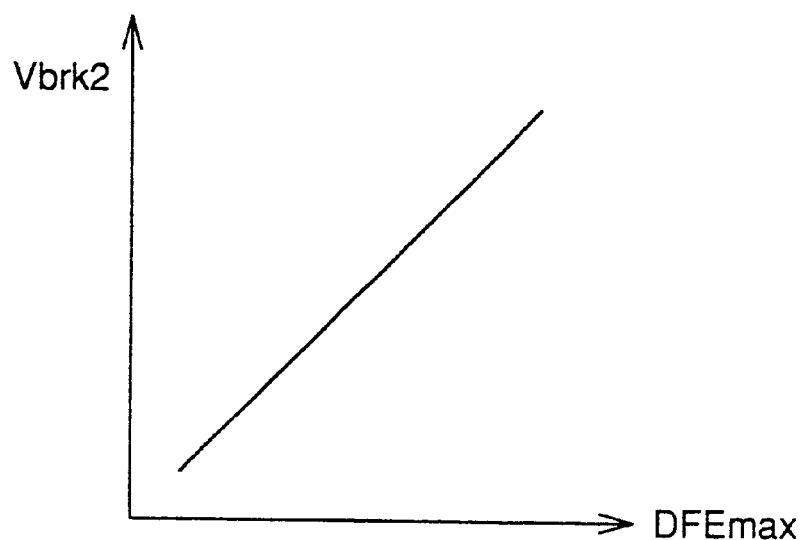
FIG. 21 shows an exemplary lookup table representing a relation between a voltage of the deceleration pulse second applied and a maximal value of the differentiated, focusing error signal represented in the FIGS. 20A–20C.

In place of the program described above, such a program as represented in the FIG. 19 flow chart may be stored in the FIG. 8 ROM 5G. As shown in FIGS. 20A–20C, voltage Vbrk2 of a deceleration pulse applied after a variance of focusing error signal FE is maximized is determined depending on a maximal value DFEmax of a differential focusing error signal DFE. FIG. 21 represents a relation between voltage Vbrk2 of a deceleration pulse applied second and maximal value DFEmax of differential focusing error signal DFE. This relation is stored as a lookup table in the FIG. 8 RAM 57.

Referring to FIGS. 19 and 20A–20C, in focus-jumping from an Nth layer to an (N+1) th layer, an acceleration pulse of a voltage Vacc is initially applied. Thus the focal point of objective lens 42 starts to move from the Nth layer to the (N+1) th layer. Thus, focusing error signal FE first appears on the negative side. As the focal point approaches the (N+1) th layer focusing error signal FE for the (N+1) th layer appears on the positive side.

When focusing error signal FE exceeds threshold value Vcomp, the acceleration pulse is replaced with a deceleration pulse for application. Threshold value Vcomp herein is conveniently set to be slightly more positive than the zero level. Voltage Vbrk1 of the deceleration pulse applied first is determined previously. Focusing error signal FE is differentiated in DSP 55 to calculate differential focusing error signal DFE.

When differential focusing error signal DFE attains maximal value DFEmax, voltage Vbrk2 corresponding to maximal value DFEmax is read from a lookup table in RAM 57. The lookup table may be stored in ROM 56 rather than RAM 57. Maximal value DFEmax is attained when the rising speed of focusing error signal FE is maximized. Thus, maximal value DFEmax is increased when the moving speed of objective lens 42 is increased, and maximal value DFEmax is decreased when the moving speed of objective lens 42 is decreased. Voltage Vbrk2 is set to be large when maximal value DFEmax is large, and voltage Vbrk2 is set to be small when maximal value DFEmax is small. More specifically, voltage Vbrk2 of the deceleration pulse is set to be large for objective lens 42 moving fast when the focal point thereof is close to the (N+1) th layer, and voltage Vbrk2 of the deceleration pulse is set to be small for objective lens 42 moving slowly when the focal point thereof is close to the (N+1) th layer.

When the deceleration pulse voltage Vbrk2 corresponding to maximal value DFEmax of differential focusing error signal DFE is read from a lookup table as described above, a deceleration pulse of voltage Vbrk2 is applied.

Then, when a timer is cleared and a value t of the timer exceeds a value of a predetermined time Tbrk, the application of the deceleration pulse with voltage Vbrk2 is terminated. Then, focusing servo control is initiated to control objective lens 42 so that the focal point thereof converges on the (N+1) th layer. Time Tbrk is determined by previously counting the time required for the focal point to reach the (+1) th layer since differential focusing error signal DFE is maximized.

It should be noted that a timer is herein employed to time when to terminate the application of the deceleration pulse of voltage Vbrk2 and switch to focusing servo. For example, termination of deceleration pulse application and switching to focusing servo may be effected when focusing error signal FE is smaller than threshold value Vcomp.

In accordance with the first embodiment, a deceleration pulse voltage set to be large for objective lens 42 moving fast and small for objective lens 42 moving slowly allows the focal point of objective lens 42 to converge on the (N+1) th layer rapidly and accurately.

Second Embodiment

A conventional optical disk device is controlled so that when a targeted address and a targeted layer information are received, focus-jumping is initially effected from the current layer to the targeted layer and a pickup drive mechanism is then operated to seek the targeted address.

A DVD is capable of high-density recording and accordingly it is highly probable that it will be used as a computer memory in the future. This requires accessing a targeted address as rapidly as possible. According to conventional methods, however, a targeted address is sought after focus-jumping. This results in a disadvantage that access time is increased.

A main object of the second embodiment of the present invention is therefore to provide an optical disk device capable of focus-jumping and seeking a targeted address simultaneously to reduce access time.

Figure 22:
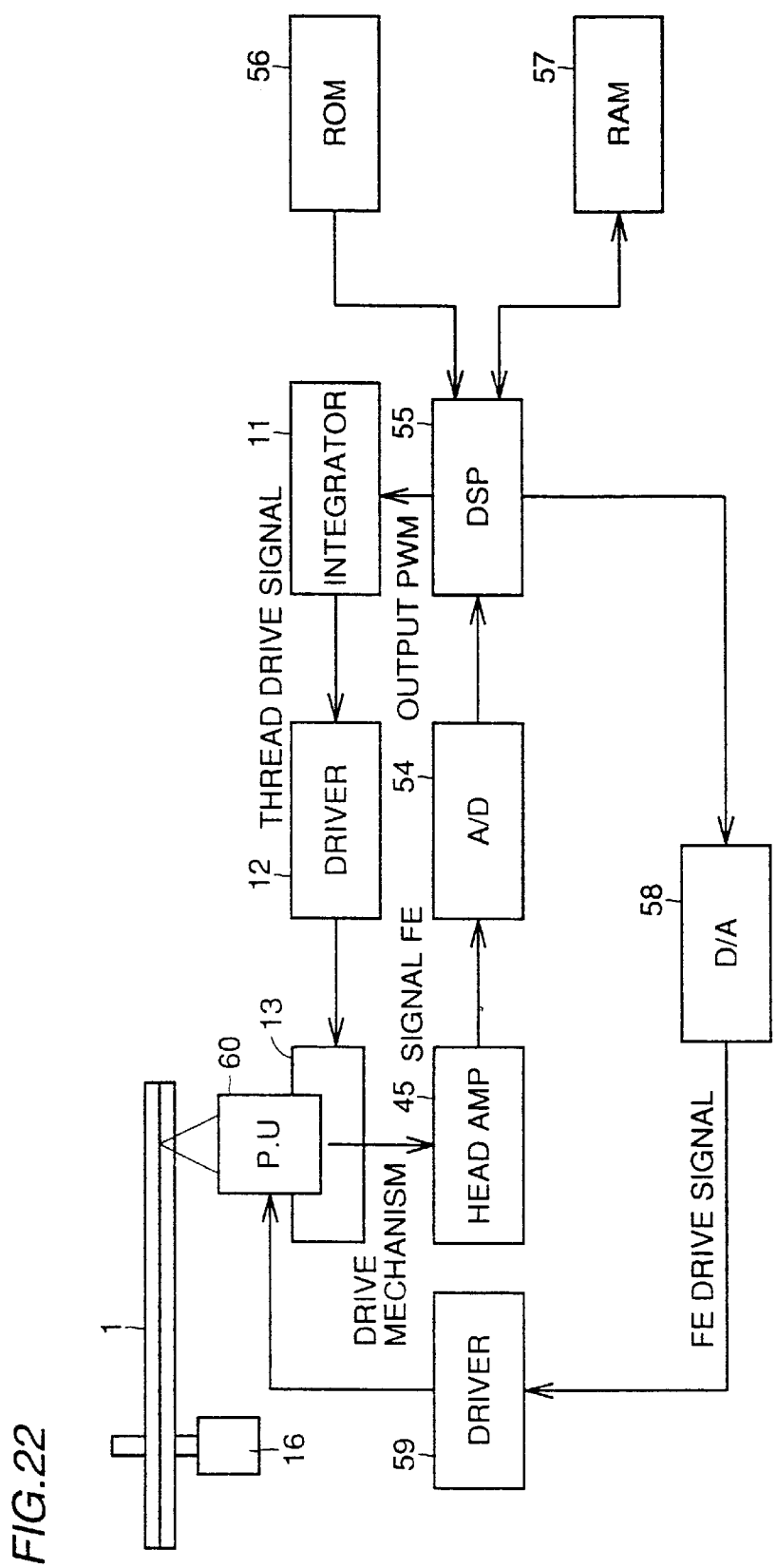
FIG. 22 is a block diagram showing a configuration of an optical disk device according to a second embodiment of the present invention.

FIG. 22 is a block diagram showing the second embodiment of the present invention.

In FIG. 22, a one-side reading, dual layer DVD1 is rotatably driven by a spindle motor 16 and pickup 60 reads the information recorded on disk 1. Pickup 60 outputs a signal such as focusing error signal FE which is in turn amplified by head amp 45 and then provided to an A/D converter 54 so that an analog signal is converted into a digital signal which is provided to a digital signal processor (DSP) 55.

DSP 55 is connected to ROM 56 and RAM 57. A program for controlling DSP 55 is stored in ROM 56. The information obtained from disk 1 is stored in RAM 57 DSP 55 runs the program stored in ROM 56 and, depending on the information stored in RAM 57, provides control for focusing-servo of pickup 60 by means of the acceleration signal or the deceleration signal and also provides control to allow pickup 60 to provide the seek operation DSP 55 outputs to D/A converter 58 a digital signal for control of focus-jumping. D/A converter 58 converts the digital signal into an analog signal provided to drive 59 which controls pickup 60 by means of the acceleration and deceleration signals.

To allow pickup 60 to provide the seek operation, DSP 55 also outputs and provides a pulse wide modulation (PWM) signal to an integrator 11. Integrator 11 integrates and provides signal PWM as a thread drive signal to driver 12. In response to the thread drive signal, driver 12 drives a drive mechanism 13 to allow pickup 60 to provide the seek operation.

Figure 23:
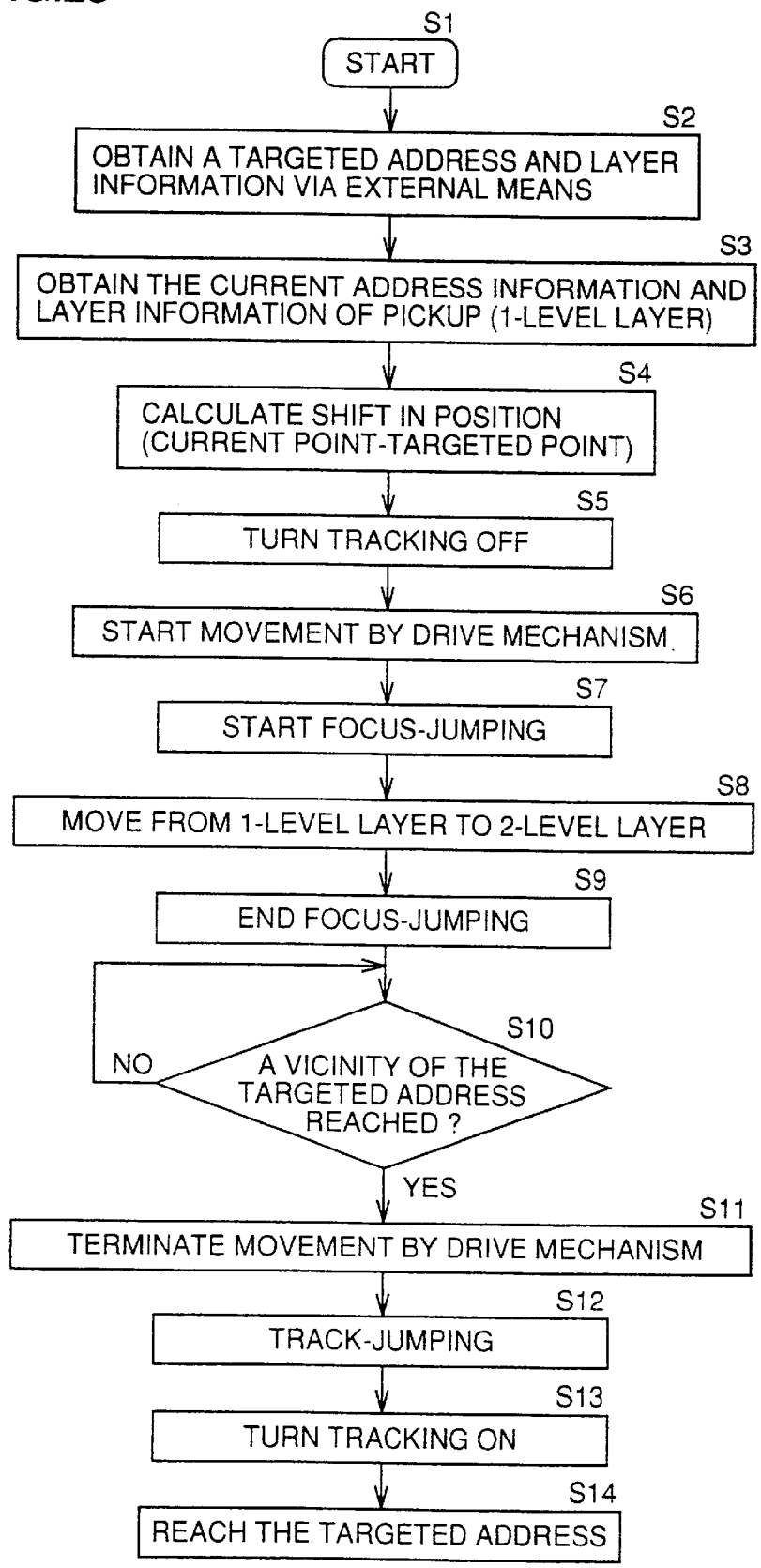
FIG. 23 is a flow chart for describing an operation of the FIG. 22 optical disk device.

FIG. 23 is a flow chart for representing an operation of the second embodiment of the present invention. FIGS. 24 and 25A–25B are views for illustrating the focus-jumping and operation to seek a targeted address according to the second embodiment of the present invention.

Reference is now made to FIGS. 22 to 25A and 25B to describe a specific operation of the second embodiment of the present invention. When a targeted address and targeted layer information of disk 1 is received from the external, DSP 55 obtains the position and layer information being addressed by pickup 60 and calculates the shift in position from the current location to the targeted location. For example, as shown in FIG. 24, when an external command is issued to allow pickup 60 focusing on translucent recording layer 2 at a point a2 to focus on reflecting recording layer 1 at a point a1, DSP 55 calculates the shift in position from point a2 to point a1 and turns off the electric conduction to tracking coils 703a and 703b shown in FIG. 9. Then, DSP 55 outputs signal PWM to integrator 11 which in turn integrates signal PWM and outputs such a thread drive signal as represented in FIG. 25B. In response to the thread drive signal, driver 12 drives drive mechanism 13 to start to move pickup 60.

Simultaneously with outputting signal PWM, DSP 55 outputs focusing error signal FE to D/A converter 58. D/A converter 58 converts focusing error signal FE into an analog signal provided to driver 59 In response to the analog, focusing error signal FE, driver 59 allows pickup 60 to start focus-jumping. Thus, pickup 60 moves from translucent recording layer 2 as a first layer to reflecting recording layer 1 as a second layer and focus-jumping is thus completed.

Then, DSP 55 determines whether pickup 60 has arrived at point a1 of reflecting recording layer 1. If it has not arrived there, integrator 11 continues to output the thread drive signal. When pickup 60 reaches a vicinity of the targeted address, the movement depending on drive mechanism 13 is terminated, jumping is made to a designated track of reflecting recording layer 1 and tracking is turned on to allow pickup 60 to reach the targeted address.

In accordance with the second embodiment, focusing error signal FE can be employed to allow pickup 60 to focus-jump from a first layer to a second layer while a thread drive signal can be employed to allow pickup 60 to seek a targeted address so as to reduce access time and enhance the utility of a DVD as computer memory.

In accordance with the second embodiment, when a targeted address and layer information are received the shift in position can be responsively calculated from the current address and layer information. Driving means can be driven to move information reading means by the calculated shift in position and an acceleration signal can also be generated to allow the information reading means to focus on a signal recording surface of the targeted layer so as to reduce access time.

Third Embodiment

The distance between the two layers of the dual layer disk is in fact not uniform over the entirety of the disk and this fact results in the disadvantage described below.

FIG. 26 is a cross section showing a structure of a dual layer disk actually manufactured. It should be noted that the cross section shows the structure of the dual layer disk shaped into a circular plate that is shown along a radius from the center to the outer periphery. As shown in FIG. 26, depending on the manufacturing method thee is provided a dual layer disk with ultraviolet-ray hardened resin (i.e. intermediate layer 3) having a thickness increased gradually in the direction from the radially inner part towards the radially outer part, i.e. a thickness of 40 $\mu$m at the radially inner part whereas a thickness of 60 to 70 $\mu$m at the radially outer part. Depending on the manufacturing method, there is provided a disk with intermediate layer 3 having a thickness varied from 40 to 70 $\mu$m.

Since the dual layer disk actually manufactured has an interlayer distance that is larger at the radially outer part than at the radially inner part, the switching point from an acceleration pulse to a deceleration pulse described above is distant from the origin (in reproduction from the first layer). Thus, when the deceleration pulse has a fixed magnitude, the application time of the deceleration pulse becomes shorter than that of the acceleration pulse.

The product of the application voltages and application times of each of the pulses corresponds to the drivability of the pickup. Thus, if the application time of the deceleration pulse is shorter than that of the acceleration pulse, the pickup cannot be appropriately controlled to stop and can thus run out of control.

A third embodiment of the present invention has been made to overcome the disadvantage described above and contemplates an optical disk device which achieves proper focus-jumping in reproducing information from an optical disk having a varied distance between two layers thereof.

Figure 27:
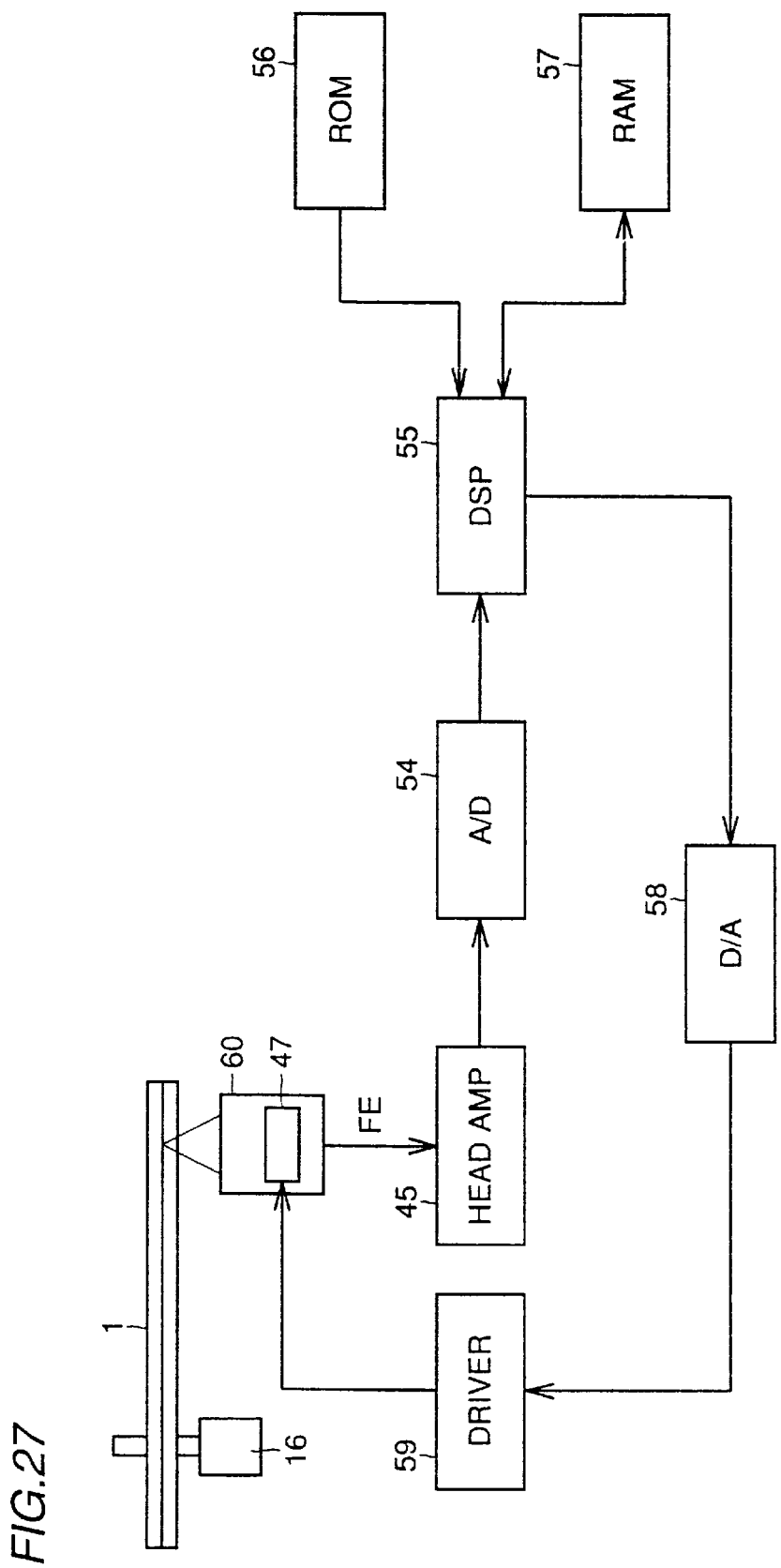
FIG. 27 is a block diagram showing a configuration of an optical disk device according to a third embodiment of the present invention.
Figure 28:
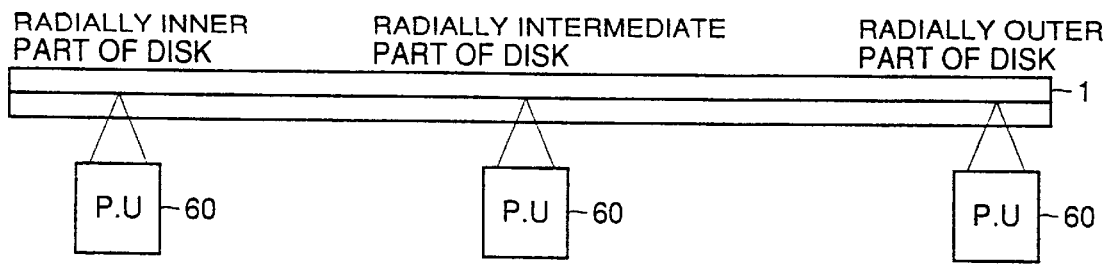
FIG. 28 is a view for describing an interlayer-distance measuring operation provided by the FIG. 9 optical disk device.

FIG. 27 is a block diagram showing a configuration of an optical disk device according to the third embodiment of the present invention.

As shown in FIG. 27, the optical disk device includes a spindle motor 16 which rotates a one-side reading, DVD 1 mounted, a pickup (PU) 60 which irradiates dual layer disk 1 with a laser beam and detects the light reflected therefrom to read the information recorded on dual layer disk 1 and which has its vertical distance from dual layer disk 1 controlled by actuator 47 incorporated therein, a head amp 45 which amplifies a signal output from pickup 60, such as focusing error signal FE, an A/D converter 54 which converts an analog signal output from head amp 45 into a digital signal, a random access memory (RAM) 57 in which information obtained from dual layer disk 1 is stored, a digital signal processor (DSP) 55 which stores in RAM 57 the information according to the digital signal output from A/D converter 54 and generates a digital signal designating the position of pickup 60 depending on the information stored in RAM 67, a read only memory (ROM) 56 in which a program for controlling DSP 55 is stored, a D/A converter 58 which converts the digital signal output from DSP 55 into an analog signal, and a driver 59 which produces an acceleration signal and a deceleration signal depending on the signal output from D/A converter 58 and provides the acceleration signal and the deceleration signal to actuator 47 to move and stop pickup 60, respectively.

An operation of the optical disk device according to the third embodiment will now be described.

Initially a dual layer disk is mounted on the optical disk device. The optical disk device detects the distance between the two layers having information recorded thereon, at a plurality of different points different in the distance from the center of the disk.

FIGS. 28 and 29A to 29C are views for illustrating the detection of the distance between the two layers.

Figure 29A:
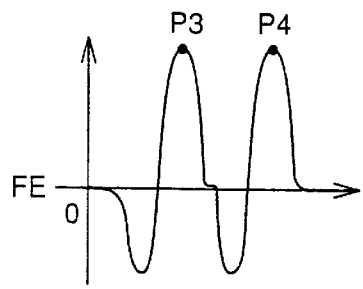
FIG. 29A is a waveform diagram representing a focusing error signal obtained when focus-searching is conducted at a radially inner part of a disk.
Figure 29B:
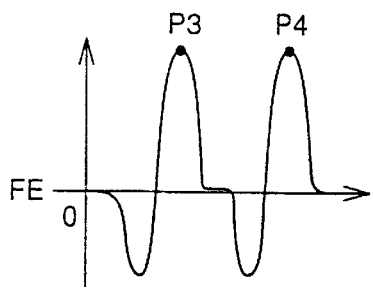
FIG. 29B is a waveform diagram representing a focusing error signal obtained when focus-searching is conducted at a radially intermediate part of the disk.
Figure 29C:
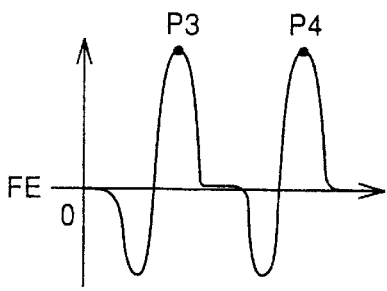
FIG. 29C is a waveform diagram representing a focusing error signal obtained when focus-searching is conducted at a radially outer part of the disk.

As shown in FIGS. 28 and 29A–29C, pickup 60 is moved e.g. from a radially inner part to radially intermediate part to radially outer part of one side reading, dual layer DVD1 successively to detect focusing error signal FE at each point. The distance or (time) between positive peaks P3 and P4 of focusing error signal FE is increased as the distance between the two layers is increased towards the radially outer part, as represented in FIGS. 29A–29C.

Figure 30A:
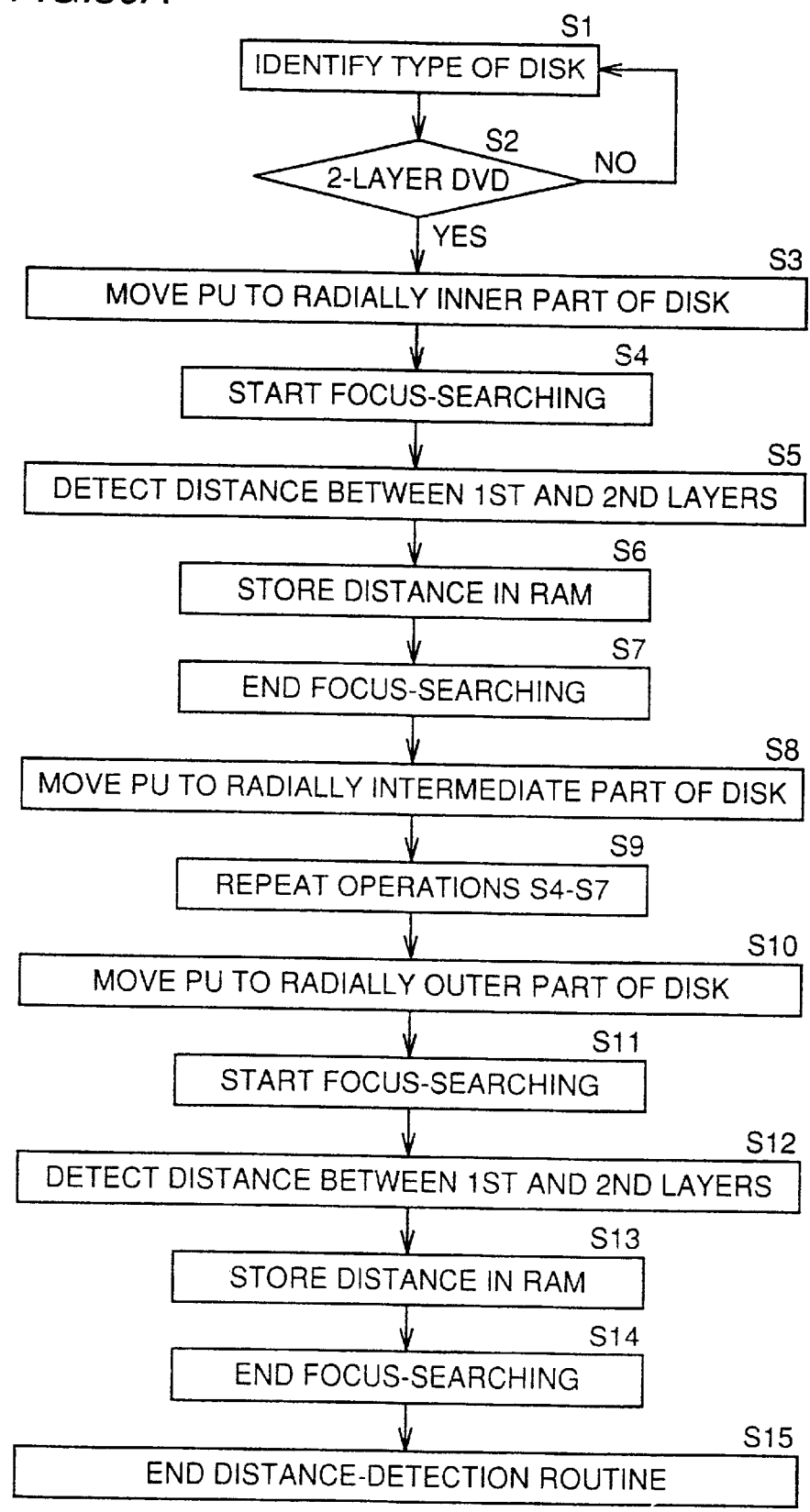
FIG. 30A is a flow chart representing an operation to detect a distance between two layers of an optical disk.

Reference is now made to the FIG. 30A flow chart to specifically describe an operation to detect the distance between the two layers.

Initially at step S1 the type of an optical disk mounted is identified.

Then at step S2, determination is made as to whether the optical disk mounted is a dual layer digital video disk (DVD-Dual) and if it is a dual layer DVD the system goes to step S3.

At step S3, pickup 60 is moved to the radially inner part of dual layer disk 1. At step S4, the distance between pickup 60 and dual layer disk 1 is varied while a laser beam illuminates dual layer disk 1 to start measuring the light reflected therefrom, i.e. focus-searching.

At step S5, DSP 55 calculates the distance between the first and second layers depending on focusing error signal FE obtained from the measurement at step S4.

At step S6, the distance calculated by DSP 55 as well as the address information indicative of the location of the measurement are stored in RAM 57.

At step S7, the focus searching ends. At step S8, pickup 60 is moved to the radially intermediate part of dual layer disk 1 mounted.

At step S9, the operations from step S4 to step S7 are repeated while changing the measuring position. At step S10, pickup 60 is moved to the radially outer part of dual layer disk 1 mounted.

Thereafter, from steps S11 to S14, the operations from steps S4 to S7 are again repeated. At step S15, the routine for detecting the distance between the two layers at the radially outer part is completed.

Thus DSP 55 and ROM 56 controlling the same detect the distance between the two layers of dual layer disk lat a plurality of locations that are different in the distance from the center of dual layer disk 1 mounted.

It should be noted that while the above description is provided with respect to detection of the distance between two layers in dual layer disk 1 at the three locations of radially inner, intermediate and outer parts, Table 2 provides an example of specific information when the distance between the two layers is detected at 34 locations and stored in RAM 57.

TABLE 2

| Label | Radius | Track No. | Distance Between 1st & 2nd Layers ($\mu$m) |
|---|---|---|---|
| 1 | 25 | 40245 | 30.0 |
| 2 | 26 | 82134 | 30.0 |
| 3 | 27 | 125665 | 30.0 |
| 4 | 28 | 170839 | 30.0 |
| 5 | 29 | 217656 | 30.0 |
| 6 | 30 | 266115 | 30.0 |
| 7 | 31 | 316217 | 31.3 |
| 8 | 32 | 367962 | 32.7 |
| 9 | 33 | 421349 | 34.0 |
| 10 | 34 | 476379 | 35.3 |
| 11 | 35 | 533052 | 36.7 |
| 12 | 36 | 591368 | 40.7 |
| 13 | 37 | 651326 | 44.7 |
| 14 | 38 | 712927 | 48.7 |
| 15 | 39 | 776170 | 52.7 |
| 16 | 40 | 841056 | 56.7 |
| 17 | 41 | 907585 | 58.0 |
| 18 | 42 | 975757 | 59.3 |
| 19 | 43 | 1045571 | 60.7 |
| 20 | 44 | 1117028 | 62.0 |
| 21 | 45 | 1190128 | 63.3 |
| 22 | 46 | 1264870 | 64.7 |
| 23 | 47 | 1341255 | 66.0 |
| 24 | 48 | 1419283 | 67.3 |
| 25 | 49 | 1498953 | 68.7 |
| 26 | 50 | 1580266 | 70.0 |
| 27 | 51 | 1663222 | 66.0 |
| 28 | 52 | 1747821 | 62.0 |
| 29 | 53 | 1834062 | 58.0 |
| 30 | 54 | 1921946 | 54.0 |
| 31 | 55 | 2011472 | 50.0 |
| 32 | 56 | 2102641 | 43.3 |
| 33 | 57 | 2195453 | 36.7 |
| 34 | 58 | 2289908 | 30.0 |

In Table 2, the term "radius" means the distance from the center of dual layer disk 1 mounted to the point at which the distance between the two layers is measured.

Figure 30B:
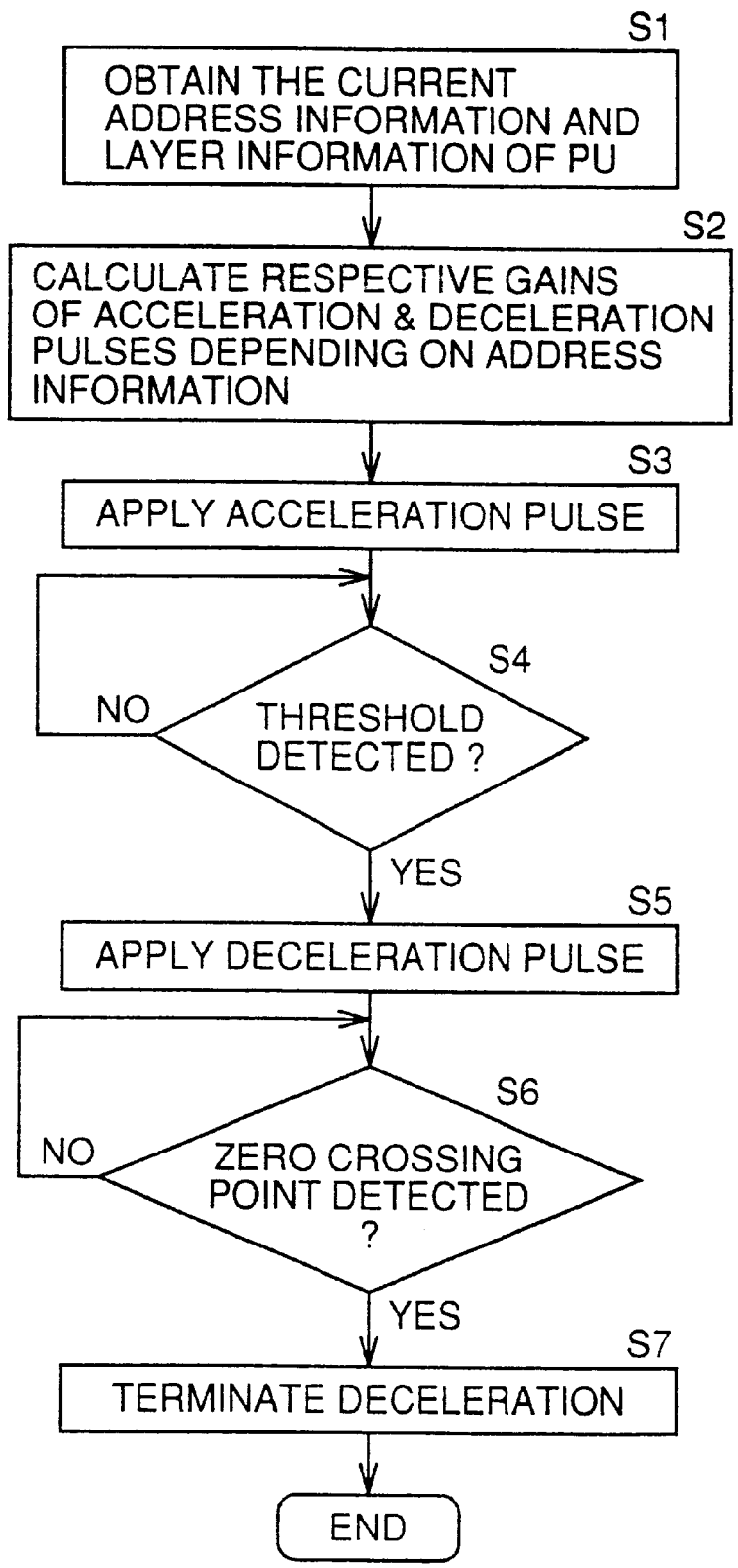
FIG. 30B is a flow chart representing a first example of a focus jump operation.

Reference will now be made to the FIG. 30B flow chart to describe a first example of a focus-jumping operation effecting the reproduction of information from the first layer during the reproduction of information from the second layer of dual layer disk 1.

Initially at step S1, pickup 60 obtains from dual layer disk 1 the information indicating the current layer from which information is being reproduced and the address (i.e. track No.) information indicating from which location in the current layer the information is being reproduced.

Then at step S2, DSP 55 calculates, depending on the address information, the interlayer distance at the current position from the RAM 57 data in proportional distribution and calculates a gain of an acceleration pulse for moving pickup 60 to focus a beam on a desired layer and a gain of a deceleration pulse for controlling pickup 60 to stop.

At step S3, DSP 55 outputs to D/A converter 58, a digital signal depending on the calculation at step S2 and driver 23 provides to actuator 47 of pickup 60 an acceleration pulse with the gain calculated at step S2.

At step S4, transition of focusing error signal FE associated with the movement of pickup 60 is measured to determine whether the magnitude of focusing error signal FE exceeds a threshold value.

If the threshold value is exceeded, the system goes to the next step S5.

At step S5, DSP 55 outputs to D/A converter 58 a digital signal depending on the calculation at step S2 and driver 23 provides to actuator 47 of pickup 60 a deceleration pulse with the gain calculated at step S2.

At step S6, determination is made as to whether focusing error signal FE obtained via pickup 60 attains the zero level. If a point at which focusing error signal FE attains the zero level, i.e. a zero crossing point, is detected, the system goes to the next step, S7, to terminate the deceleration in the movement of pickup 60.

FIGS. 31A–31C and 32A–32C are views for describing focus-jumping at a radially inner part and radially outer part of dual layer disk 1, respectively.

As represented in FIGS. 31A–31C, for the radially inner part of dual layer disk 1 a signal supplied to actuator 47 is switched from an acceleration pulse to a deceleration pulse at a time point (or a position) at which focusing error signal FE exceeds the threshold value set to correspond to 20% of the difference between two peak values of focusing error signal FE that are different in polarity, i.e. 20% of (P6–P5).

More specifically, in FIGS. 31A–31C, actuator 47 receives the acceleration pulse from the origin to T1 and the deceleration pulse from T1 to T2. It is assumed that the both pulses have a same amplitude and that areas A3 and A4 corresponding to drive amount of the pickup 60 are equal to each other.

Figure 32A:
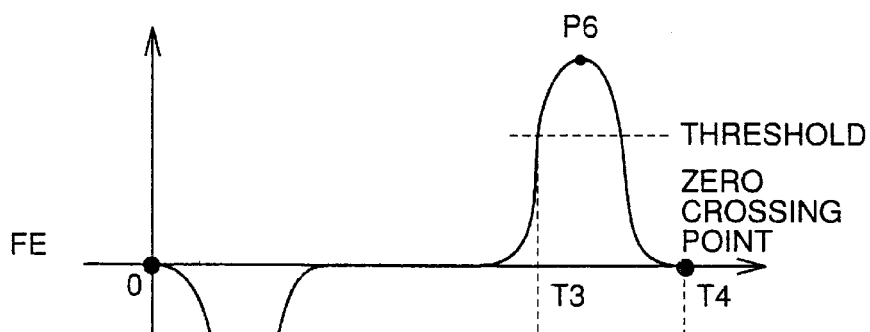
FIGS. 32A–32C are time charts for describing focus-jumping at a radially outer part of the dual layer disk in the operation shown in FIG. 30.
Figure 32B:
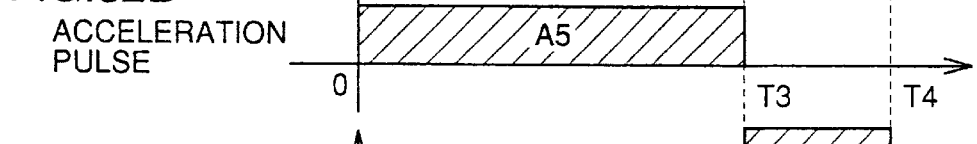
Figure 32C:
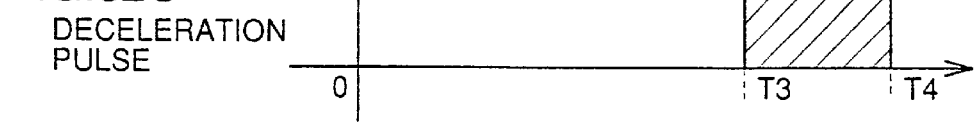

By contrast, as represented in FIGS. 32A–32C, for the dual layer disk 1 radially outer part, which is larger than the dual layer disk 1 radially inner part in the distance between the two layers having information recorded thereon, the time (or distance) is increased between peaks P5 and P6 of focusing error signal FE. Thus, time point t3 at which focusing error signal FE exceeds the threshold value is delayed as compared to T1 indicated in FIGS. 31A–31C.

As a result an area A5 corresponding to the driving capability of the acceleration pulse with respect to pickup 60 is larger than area A3, since the acceleration pulse has the same amplitude as that shown in FIG. 3B. If in this case a deceleration pulse having the same amplitude as the acceleration pulse is only supplied to actuator 47 from T3, at which focusing error signal FE exceeds the threshold value, until a zero crossing point T4, as with the radially inner part as represented in FIGS. 31A–31C, the deceleration pulse cannot achieve the driving capability to control and thus stop the movement of pickup 60 that is as much as the driving capability of the acceleration pulse. Accordingly, the deceleration pulse has its gain increased to the magnitude calculated by DSP 55 so that the deceleration pulse forms between T3 and T4 an area A6 which is equal to area A5, as shown in FIG. 32C. Consequently, pickup 60 accelerated by the acceleration pulse is decelerated by the deceleration pulse reliably and thus controlled properly without running out of control. It should be noted that changing the magnitude of the deceleration pulse corresponds to changing the acceleration which decelerates pickup 60.

It is also similarly considered that the acceleration which accelerates pickup 60 is changed by changing the magnitude of the acceleration pulse.

Figure 33:
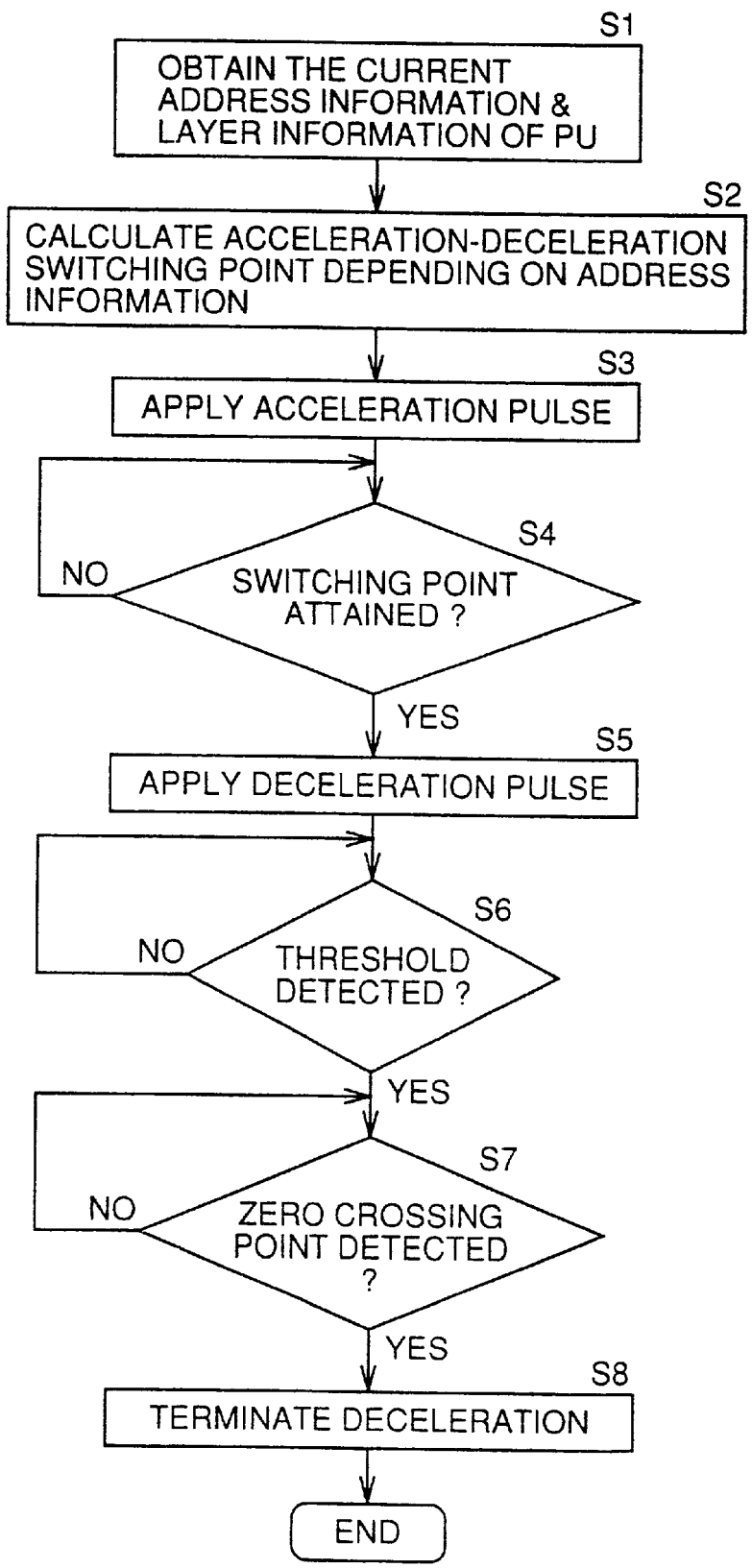
FIG. 33 is a flow chart representing a second example of the focus jump operation.

A second example of the focus-jump operation will now be described with reference to the FIG. 33 flow chart.

At step S1, pickup 60 obtains the current address information and layer information indicating the location at which information is currently reproduced, as is in the first example of the focus-jump operation.

Then at step S2, DSP 55 uses the address information obtained by pickup 60 to calculate an acceleration-deceleration switching point (referred to as a switching point hereinafter) in proportional distribution depending on interlayer-distance data previously stored in RAM 57. The switching point is a time point (or a position) at which a signal supplied to actuator 47 from an acceleration pulse to a deceleration pulse and more specifically, it is adapted to be a calculated, intermediate point between two peaks of focusing error signal FE that are different in polarity.

At step S3, driver 23 applies an acceleration pulse to actuator 47.

At step S4, determination is made as to whether pickup 60 moves and arrived at the switching point and if it has arrived there the system goes to step S5.

At step S5, the application of the acceleration pulse to actuator 47 is stopped and simultaneously a deceleration pulse is applied to actuator 47.

At step S6, detection is made as to whether focusing error signal FE has attained the level of a set threshold value and if it has attained the threshold value the system goes to step S7.

At step S7, determination is made as to whether focusing error signal FE has again attain the zero level (i.e. the detection of a zero crossing point). When a zero crossing point is detected, at step S8 the application of the deceleration pulse to actuator 47 is terminated to control pickup 60 to stop.

FIGS. 34A–34C and 35A–35C are views for representing the focus-jumping operation described above at a radially inner part and radially outer part of dual layer disk 1, respectively.

Figure 34A:
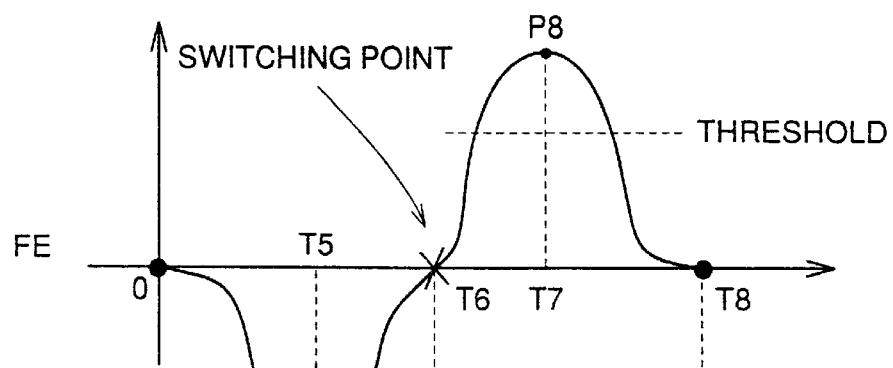
FIGS. 34A–34C are time charts for describing focus-jumping at a radially inner part of the dual layer disk in the operation shown in FIG. 33.
Figure 34B:
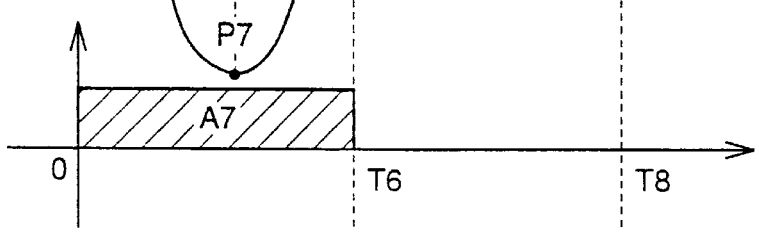
Figure 34C:
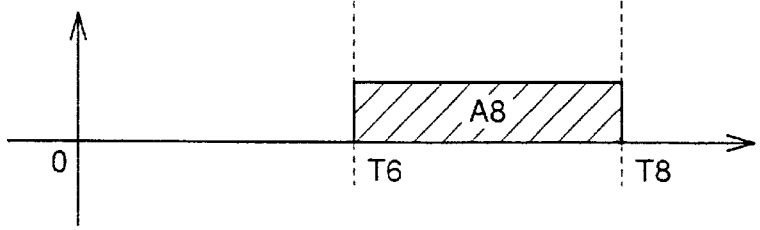

As represented in FIGS. 34A–34C, at an intermediate point T6 between points T5 and T7 respectively having peaks P7 and P8 of focusing error signal FE that are different in polarity a signal applied to actuator 47 is switched from an acceleration pulse to a deceleration pulse to provide the FIGS. 34B and 34C areas A7 and A8 that are equal. For the radially outer part also, a similar operation is provided as represented in FIGS. 35A–35C, although a time period (or distance) from T9 to T11 between two peaks P7 and P8 of focusing error signal FE that are different in polarity is larger than a time period (or distance) from T5 to T7 for the radially inner part as represented in FIGS. 34A–34C.

More specifically, at an intermediate point T10 between peaks P7 and P8 of focusing error signal FE that are different in polarity a signal supplied from driver 59 to actuator 47 is switched from an acceleration pulse to a deceleration pulse to provide the FIGS. 35B and 35C areas A9 and A10 that are equal.

It should also be noted that in switching the signal provided from driver 59 to actuator 47 from an acceleration pulse to a deceleration pulse, the respective magnitudes of the pulses may be appropriately changed to switch the pulses at any point between two peaks P7 and P8 of focusing error signal FE that are different in polarity.

It should also be noted that the polarity of the acceleration or deceleration pulse in FIGS. 31A–31C, 32A–32C, 34A–34C and 35A–35C and the descriptions thereof is determined depending on the direction in which pickup 60 moves with respect to dual layer disk 1.

It is also needless to say that the description provided above similarly applies to more general, multilayer disks having information recorded in a plurality of layers thereof as well as dual layer disk 1. According to the third embodiment, refocusing for reproducing information from different layers (i.e. focus-jumping) can be properly achieved even for an optical disk having information recorded in a plurality of layers a distance between which is not uniform. Furthermore, the information reading means can be prevented from moving out of control. The movement of the objective lens can also be controlled and thus stopped with a variable speed.

Fourth Embodiment

The conventional focus-jumping depends on the mechanical technique of moving an objective lens in the direction of an optical axis by means of an actuator for focusing servo control. Consequently, it takes long time to move the focal point of a laser beam from one recording layer to another recording layer. Furthermore, conventional devices breakdown easily.

Furthermore, the distance between the two layers in a dual layer optical disk is in fact not uniform over the entirety of the disk and it varies along the radial direction of the disk. It is thus difficult to provide accurate focus-jumping at any location of the dual layer optical disk.

The fourth embodiment of the present invention has been made to overcome the disadvantages described above and contemplates an optical disk device capable of rapid focus-jumping. The fourth embodiment also contemplates an optical disk device capable of accurate focus-jumping at any location within a multilayer optical disk.

Figure 36:
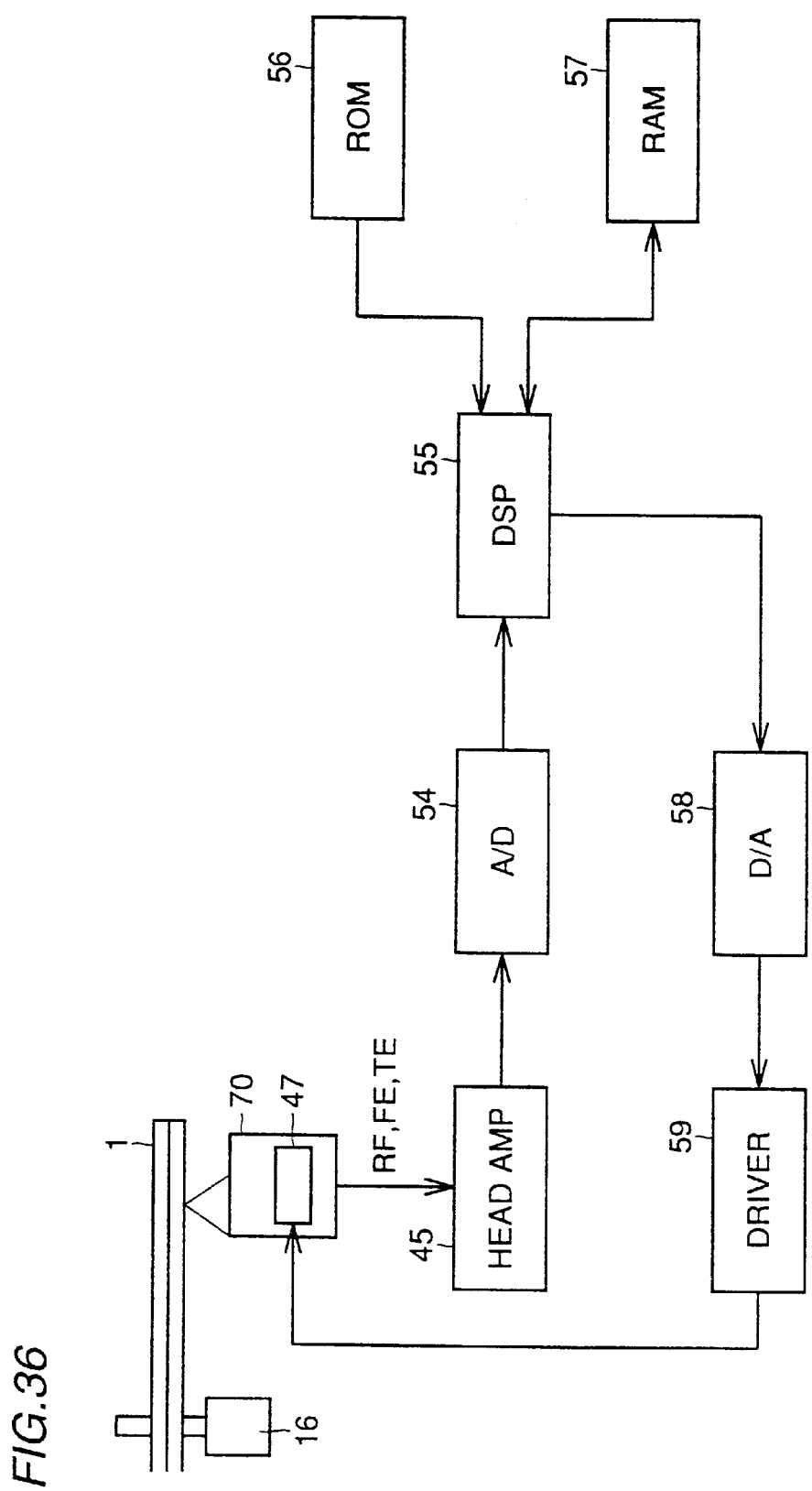
FIG. 36 is a block diagram showing a general configuration of an optical disk device according to a fourth embodiment of the present invention.

FIG. 36 is a block diagram showing a general configuration of an optical disk device according to the fourth embodiment of the present invention. Referring to FIG. 36, the optical disk device reproducing information from dual layer optical disk 1 having two recording layers includes a spindle motor 16 which rotates dual layer optical disk 1, an optical pickup (PU) 70 which illuminates dual layer optical disk 1 with a laser beam to read the information recorded in a recording layer, a head amp 45 which amplifies the reproduced signal RF, focusing error signal FE and tracking error signal TE from optical pickup 70, an A/D converter 54 which AD-converts a signal output from head amp 45, a digital signal processor (DSP) 55 which processes an output signal from A/D converter 54 according to a predetermined program, a read only memory (ROM) 56 in which a program and the like for operating DSP 55 is stored, a random access memory (RAM) 57 in which a table and the like formed and used in DSP 55 is stored, a D/A converter 58 which DA-converts a signal output from DSP 55, and a driver 59 which drives an actuator 47 in optical pickup 70 in response to an output signal from D/A converter 58.

Figure 37:
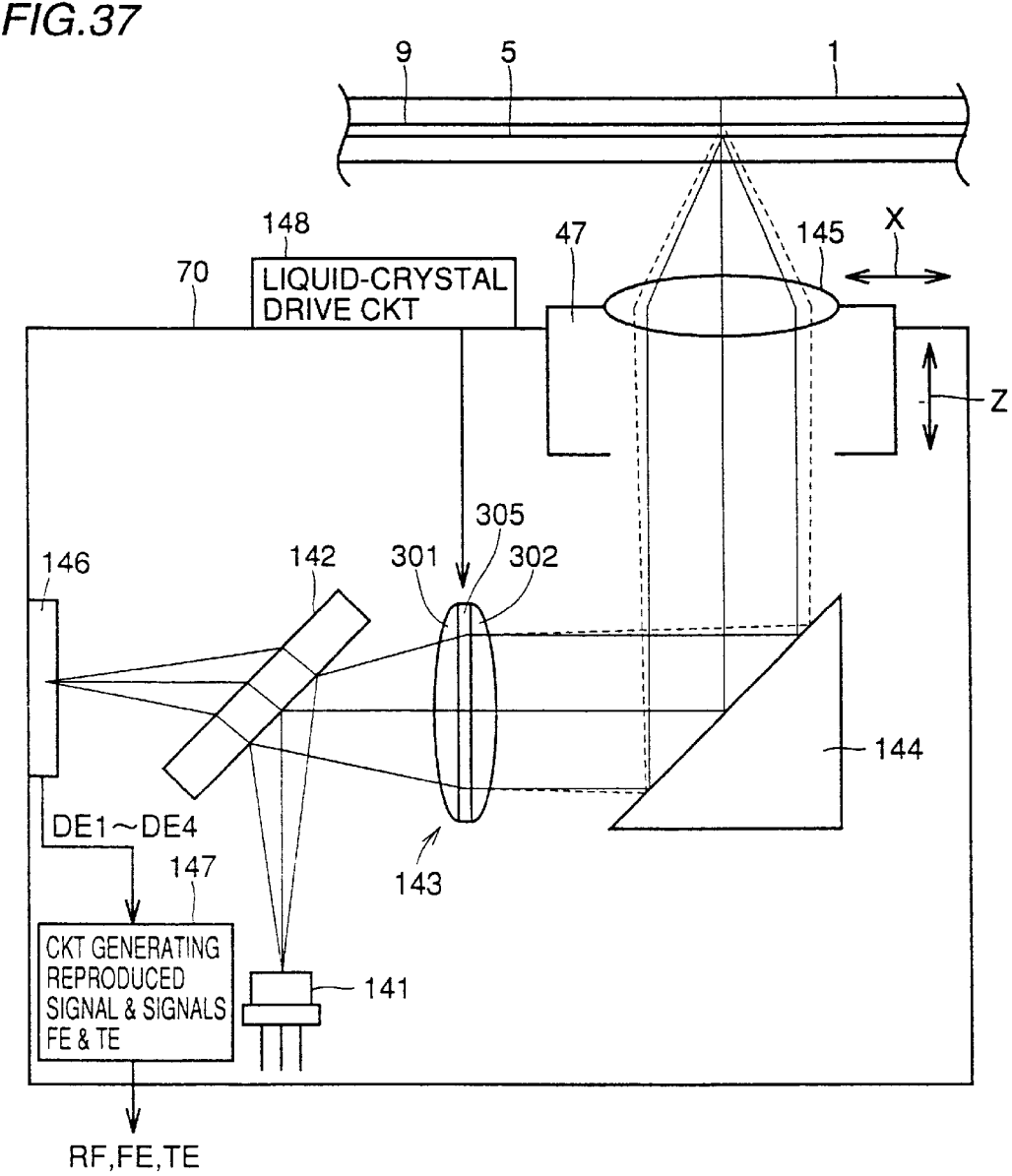
FIG. 37 is a block diagram showing a configuration of the FIG. 36 optical pickup device.

FIG. 37 is a block diagram showing a configuration of the FIG. 36 optical pickup 70. The FIG. 37 optical pickup 70 includes a semiconductor laser 141 which generates laser beam, a beam splitter 142 which orthogonally reflects the laser beam from semiconductor laser 141, a multifocal collimator lens 143 which collimates or substantially collimates the laser beam from beam splitter 142, a mirror 144 which reflects the laser beam from multifocal collimator lens 143 in the Z direction (the direction of the optical axis of objective lens 145), an objective lens 145 provided opposite to dual layer optical disk 1 to focus the laser beam from mirror 144 on a first recording layer 5 or a second recording layer 9, an actuator 47 which moves objective lens 145 in the Z direction (the direction of the objective lens 145 optical axis) to provide focusing servo control and in the X direction (the tracking direction) to provide tracking servo control, a photodetector 146 which detects the laser beam reflected from dual layer optical disk 1 and transmitted through multifocal collimator lens 143 and beam splitter 142, a circuit 147 generating reproduced signal RF, focusing error signal FE and tracking error signal TE depending on detection signals DE1 to DE4 from photodetector 146, and a liquid crystal drive circuit 148 for driving TN-type liquid crystal 305 in multifocal collimator lens 143.

Beam splitter 142, multifocal collimator lens 143, mirror 144 and objective lens 145 configure an optical system for directing the laser beam from semiconductor laser 141 to dual layer optical disk 1.

Figure 38:
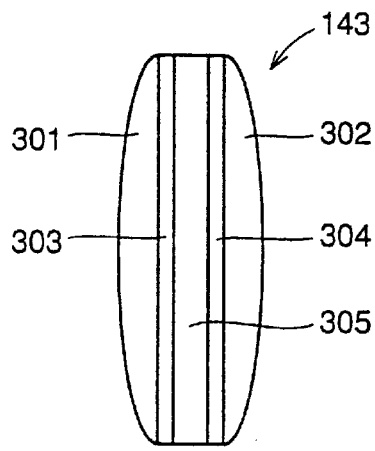
FIG. 38 is a side view of a configuration of a multiple focal-point collimator lens shown in FIG. 37.

As shown in FIG. 38, multifocal collimator lens 143 includes a piece of lens 301, a piece of lens 302 arranged opposite to the piece of lens 301, a transparent electrode 303 formed on an inner surface of the piece of lens 301, a transparent electrode 304 formed on an inner surface of the piece of lens 302, a TN-type liquid crystal 305 held between transparent electrodes 303 and 304. Transparent electrodes 303 and 304 are preferably of ITO, $SnO_2$, $TiO_2$ or the like. TN-type liquid crystal 305 may be replaced by STN-type liquid crystal or the like.

Liquid crystal drive circuit 148 applies a predetermined voltage between transparent electrodes 303 and 304 of multifocal collimator lens 143 in response to a signal output from the FIG. 36 driver 59.

Figure 39:
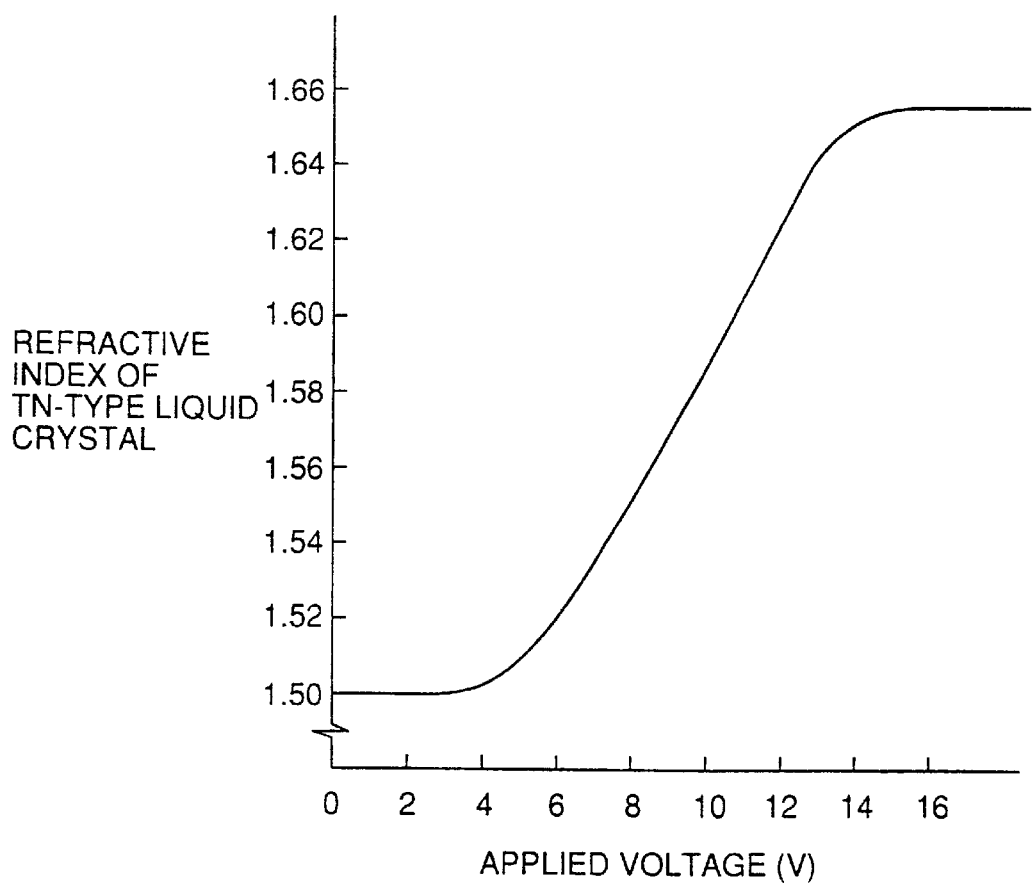
FIG. 39 is a graph of a refractive index of the FIG. 38 TN-type liquid crystal versus applied voltage.
Figure 40:
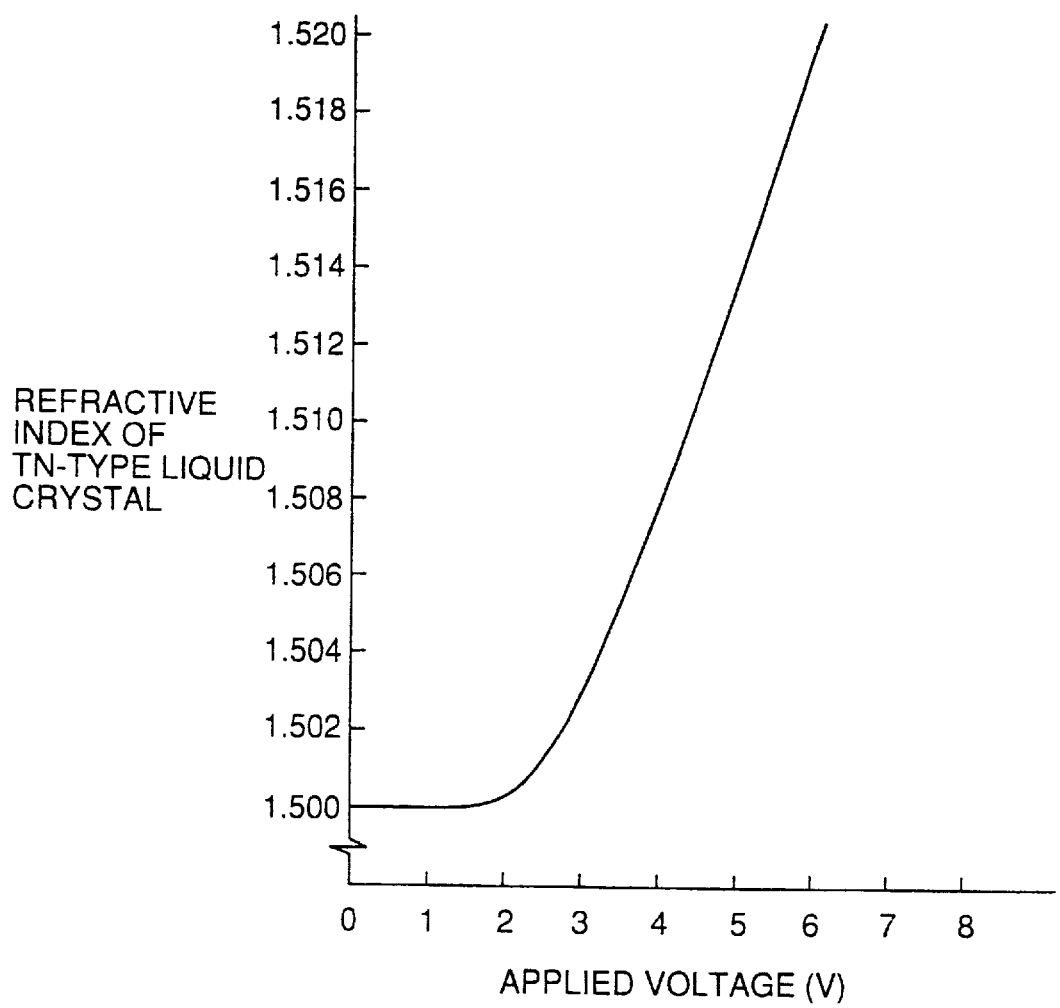
FIG. 40 is the FIG. 39 graph enlarged to show an important portion thereof.
Figure 41:
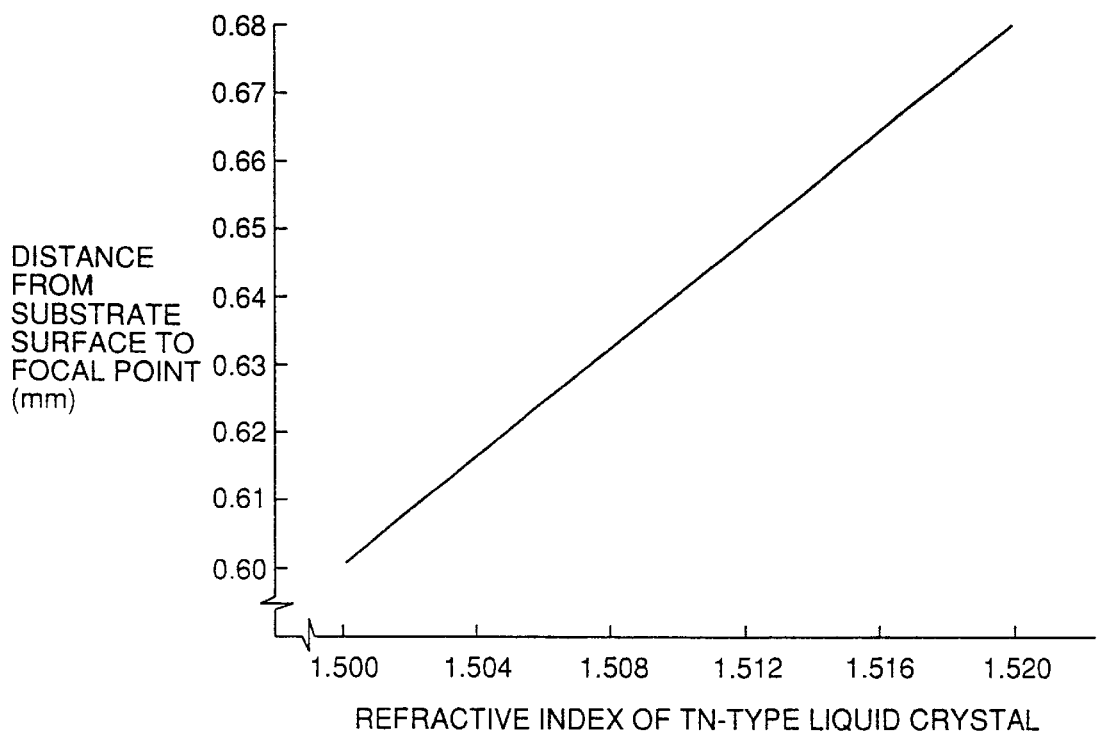
FIG. 41 is a graph of a distance from a substrate surface of a multilayer optical disk to a focal point versus a refractive index of the FIG. 38 TN-type liquid crystal in the FIG. 37 optical pickup device.

FIG. 39 is a graph of refractive index of TN-type liquid crystal 35 versus applied voltage and FIG. 40 is an enlarged graph of an important portion in FIG. 39. As presented in FIGS. 39 and 40, the TN-type liquid crystal 305 refractive index varies with the voltage applied between transparent electrodes 303 and 304. Thus a focal distance of multifocal collimator lens 143 varies depending on the applied voltage. FIG. 41 is a graph of a distance from a substrate surface of dual layer optical disk 1 to a focal point of a laser beam versus the TN-type liquid crystal 305 refractive index.

Figure 42:
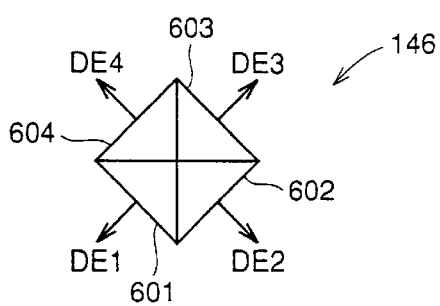
FIG. 42 is a plan view showing a structure of a photo detector shown in FIG. 37.

Photodetector 146 is configured by four divided sensors 601 to 604, as shown in FIG. 42. Divided sensors 601 to 604 produce detection signals DE1 to DE4 depending on the respective quantities of laser beam light received.

Circuit 147 generating a reproduced signal and signals FE and TE outputs the summation of detection signals DE1 to DE4 as reproduced signal RF (=DE1+DE2+DE3+DE4) and also outputs the difference between the summation of detection signals DE1 and DE3 and the summation of detection signals DE2 and DE4 as focusing error signal FE (=DE1+DE3)−(DE2+DE4)).

Figure 43:
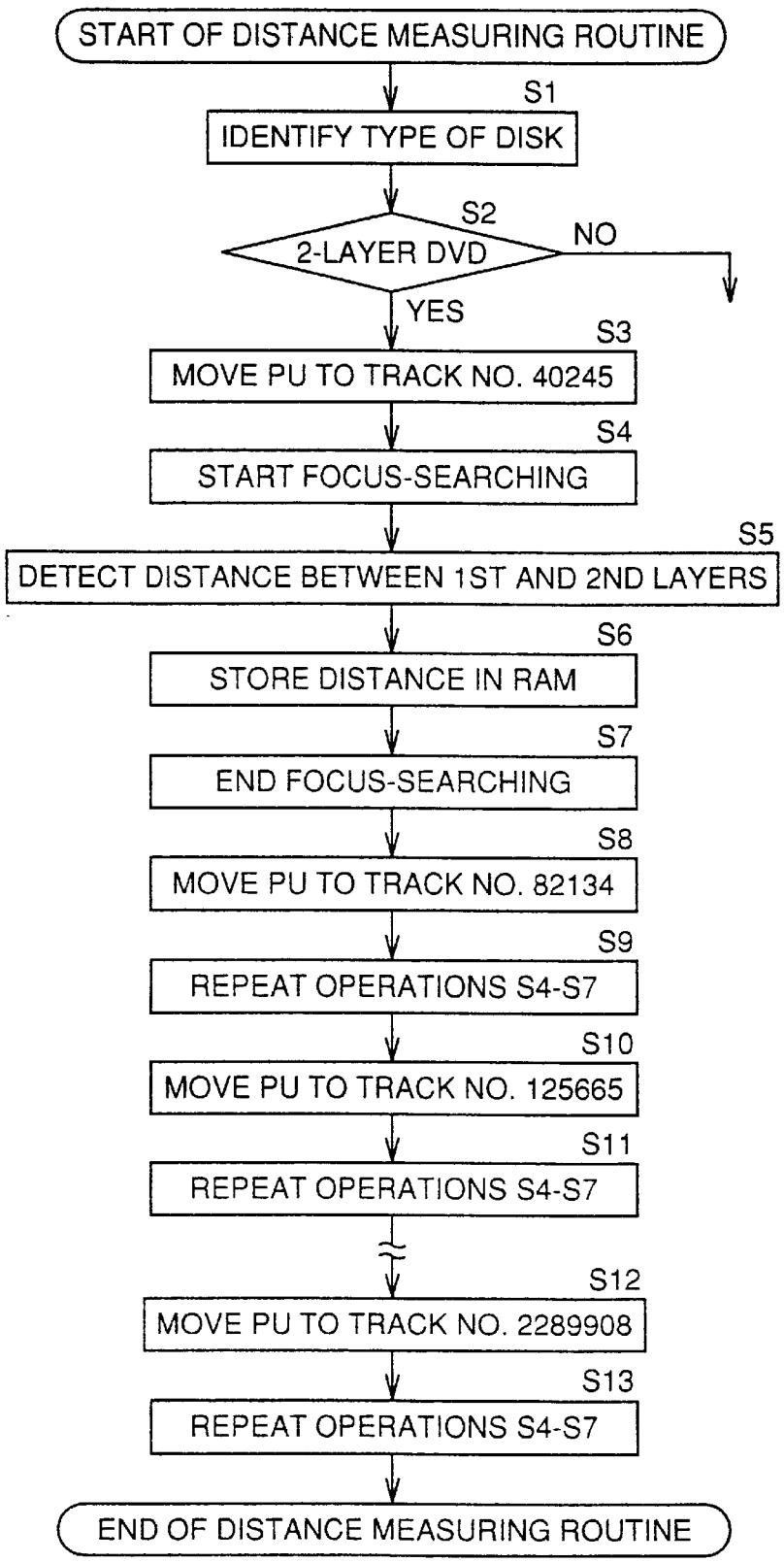
FIG. 43 is a flow chart representing an interlayer-distance measuring operation stored in the FIG. 36 ROM.
Figure 44:
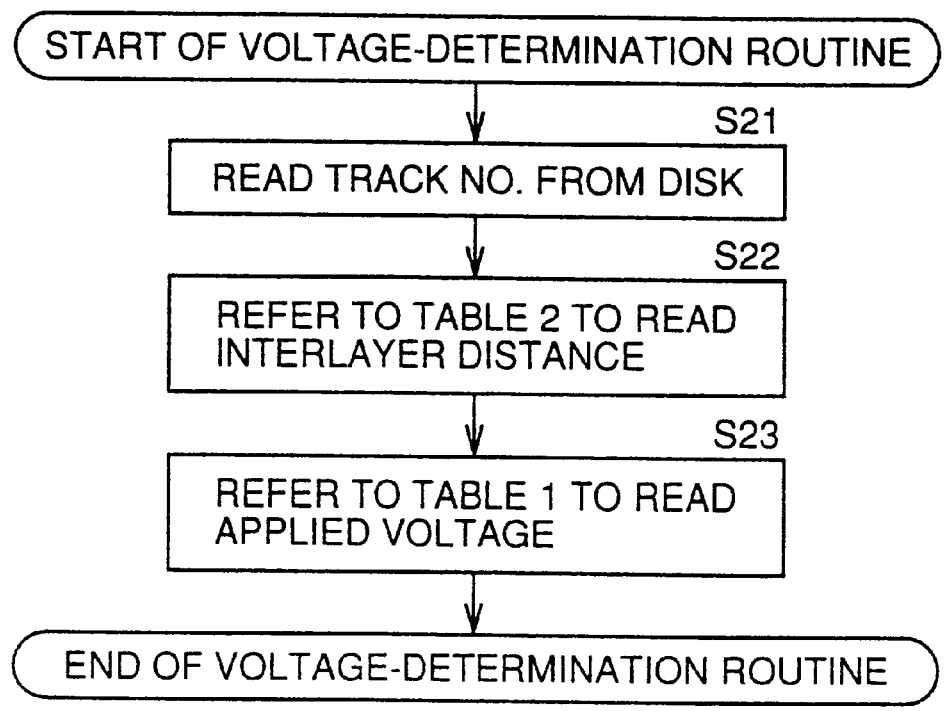
FIG. 44 is a flow chart representing an applied-voltage determining operation stored in the FIG. 36 ROM.

In ROM 56 is stored such programs as represented in FIGS. 43 and 44. The FIG. 43 flow chart represents a routine to measure the distance between the first recording layer 5 and the second recording layer 9 of dual layer optical disk 1 at a plurality of locations. The FIG. 44 flow chart represents a routine for determining a voltage to be applied between transparent electrodes 303 and 304 with reference to the table of measuring locations and interlayer distances stored in RAM 57 (Table 2).

In ROM 56 is also stored such a table as presented in Table 3 provided below, representing a relation between the distance from a substrate surface of dual layer disk 1 to a signal recording surface or layer of dual layer optical disk 1 and the voltage applied to TN-type liquid crystal 305.

TABLE 3

| Distance Between Substrate Surface and Recording Surface (mm) | Voltage Applied to Liquid Crystal (V) |
| --- | --- |
| 0.600 | 0 |
| 0.607 | 2.80 |
| 0.615 | 3.25 |
| 0.624 | 3.65 |
| 0.632 | 4.00 |
| 0.639 | 4.40 |
| 0.648 | 4.70 |
| 0.655 | 5.00 |
| 0.664 | 5.30 |
| 0.672 | 5.62 |
| 0.682 | 6.00 |

An operation of the FIGS. 36 and 37 optical disk device will now be described. Initially an interlayer-distance measuring operation will now be described with reference to the FIG. 43 flow chart.

When an optical disk is mounted on spindle motor 16, determination is made as to whether the mounted optical disk is a dual layer DVD (S1). If it is a dual layer DVD, the system goes to step S3. If it is not a dual layer DVD, the system goes to a different step.

Figure 45:
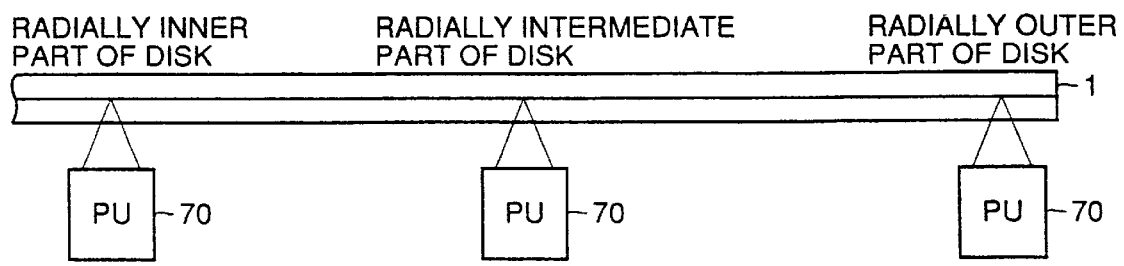
FIG. 45 is a view for illustrating the FIG. 9 interlayer-distance measuring operation.
Figure 46A:
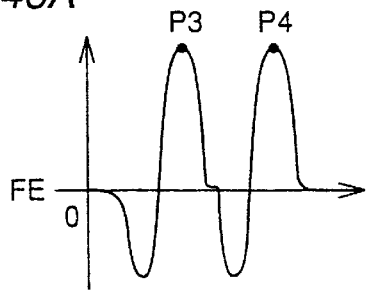
FIG. 46A is a waveform diagram representing a focusing error signal obtained when focus-searching is conducted at a radially inner part of a disk.

Then, optical pickup 70 moves in a radial direction of dual layer optical disk 1 and stops at a radially inner part (track No."40245") of dual layer optical disk 1, as shown in FIG. 45 (S3). Then at this position, focus-searching is started (S4). More specifically, driver 59 increases or decreases a focusing drive voltage applied to focus coil 702 according to an indication from DSP 55. Thus objective lens 42 moves in the direction of the optical axis thereof and circuit 147 generating a reproduced signal and signals FE and TE outputs such a focusing error signal FE as represented in FIG. 46A. Since dual layer optical disk 1 has two recording layers 5 and 9, focusing error signal FE presents two S-shaped curves. Depending on the time between two peaks P3 and P4 of such S-shaped curves, DSP 55 calculates the distance between the first and second recording layers 5 and 9 at track No. 40245 (S5) and stores the calculated distance in RAM 57 together with track No. 40245 (S6). Thus the focus-searching at the radially inner part of the disk completes (S7).

Then, optical pickup 70 moves to the position of track No. "82134" (S8) and DSP 55 effects focus-searching, as with steps S4 to S7 (S9). Thus the interlayer distance at track No. 82134 is stored in RAM 57 together with the track number.

Similarly, optical pickup 70 moves in the radial direction and DSP55 calculates interlayer distances in dual layer optical disk 1 at a plurality of points and stores the calculated distances in RAM 57 together with track numbers indicating the respective measuring positions (S10–S13).

Figure 46B:
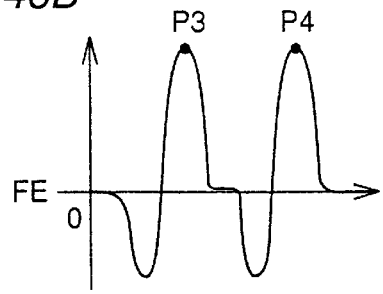
FIG. 46B is a waveform diagram representing a focusing error signal obtained when focus-searching is conducted at a radially intermediate part of the disk.
Figure 46C:
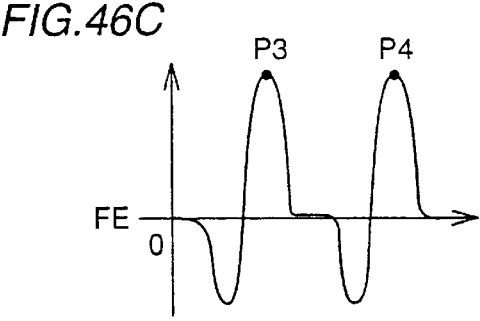
FIG. 46C is a waveform diagram representing a focusing error signal obtained when focus-searching is conducted at a radially outer part of the disk.

FIG. 45 also shows optical pickup 70 which stops a radially intermediate part of a disk to measure an interlayer distance at the radially intermediate part of the disk, and optical pickup 70 which stops at a radially outer part of the disk to measure an interlayer distance at the. radially outer part of the disk. FIG. 46B represents focusing error signal FE output from circuit 147 when focus-searching is effected at the radially intermediate part of the disk. FIG. 46C represents focusing error signal FE output from circuit 147 when focus-searching is effected at the radially outer part of the disk.

Consequently, such a table as presented in Table 2 is stored in RAM 57.

Reference will now be made to FIG. 37 to describe a reproduction operation provided by the optical disk device.

Figure 47:
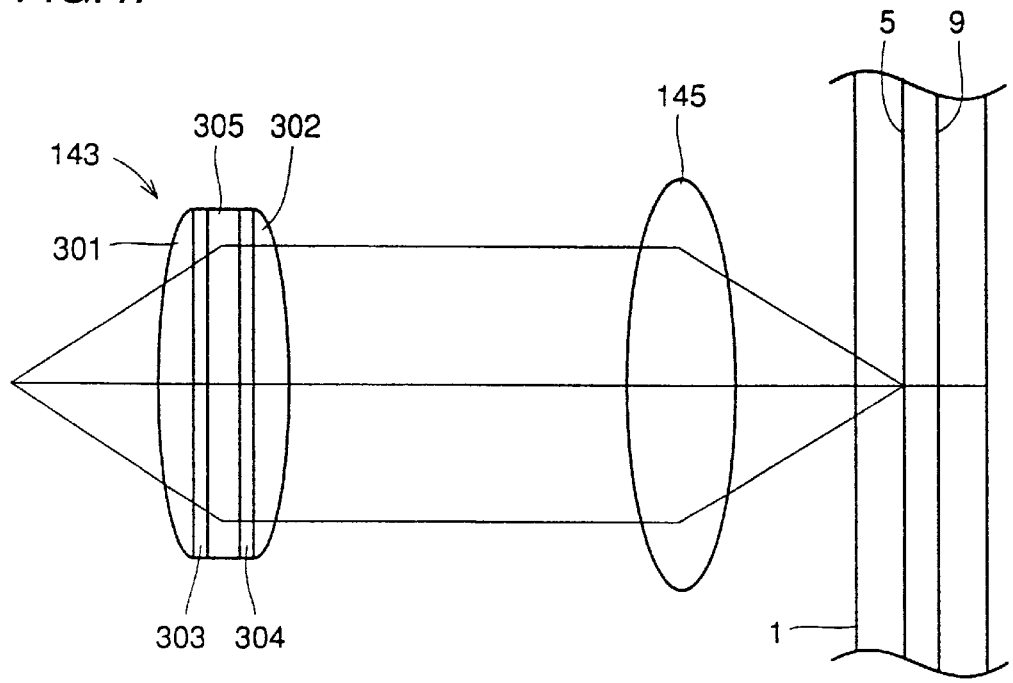
FIG. 47 is a view for illustrating an optical path of a laser beam when voltage is not applied between transparent electrodes in the FIG. 38 multiple focal-point collimator lens.

In reproducing the information in the first recording layer 5, voltage is not applied or a voltage of OV is applied between transparent electrodes 303 and 304 of multifocal collimator lens 143. Without any voltage applied, TN-type liquid crystal 305 has a refractive index of 1.500, as shown in FIG. 40. Thus, the laser beam emanating from semiconductor laser 141 and reflected by beam splitter 142 is collimated by multifocal collimator lens 143, as shown in FIGS. 37 and 47. The collimated laser beam from multifocal collimator lens 143 is reflected by mirror 144 and then incident on objective lens 145. Objective lens 145 allows the incident, collimated laser beam to be focused on the first recording layer 5.

The laser beam reflected from the first recording layer 5 returns through objective lens 145, mirror 144 and multifocal collimator lens 143 to beam splitter 142 and is further transmitted via beam splitter 142 and then incident on photodetector 146. Circuit 147 generates reproduced signal RF, focusing error signal FE and tracking error signal TE depending on detection signals DE1 to DE4 from photodetector 146.

To immediately start to reproduce the information on the second recording layer 9 while reproducing the information on the first recording layer 5, the focal point of the laser beam via objective lens 145 is required to be moved from the first recording layer 5 to the second recording layer 9. To provide such focus-jumping, DSP 55 determines an appropriate voltage applied to TN-type liquid crystal 305 according to the FIG. 44 flow chart.

More specifically, DSP 55 reads from the first recording layer 5 the track number from which information is currently reproduced (S21) and DSP 55 refers to Table 2 stored in RAM 57 to read an interlayer distance at the track number (S22). Depending on the read interlayer distance, DSP 55 then calculates a distance from a substrate surface of dual layer optical disk 1 to a signal recording surface of the second recording layer 9 and also refers to Table 3 to read a voltage applied to TN-type liquid crystal 305 (S23). Thus, an optimal applied voltage is determined to effect focus-jumping at a track from which information is currently reproduced.

If the track number from which information is currently reproduced is not presented in Table 2, DSP 55 reads the respective interlayer distances at the track numbers preceding and subsequent to the current track number and applies interpolation to calculate the interlayer distance at the current track number. If a distance from a substrate surface to a signal recording surface is not presented in Table 1, DSP 55 reads the applied voltages respectively corresponding to the distances preceding and subsequent to the distance of interest and applies interpolation to calculate a voltage to be applied that corresponds to the distance calculated through interpolation.

After a voltage to be applied is determined, DSP 55 instructs liquid crystal drive circuit 148 via D/A converter 26 and driver 59 to apply the determined, applied voltage between transparent electrodes 303 and 304. Thus, liquid crystal drive circuit 148 applies the determined voltage between transparent electrodes 303 and 304. For example, when a voltage of 4.0V is applied therebetween, the TN-type liquid crystal 305 refractive index varies from 1.500 to 1.510, as shown in FIGS. 39 and 40. Thus, the focal distance of multifocal collimator lens 143 is increased.

Figure 48:
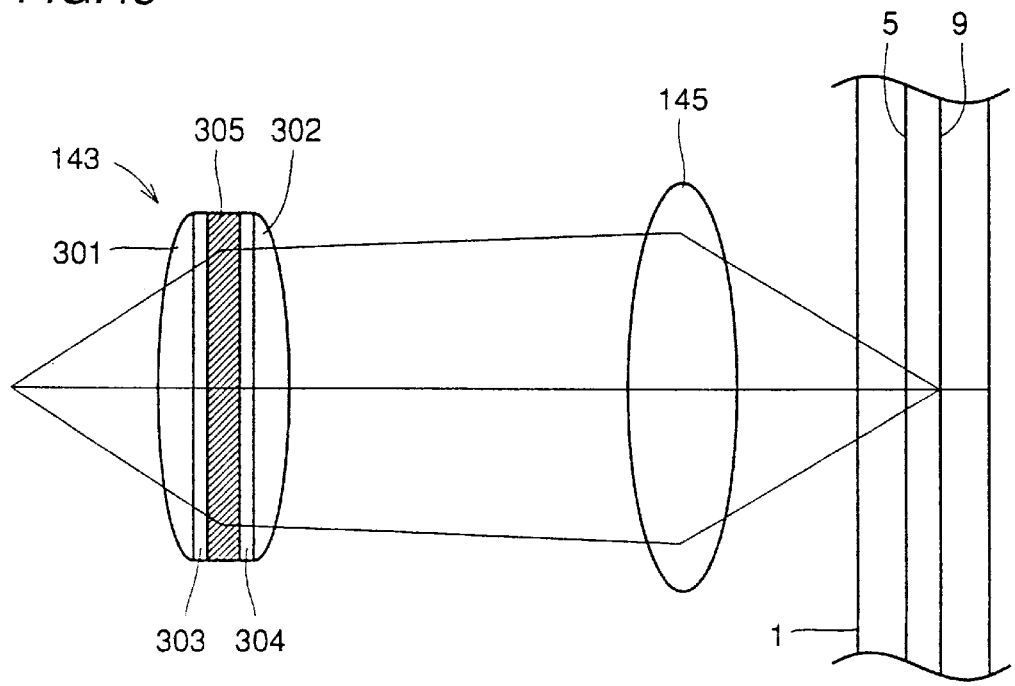
FIG. 48 is a view illustrating an optical path of a laser beam when voltage is applied to the transparent electrodes in the FIG. 38 multiple focal-point collimator lens.

Thus, multifocal collimator lens 143 is not collimated and slightly, radially widens the laser beam emanating from semiconductor laser 141 and reflected by beam splitter 142, as shown in FIGS. 37 and 48. The laser beam widened is reflected by mirror 144 and is then incident on objective lens 145 and objective lens. 145 focuses the incident laser beam on the second recording layer 9.

The laser beam reflected from the second recording layer 9 is incident on photodetector 146 to generate reproduced signal RF, focusing error signal FE and tracking error signal TE, as with the first recording layer 5.

Thus in the optical disk device the refractive index of TN-type liquid crystal 305 inserted in multifocal collimator lens 143 can be varied to change a focal distance of the multifocal collimator lens to thereby move a focal point of a laser beam through objective lens 145. This technique can provide focus-jumping faster than the conventional, mechanical technique of moving objective lens 145 in the Z direction or the direction of the optical axis thereof and is also less subject to failures.

Furthermore, interlayer distances previously measured in dual layer optical disk 1 at a plurality of locations as well as the measuring locations can be stored and employed to determine a voltage optimally applied to TN type liquid crystal 305. Thus, focus-jumping can be accurately effected even for a dual layer optical disk with its interlayer distance varied.

While in the above embodiment, liquid crystal is inserted in a collimator lens, it may be inserted e.g. in an objective lens in place of the collimator lens. In place of transparent electrodes 303 and. 304 and TN-type liquid crystal 305, a transparent member with a controllable refractive index may be inserted in the lens. In other words, any configuration may be applied that is capable of changing the focal distance of a lens depending on the recording layer from which information is to be reproduced.

While in accordance with the above embodiment, actuator 47 moves objective lens 145 in the Z direction (the direction of the optical axis thereof) to effect focus-searching, the voltage applied to TN-type liquid crystal 305 in multifocal collimator lens 143 may be continuously varied to effect focus-searching.

Thus in accordance with the fourth embodiment of the present invention a focal distance of a lens can be changed depending on the recording layer from which information is to be reproduced, to effect rapid focus-jumping.

Furthermore, a predetermined voltage can be applied between the transparent electrodes provided on both sides of the liquid crystal inserted in a collimator lens, depending on the recording layer from which information is to be reproduced. Thus technique can provide focus-jumping faster than conventional, mechanical techniques and also be less subject to failures.

Furthermore, interlayer distances measured in a multi-layer optical disk at a plurality of locations as well as the measuring locations can be stored and used to predetermine a voltage to be applied between the transparent electrodes provided on both sides of the liquid crystal. Thus, focus-jumping can be accurately effected even for a multilayer optical disk with its interlayer distance varied.

Fifth Embodiment

When a conventional optical disk device is used in reproducing information from a pinholed recording surface of a DVD, the data reproduced from the DVD can have an error or the like. This can result in unclear layer information of an address and thus prevent focus-jumping to a targeted layer. In that case, the targeted layer cannot be determined and an error will occur.

Therefore, a main object of a fifth embodiment of the present invention is to provide a video disk device capable of taking advantage of the fact that each layer has a different reflectance to identify each layer when a signal recording surface is damaged and a layer of interest cannot be determined.

Figure 49:
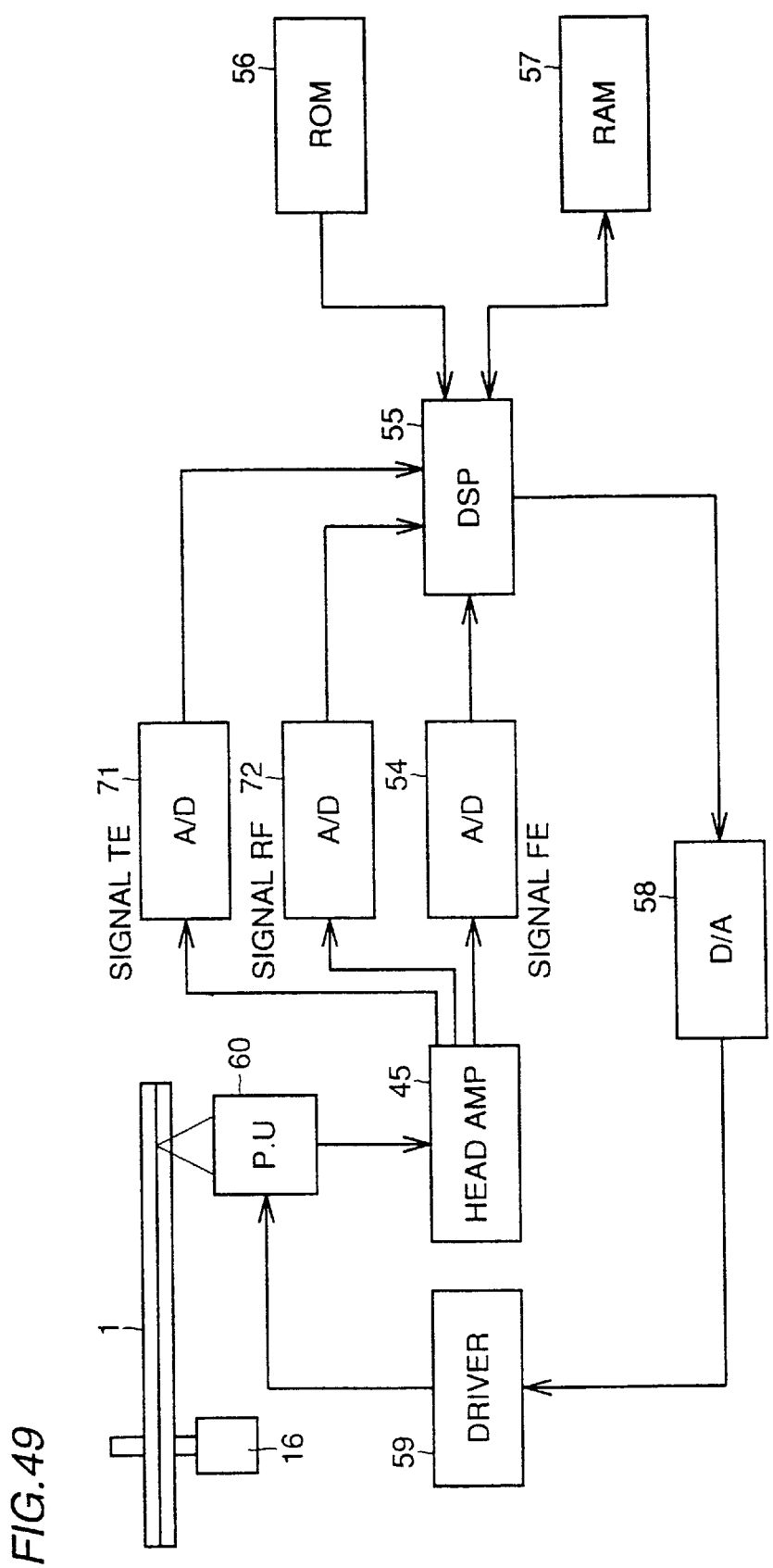
FIG. 49 is a block diagram showing a configuration of an optical disk device according to a fifth embodiment of the present invention.

FIG. 49 is a block diagram showing the fifth embodiment of the present invention. In FIG. 49, a one-side reading, DVD dual layer disk 1 is rotatably driven by spindle motor 16 and pickup 60 reads the information recorded on disk 1. Pickup 60 outputs read signal RF indicative of the information from a signal recording surface, focusing error signal FE and tracking error signal TE which are in turn amplified by head amp 45, respectively provided to A/D converters 72, 54 and 71 to be converted into digital signals, and thus provided to DSP 55.

DSP 55 is connected to ROM 56 and RAM 57. A program for controlling DSP 55 is stored in ROM 56, and the information obtained from disk 1 is stored in RAM 57. DSP 55 runs the program stored in ROM 56 and, depending on the information stored in RAM 57, provides control for focusing-servo of pickup 60 by means of an acceleration signal or a deceleration signal and also provides control for allowing pickup 60 to effect a seek operation. DSP 55 outputs to D/A converter 58 a digital signal for control of focus-jumping. D/A converter 58 converts the digital signal into an analog signal for provision to driver 59. Driver 59 controls pickup 60 according to the acceleration signal and the deceleration signal.

FIG. 50 is a view for describing tracking signal TE. A 3-beam system is employed in this example. The centered photodetector 43 is that shown in FIG. 2 and outputs read signal RF and focusing error signal FE. Photodetector 43 is sandwiched by photodetectors 74 and 75 provided on the left and right sides of a track. An output difference between photodetectors 74 and 75, i.e. e–f, corresponds to tracking error signal TE.

Figure 51:
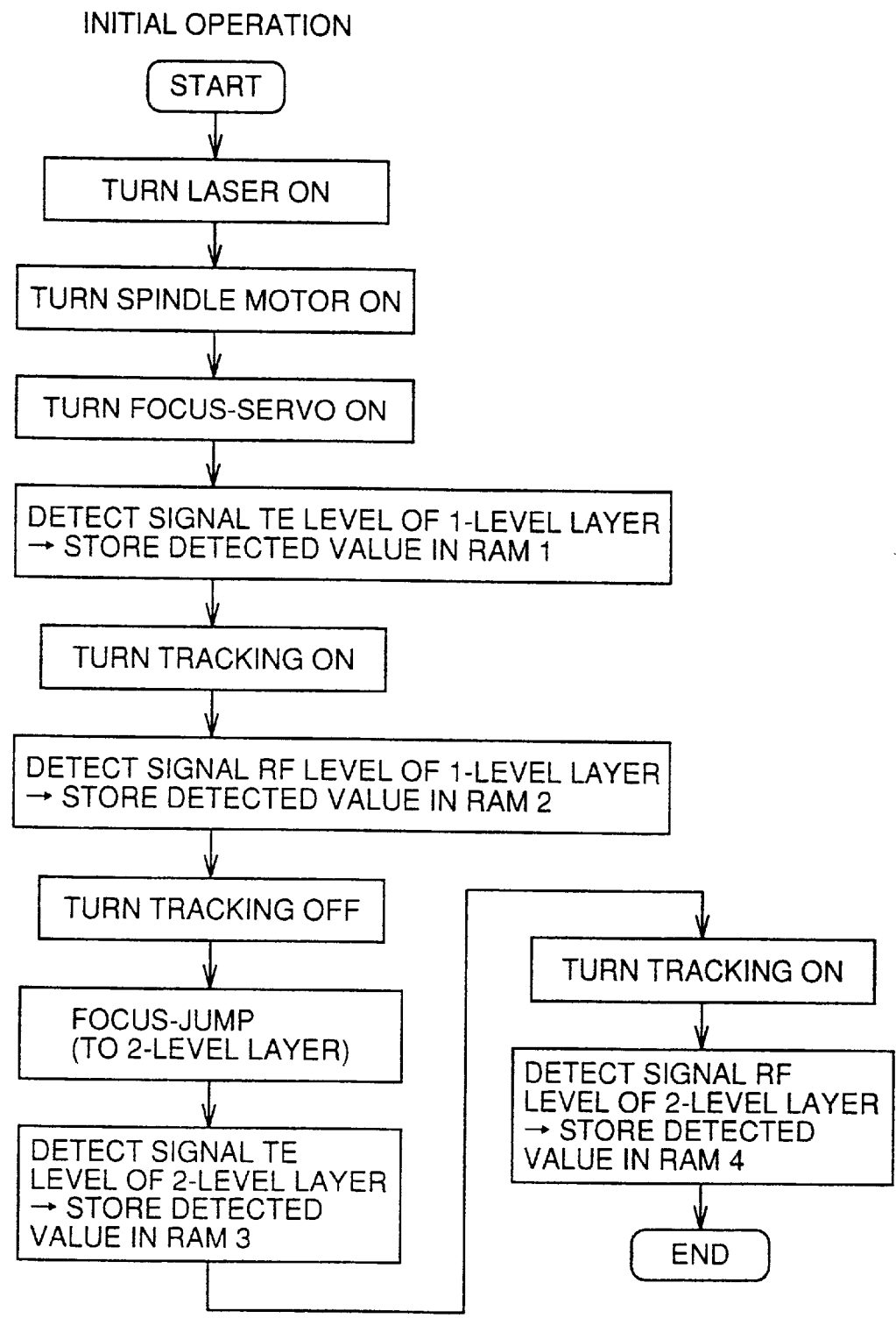
FIG. 51 is a flow chart for representing an initial operation of the FIG. 49 optical disk device.
Figure 52:
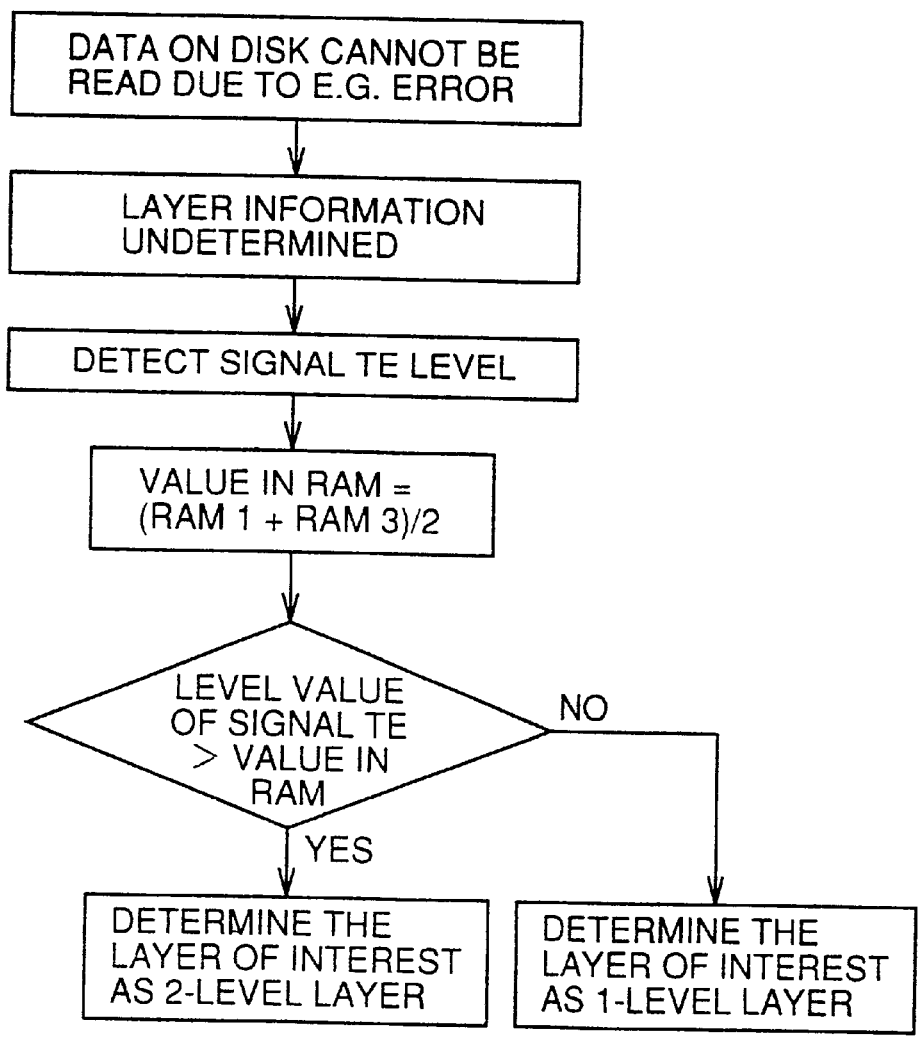
FIG. 52 is a flow chart for discriminating among layers, using a tracking error signal.

FIG. 51 is a flow chart for describing an operation of the fifth embodiment of the present invention, and FIG. 52 is a flow chart for describing an operation thereof when data cannot be read.

First, the initial operation in reading from disk 1 is effected in the order of the steps provided in FIG. 51. More specifically, after the FIGS. 4 and 5 seminconductor lasers 31 is turned on, spindle motor 16 is driven and the FIG. 9 focus coil 702 is also driven to operate focusing-servo. Thus, pickup 60 focuses e.g. on translucent recording layer 5 as the first layer shown in FIG. 2. Then, the difference e–f between the detection outputs from photodetectors 74 and 75 shown in FIG. 50 is provided as tracking error signal TE to head amp 45 and amplified therein, converted by A/D converter 71 into a digital signal, and thus provided to DSP 55. DSP 55 stores a detected value of tracking error signal TE in an area RAM 1 of RAM 57 and also turns tracking on.

When tracking is turned on, data is read from disk 1. Output RF indicative of the data read is output from photodetector 43, provided to and amplified in head amp 45, and converted by A/D converter 54 into a digital signal. DSP 55 stores a detected value of output RF in an area RAM 2 of RAM 57.

Then, to effect focus-jumping from translucent recording layer 5 as the first-level layer to reflecting recording layer 9 as the second-level layer, tracking is turned off. Then, focusing error signal FE is output from photodetector 43, amplified in head amp 45, converted by A/D converter 54 into a digital signal and thus provided to DSP 55. Then, focusing error signal FE is output from DSP 55 to D/A converter 58 and converted into an analog signal which in turn allows driver 59 to drive focus coil 702. Thus, pickup 60 focus-jumps to reflecting recording layer 9 as the second layer while DSP 55 stores the detected level of tracking error signal TE in an area of RAM 3 of RAM 57. Then, tracking is turned on and the level of output RF output from pickup 60 is detected and the detected value thereof is stored in an area RAM 4 of RAM 57.

If data on the disk cannot be read due to an error or the like, DSP cannot determine whether the layer of interest is the first layer or the second layer. In that case, the system goes to the steps shown in FIG. 52 and DSP 55 detects a level of tracking error signal TE from pickup 60. Then, DSP 55 compares the detected level of tracking error signal TE to the value corresponding to half the summation of the respective detected values of tracking error signal TE obtained from the first and second layers and are stored in RAM 57 at areas RAM 1 and RAM 3, respectively. If the detected value is smaller, DSP 55 determines that the layer of interest is the first layer. If the detected value is larger, DSP 55 determines that it is the second layer.

Figure 53:
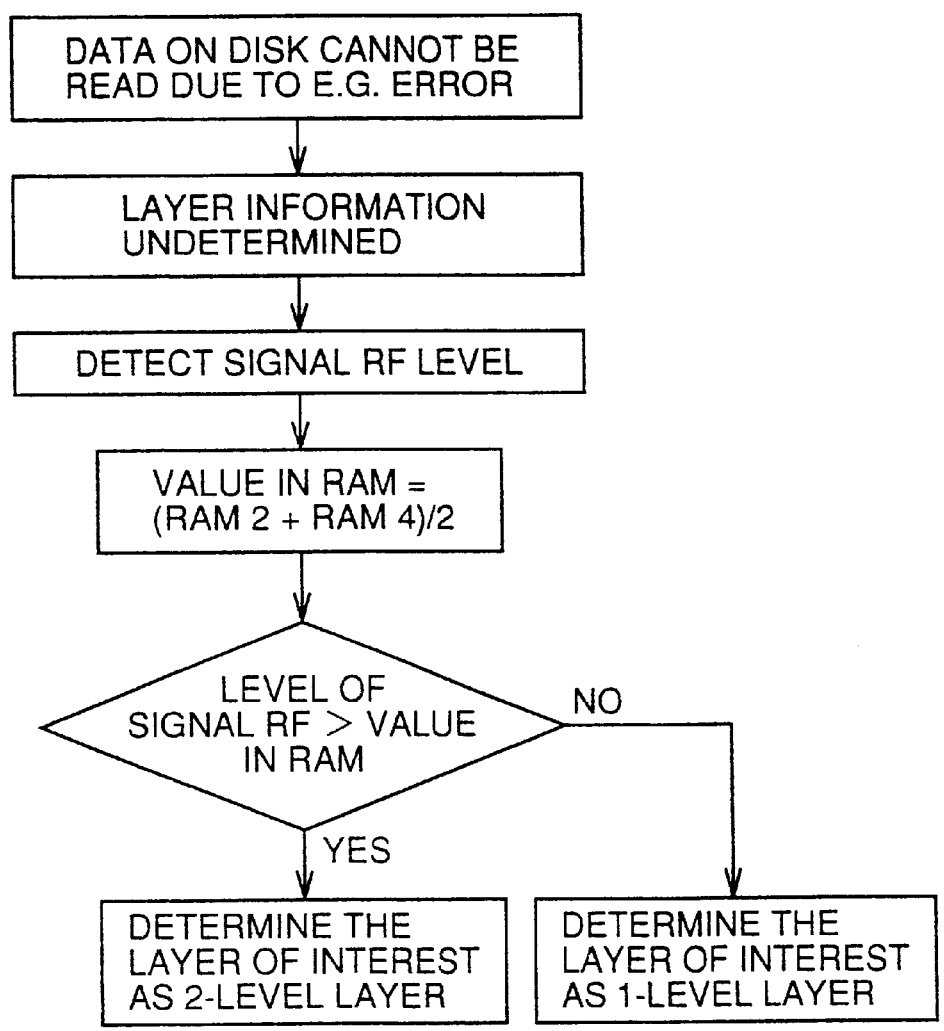
FIG. 53 is a flow chart for discriminating among layers, employing a reproduced signal.

While in the description provided above the determination as to whether a layer of interest is the first or second layer depends on the level of the tracking error signal, the detection of the layers may depends on the level of reproduced signal RF of data. FIG. 53 presents a flow chart when the layers are detected depending on the reproduced signal RF level. In this example, a detected, reproduced signal RF is compared to the value corresponding to half the summation of the detected values of reproduced signal RF respectively stored in areas RAM 2 and RAM 4 of RAM 57. If the detected value is smaller, DSP 55 determines that the layer of interest is the first layer. If it is larger, DSP 55 determines that it is the second layer.

Figure 59:
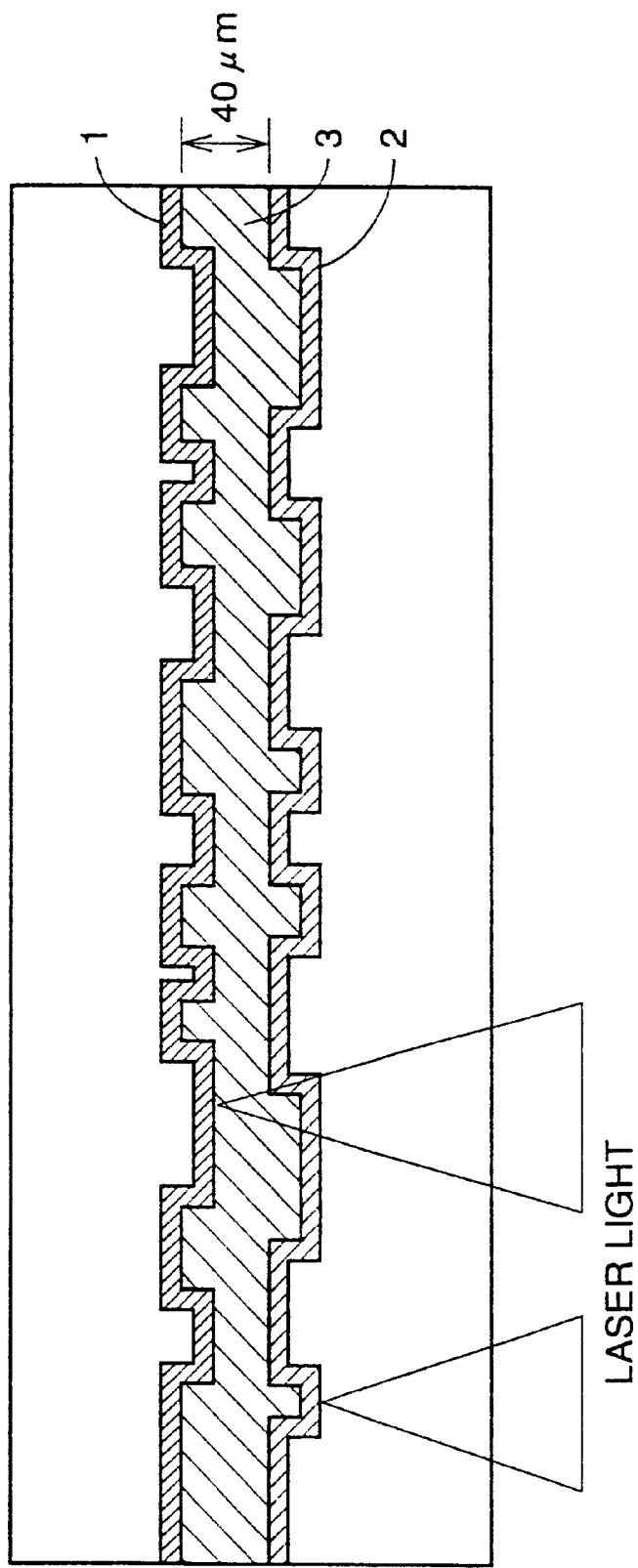
FIG. 59 is a cross section showing a schematic structure of a single-side reading, dual layer disk.
Figure 60:
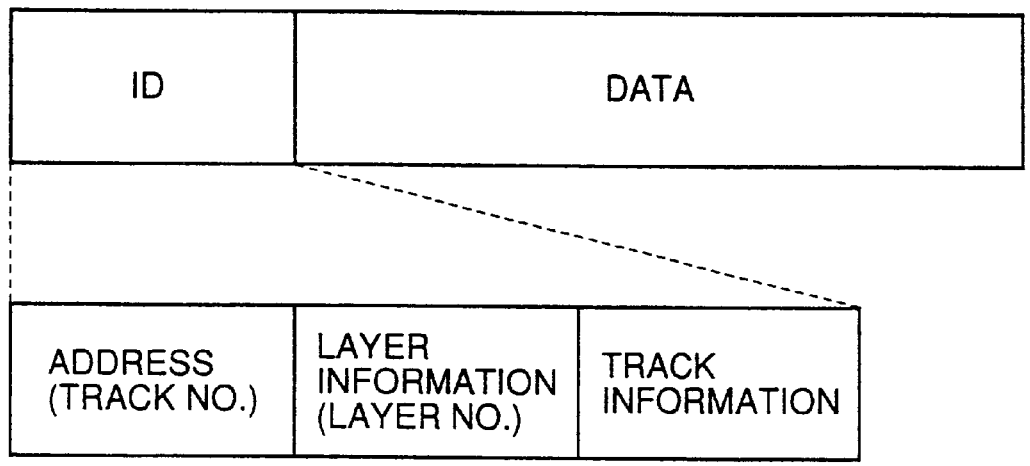
FIG. 60 represents the information recorded on the single-side reading, dual layer disk shown in FIG. 59.

Table 4 presents the reflectance of each signal for the first and second layers in comparison. In Table 4, when signals FE, RF and TE have a reflectance of 100% for a single-layer DVD, each signal has a reflectance varying between the first and second layers of a dual layer DVD, i.e. a reflectance higher in the second layer, since translucent recording layer 5 as the first layer has a reflectance of approximately 30% whereas reflecting recording layer 9 as the second layer has a reflectance of no less than 70%, as has been described with reference to FIG. 59.

TABLE 4

|  | 1-layer DVD | 2-layer DVD 1st layer | 2-layer DVD 2nd layer |
| --- | --- | --- | --- |
| FE | 100% | 36% | 39% |
| RF | 100% | 33% | 38% |
| TE (3 beams) | 100% | 33% | 43% |
| TE (DPD) | 100% | 60% | 86% |

Thus, as shown in the FIG. 51 flow chart, the value of a signal detected when data on a disk cannot be read due to an error can be compared to the initial values of signal TE or RF respectively detected at the first and second layers and stored so that the reflectance thereof can be used to readily determine whether the layer of interest is the first layer or the second layer.

While in the fifth embodiment the first layer and the second layer are discriminated from each other depending on tracking error signal TE or reproduced signal RF, they may be discriminated from each other depending on focusing error signal FE, since focusing error signal FE also has a reflectance varying between the first and second layers, as is understood from Table 4.

Thus in accordance with the fifth embodiment of the present invention any of a reproduced signal, a focusing error signal and a tracking error signal can be compared to signals detected at the first and second layers and thus stored previously, to discriminate between the first and second layers. Thus a layer of interest can readily be determined if the disk has an error and each layer cannot be discriminated.

Sixth Embodiment

When a conventional disk device is used to reproduce information from a disk having its surface damaged, it can fail to obtain a pulse from the reflecting surface of the disk. It can also fail to obtain a pulse from its reflecting surface due to surface aberration, impact and the like. Focusing error signal FE is obtained by detecting via a photodetector a pulse from a reflecting surface of a disk. Accordingly, if a peak of focusing error signal FE is not detected from the second layer after a peak thereof is detected from the first layer, a deceleration pulse cannot be applied to the actuator and this results in an erroneous operation that causes the actuator to collide against disk.

A main object of the sixth embodiment of the present invention is therefore to provide an optical disk device capable of preventing an erroneous focus-jumping operation.

Figure 54:
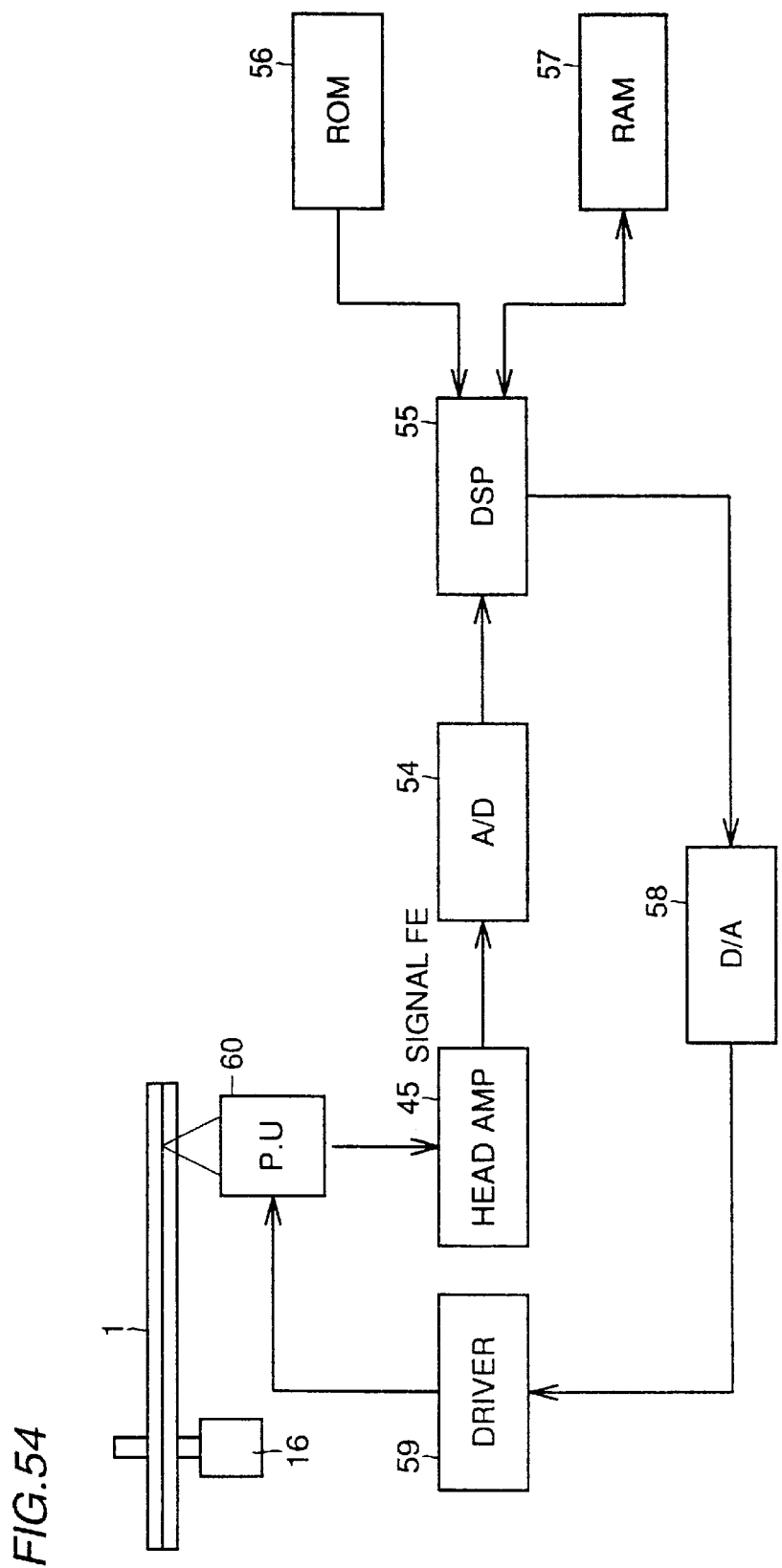
FIG. 54 is a block diagram showing a configuration of an optical disk device according to a sixth embodiment of the present invention.

FIG. 54 is a block diagram showing the sixth embodiment of the present invention. In FIG. 54, a one-side reading, dual layer DVD 1 is rotatably driven by spindle motor 16 and pickup 60 reads the information recorded on disk 1. Pickup 60 outputs a signal such as focusing error signal FE which is in turn amplified by head amp 45 and then provided to A/D converter 54 which converts an analog signal into a digital signal provided to DSP 55.

DSP 55 is connected to ROM 56 and RAM 57. In ROM 56 is stored a program for controlling DSP 55. In RAM 57 is stored the information obtained from disk 1. DSP 55 runs the program stored in ROM 56 and uses the information stored in RAM 57 to provide control for designating the position of pickup 60 by means of an acceleration signal or a deceleration signal. DSP 55 outputs to D/A converter 58 a digital signal for the control for designating the position of pickup 60. D/A converter 58 converts the digital signal into an analog signal for application to driver 59 which controls pickup 60 by means of the acceleration signal and the deceleration signal.

Figure 55:
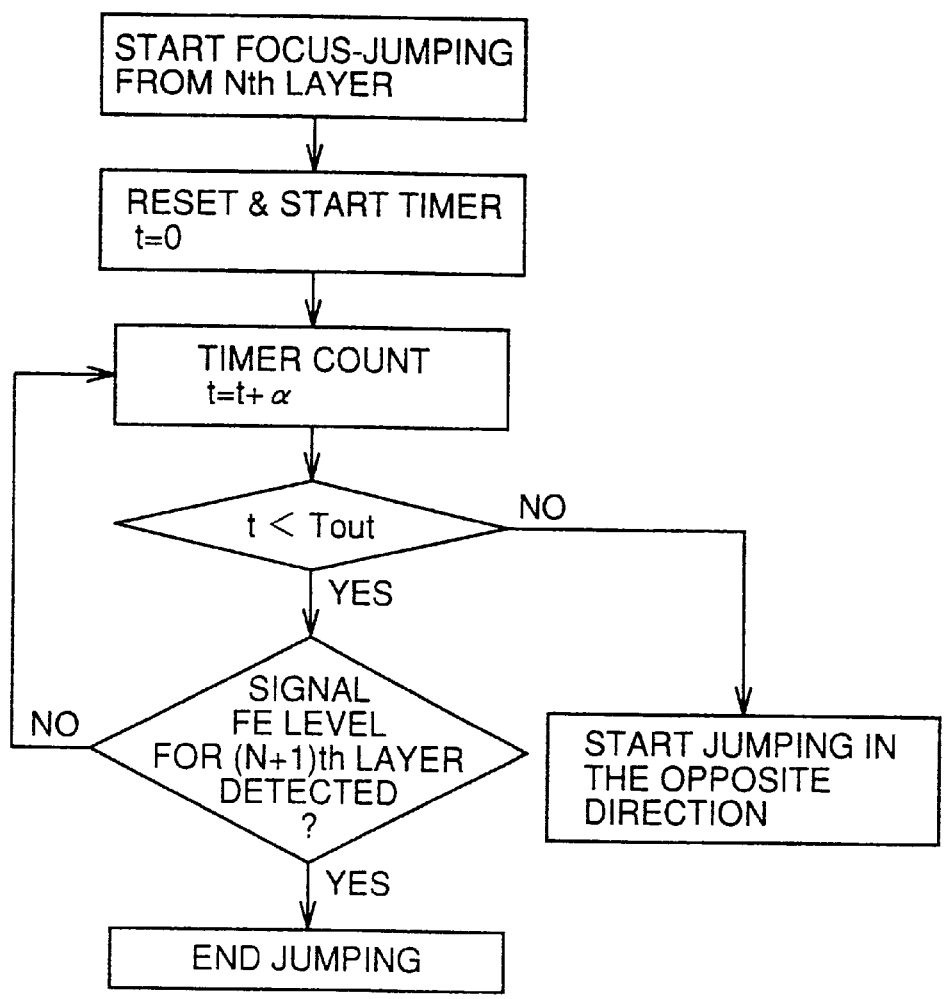
FIG. 55 is a flow chart for representing an operation of the FIG. 54 optical disk device.
Figure 56:
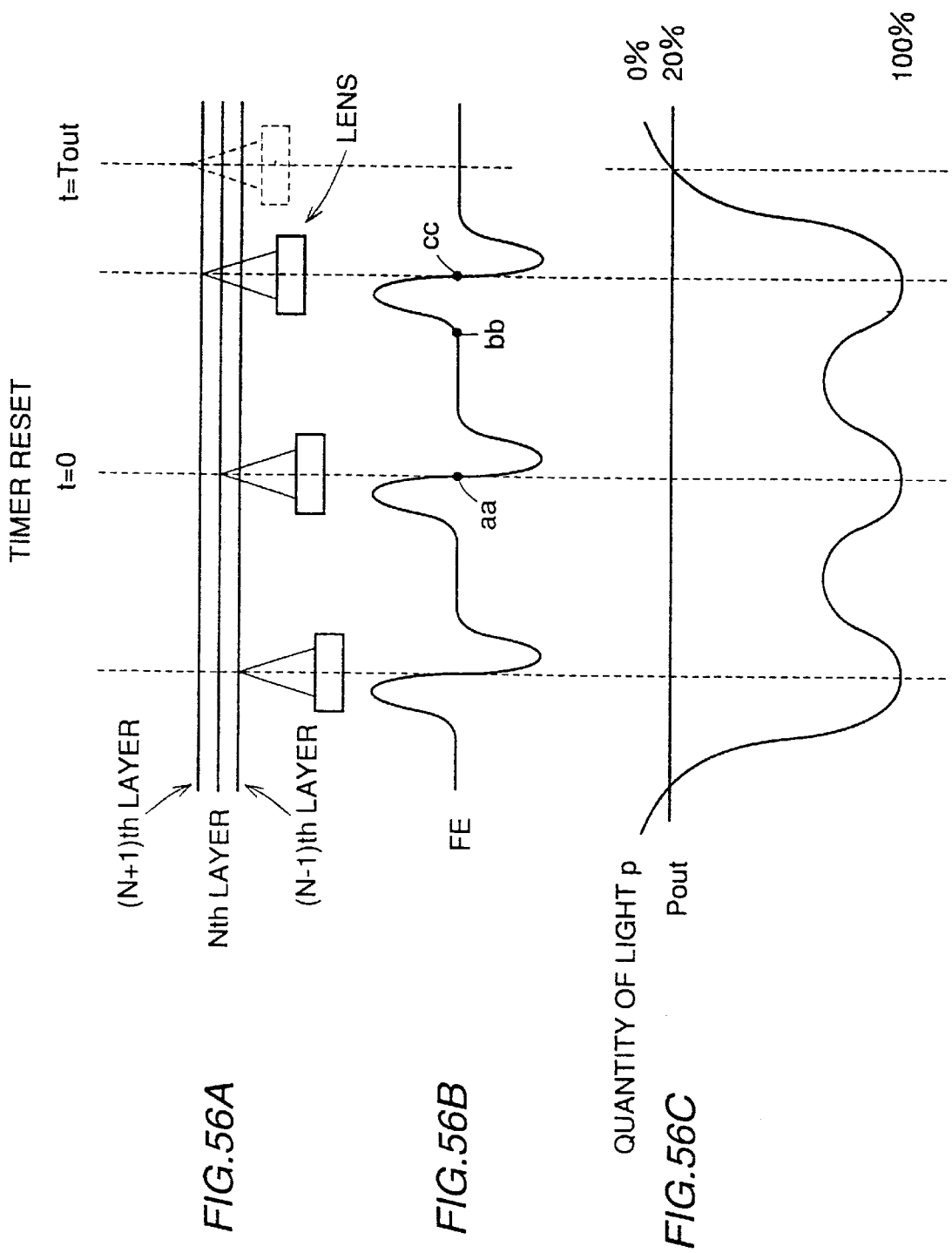
FIGS. 56A–56C are views for describing an operation of the FIG. 54 optical disk device.

FIG. 55 is a flow chart for representing an operation of the sixth embodiment of the present invention, and FIGS. 56A–56C are views for describing the operation of the sixth embodiment of the present invention.

According to the sixth embodiment, an acceleration signal is initially applied to pickup 60. Then, focus-jumping is controlled. Meanwhile, a timer starts counting. Then, when a predetermined period of time has elapsed, focus-jumping is effected in the opposite direction. More specifically, as shown in FIG. 56A it is assumed that a disk has an (N−1) th layer, an Nth layer and an (N+1)th layer, wherein pickup 60 focus-jumps from the (N−1) th layer to the Nth layer and then from the Nth layer to the (N+1) layer.

To effect focus-jumping from the Nth layer to the (N+1) th layer, DSP 55 outputs an acceleration signal during a time period from aa to bb of focusing error signal FE represented in FIG. 5GB. The acceleration signal is converted by D/A converter 58 into an analog signal which is in turn amplified by driver 59 to drive the FIG. 9 focus coil 702, while DSP 55 resets and then starts a timer incorporated therein. The timer may be in the form of hardware, such as a counter, or software may be applied to count time.

DSP 55 determines whether the count value of the time exceeds a predetermined value Tout. If not, DSP 55 detects the level of focusing error signal FE. If the level of focusing error signal FE corresponds to the zero crossing point indicated as a point cc in FIG. 56B, focus-jumping is completed. If the count value of the timer exceeds Tout, DSP 55 assumes that an abnormal operation is occurring and DSP 55 thus starts focus-jumping in the opposite direction to prevent pickup 60 from colliding against a surface of the disk. When the focus-jumping from the Nth layer to the (N+1) th layer requires a time period e.g. of 2 msec, Tout is adapted to correspond-e.g. to a multiplication thereof or 5 msec.

Seventh Embodiment

Figure 57:
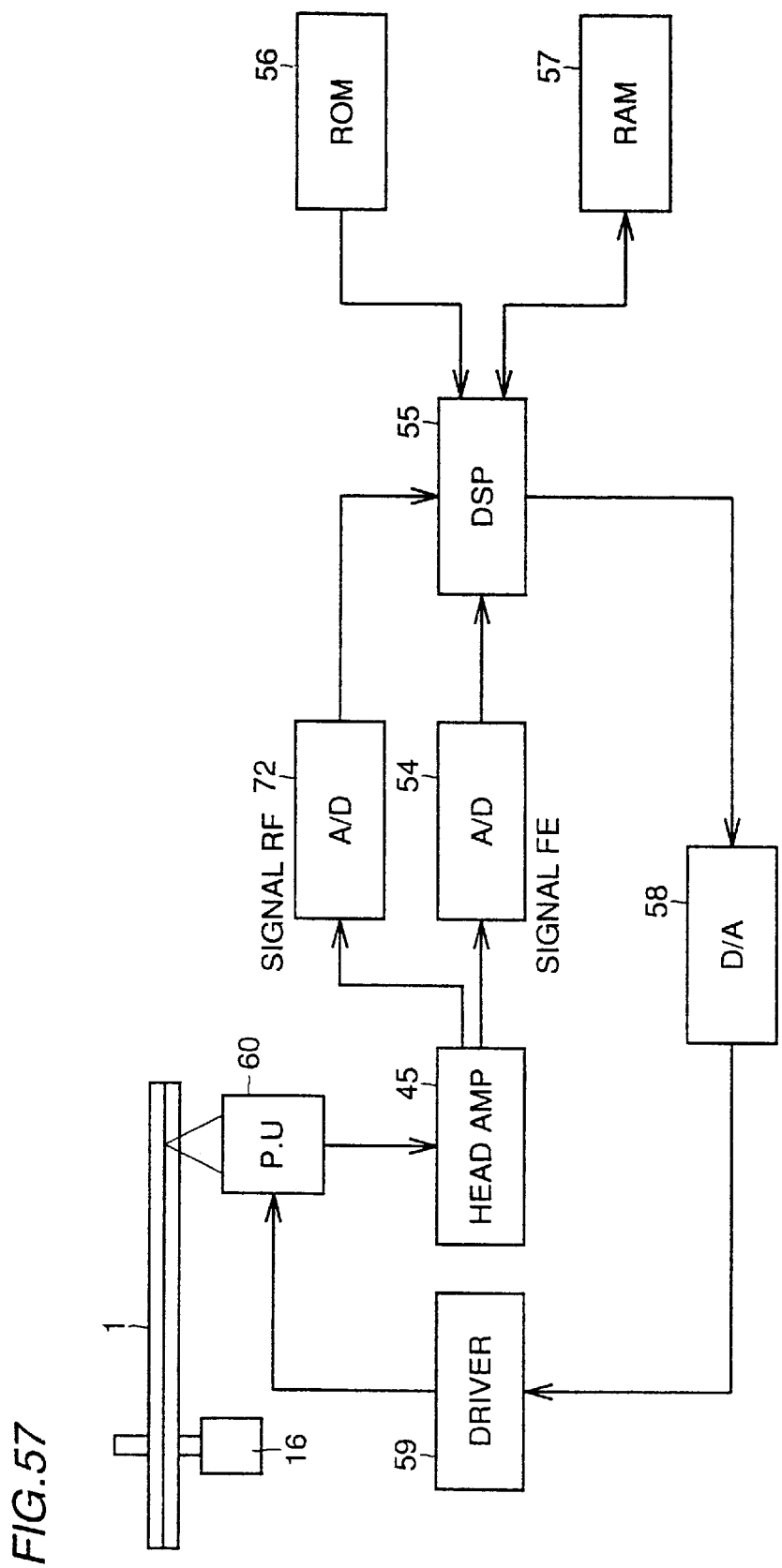
FIG. 57 is a block diagram showing a configuration of an optical disk device according to a seventh embodiment of the present invention.

FIG. 57 is a block diagram showing a seventh embodiment of the present invention. According to the seventh embodiment, an acceleration signal is initially output for focus-jumping. Then, when the level of quantity of light exceeds a predetermined value, focus-jumping is then effected in the opposite direction. Accordingly, as shown in FIG. 57, head amp 55 outputs not only focusing error signal FE but also a signal p indicative of quantity of light which is then converted by A/D converter 72 into a digital signal provided to DSP 55. The rest of the configuration is identical to the configuration shown in FIG. 54.

Figure 58:
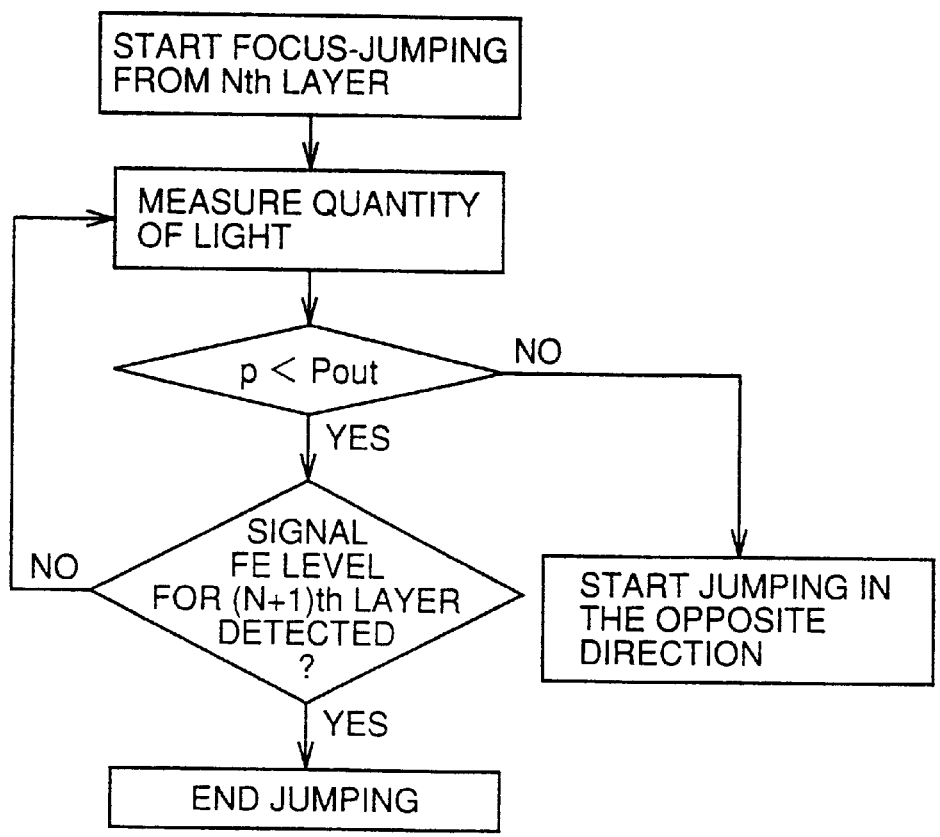
FIG. 58 is a flow chart for representing an operation of the FIG. 57 optical disk device.

FIG. 58 is a flow chart for describing an operation of the seventh embodiment of the present invention. Reference will now be made to FIG. 58 of the seventh embodiment to describe the operation of the seventh embodiment. Initially, as in the sixth embodiment, DSP 55 provides an acceleration signal to D/A converter 58 to control focus-jumping. The acceleration signal is converted by D/A converter 58 into an analog signal which is in turn amplified by driver 59 and provided to focus coil 702 of pickup 60. Photodetector 43 detects the light reflected from a disk and head amp 45 outputs signal p indicative of quantity of light and focusing error signal FE. The signals are converted by A/D converters 72 and 54, respectively, into digital signals provided to DSP 55. DSP 55 measures and compares signal p indicative of quantity of light to a predetermined value Pout of quantity of light represented in FIGS. 56A–56C. If signal p indicative of quantity of light is smaller than predetermined value Pout indicative of quantity of light, DSP 55 detects the level of focusing error signal FE of the (N+1) th layer. If the detected level of focusing error signal FE of the (N+1) th layer corresponds to the zero crossing point corresponding to point cc shown in FIG. 56B, focus-jumping is terminated.

If signal p indicative of quantity of light exceeds value Pout indicative of quantity of light, however, DSP 55 assumes that an abnormal operation is occurring and thus starts focus-jumping in the opposite direction to prevent pickup 60 from colliding against the disk.

As described above according to the seventh embodiment, collision of information reading means against an optical disk can be prevented by providing a deceleration signal to the information reading means to decelerate the information reading means if reflected light cannot be obtained within a predetermined period of time or a predetermined level of reflected light cannot be obtained when an acceleration signal is applied to allow the information reading means focusing on a signal recording surface of any layer of the optical disk to focus on a signal recording layer of another layer of the optical disk.

What is claimed is:

1. A device reproducing of information recorded on a plurality of layers of an optical disk, comprising:

information reading means (60) for illuminating said optical disk (1) with a beam and detecting light reflected from said optical disk (1) to read said information;

interlayer-distance detection means (55) for detecting first spacings between said layers in a mounted said optical disk (1) at a plurality of points different in a distance from a center of said optical disk (1);

storage means (57) for storing said first spacings detected by said interlayer-distance detection means; and control means (55) for using said first spacings stored in said storage means to calculate a second spacing between a first layer and a second layer of said optical disk (1) when information is being reproduced from said first layer and for thereby controlling said information reading means to focus said beam on said second layer so that information is reproduced from said second layer when information is being reproduced from said first layer.

2. The optical disc device according to claim 1, wherein said control means (55) also includes:

acceleration means (55) for generating and providing to said information reading means (60) an acceleration signal for moving said information reading means (60) to change a distance from said optical disk (1) to said information reading means (60); and deceleration means (55) for generating and providing to said information reading means (60) a deceleration signal variable in magnitude for controlling said information reading means (60) to stop at a position for focusing said beam on said second layer.

3. The optical disk device according to claim 1, said control means (55) also includes acceleration means (55) for generating and providing to said information reading means (60) an acceleration signal variable in magnitude for moving said information reading means (60) to change a distance from said optical disk (1) to said information reading means (60), and deceleration means (55) for generating and providing to said information reading means (60) a deceleration signal for controlling said information reading means (60) to stop at a position for focusing said beam on said second layer.

4. The optical disk device according to claim 1, wherein said control means (55) includes acceleration means (55) for generating and providing to said information reading means (60) an acceleration signal variable in magnitude for moving said information reading means (60) to change a distance from said optical disk (1) to said information reading means (60), and deceleration means (55) for generating and providing to said information reading means (60) a deceleration signal variable in magnitude for controlling said information reading means to stop at a position for focusing said beam on said second layer.

5. The optical disk device according to claim 1, wherein:

said interlayer-distance detection means (55) is provided to obtain a focusing error signal having two peaks different in polarity; and said control means (55) generates and provides to said information reading means (60) an acceleration signal for moving said information reading means (60) to change a distance from said optical disk (1) to said information reading means (60) and generates and provides to said information reading means (60) a deceleration signal for controlling said information reading means (60) to stop at a position for focusing said beam on said second layer to switch said acceleration signal to be provided to said information reading means (60) to said deceleration signal at any point between said two peaks.

6. The optical disk device according to claim 1, wherein:

said interlayer-distance detection means (55) is provided to obtain a focusing error signal having two peaks different in polarity; and said control means (55) generates an acceleration signal for moving said information reading means (60) to change a distance from said optical disk (1) to said information reading means (60) and provides said acceleration signal to said information reading means until an intermediate point between said two peaks is attained and said control means (55) generates a deceleration signal for controlling said information reading means (60) to stop at a position for focusing said beam on said second layer and provides said deceleration signal to said information reading means once said intermediate point is attained.

* * * * *